United States Patent
Fujie et al.

(10) Patent No.: US 8,876,915 B2
(45) Date of Patent: Nov. 4, 2014

(54) COLORING COMPOSITION AND INK FOR INKJET RECORDING

(71) Applicant: FUJIFILM Corporation, Tokyo (JP)

(72) Inventors: Yoshihiko Fujie, Kanagawa (JP); Prakash Patel, Manchester (GB); Clive Edwin Foster, Manchester (GB); Keiichi Tateishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/271,680

(22) Filed: May 7, 2014

(65) Prior Publication Data

US 2014/0238264 A1     Aug. 28, 2014

Related U.S. Application Data

(63) Continuation of application No. PCT/JP2012/078799, filed on Nov. 7, 2012.

(30) Foreign Application Priority Data

| Nov. 8, 2011 | (JP) | 2011-244971 |
| Nov. 30, 2011 | (JP) | 2011-262829 |
| Nov. 30, 2011 | (JP) | 2011-262830 |
| Aug. 21, 2012 | (JP) | 2012-182688 |

(51) Int. Cl.
*C09B 47/04* (2006.01)
*C09D 11/02* (2014.01)
*C09D 11/328* (2014.01)

(52) U.S. Cl.
CPC ............... *C09D 11/328* (2013.01); *C09B 47/04* (2013.01)
USPC ............. 8/661; 8/637.1; 8/638; 106/31.46

(58) Field of Classification Search
USPC ................. 8/661, 637.1, 638; 106/31.36
See application file for complete search history.

(56) References Cited

U.S. PATENT DOCUMENTS

2009/0083912 A1*  4/2009  Lehmann ............... 8/661

FOREIGN PATENT DOCUMENTS

| JP | 2002-249677 A | 9/2002 |
| JP | 2004-323605 A | 11/2004 |
| JP | 2010-106066 A | 5/2010 |
| WO | 2010/020802 A2 | 2/2010 |

OTHER PUBLICATIONS

STIC Search Report dated Jun. 6, 2014.*
International Search Report dated Jan. 29, 2013 issued in International Application No. PCT/JP2012/078799 (PCT/ISA/210).
Written Opinion dated Jan. 29, 2013 issued in International Application No. PCT/JP2012/078799 (PCT/ISA/237).

* cited by examiner

Primary Examiner — Eisa Elhilo
(74) Attorney, Agent, or Firm — Sughrue Mion, PLLC

(57) ABSTRACT

There is provided a coloring composition and an ink for inkjet recording which have an excellent ozone fastness and a high print density and is excellent in storage stability over time, and one example of the coloring composition is a coloring composition contains a compound (1A) and a compound (2B):

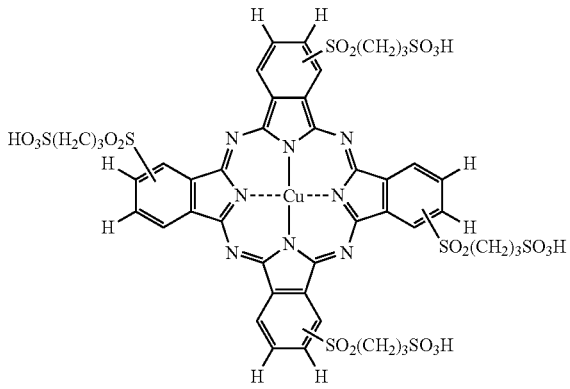

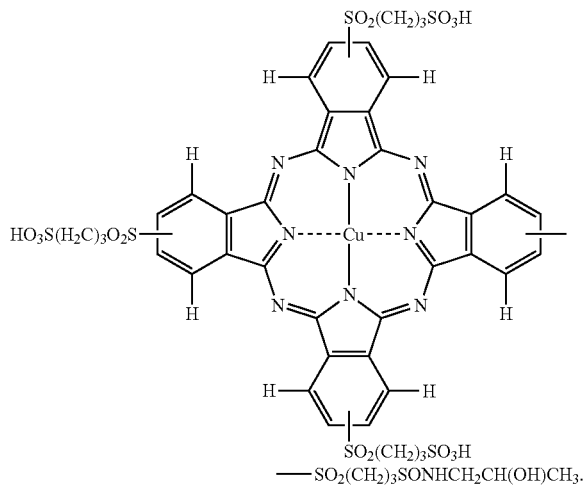

19 Claims, No Drawings

COLORING COMPOSITION AND INK FOR INKJET RECORDING

CROSS REFERENCE TO RELATED APPLICATION

This is a continuation of International Application No. PCT/JP2012/078799 filed on Nov. 7, 2012, and claims priority from Japanese Patent Application Nos. 2011-244971 filed on Nov. 8, 2011, 2011-262829 filed on Nov. 30, 2011, 2011-262830 filed on Nov. 30, 2011, and 2012-182688 filed on Aug. 21, 2012, the entire disclosures of which are incorporated herein by reference.

TECHNICAL FIELD

The present invention relates a coloring composition and an ink for inkjet recording which have an excellent fastness and a high print density and which is further excellent in storage stability over time.

BACKGROUND ART

Recently, image-recording materials, in particular, materials for forming color images have been a mainstream, and specifically, recording materials for inkjet system, recording materials for a heat-sensitive transfer system, recording materials of electrophotographic system, transfer type silver halide photosensitive materials, printing inks, and recording pens have been widely used. In addition, in imaging elements such as CCD for imaging devices, and in LCD or PDP for displays, color filters have been used for recording and reproducing a color image.

In this color image recording materials or color filters, in order to reproduce or record full color images, dyes and pigments of three primary colors of a so-called subtractive color mixing method or additive color mixing method are used, but there is no fast colorant having absorption characteristics can realize a preferred color reproduction range, and can withstand a variety of operating conditions. Thus, improvements are strongly desired.

An inkjet recording method is rapidly spread and more developed because material cost is low, high-speed recording is feasible, a noise is low while recording is performed, and color recording is easy.

The inkjet recording method includes a continuous manner that continuously disperses a liquid drop and an on-demand manner that disperses a liquid drop according to an image information signal as the inkjet recording method, and a discharging manner includes a manner that discharges a liquid drop by applying pressure by a piezo element, a manner that discharges a liquid drop by generating bubbles in ink by heat, a manner that uses an ultrasonic wave, and a manner that absorbs a liquid drop by electrostatic force and discharge it.

Further, an aqueous ink, an oily ink or a solid (melt type) ink is used as an ink for inkjet recording.

A colorant used in ink for inkjet recording needs to ensure favorable solubility or polydispersity to a solvent, recording at a high concentration, favorable colors, fastness to light, heat, and active gas ($NO_x$, $SO_x$ other than oxidative gas such as ozone, or the like) in an environment, excellent fastness to water or chemicals, good settlement to an image-receiving material, low spreading, excellent preservation as ink, non-toxicity, high purity, and availableness at low price.

However, it is very difficult to seek a dye that satisfies these requirements at a high level. In particular, a colorant having a good cyanide color, a colorant having fastness to light, humidity, and heat, among them, when printing onto the water-like material having an ink receiving layer containing a porous white inorganic pigment particles, a colorant having fastness to the oxidative gas such as ozone in the environment is strongly demanded, and at the same time a colorant having compatibility of the ink storage stability is strongly demanded as described below.

A colorant structure of cyanide used in such ink for inkjet recording includes phthalocyanine, anthraquinone, triphenylmethane, and the like, and the phthalocyanine compound having excellent color and light fastness has been used. However, because the structure does not have sufficient fastness to the oxidative gas, especially ozone, and the ink stability is not satisfied, improvement is demanded.

A phthalocyanine dye represented by Direct Blue 87 or Direct Blue 199 currently, commonly and widely used and also described in the publication, etc., is characterized by having an excellent light resistance compared with the magenta or yellow, but it tends to occur problems caused by the solubility of the dye. For example, the dissolution failure occurred at the time of manufacturing causes a manufacturing trouble, or the insoluble material precipitated when preserving or using products causes problems, too. In particular, in the inkjet recording described above, since the storage stability such as precipitation of the dye is poor, there is a problem in that clogging of the print head or discharge failure may occur, or the printed image may be significantly deteriorated.

Further, it becomes a significant problem in that the colorant is easily discolored by oxidative gases such as ozone, which is often taken as recent environmental issues, and the print density is significantly decreasing.

Currently, the usage field of an inkjet recording is rapidly expanding, and the inkjet recording becomes to be more and more widely used in the future households, SOHO, the business field, and the like, which results in contact with a variety of using conditions or using environment. As a result, there occurs a problem in the ink storage stability due to the poor solubility of the cyanide dye ink, or a problem of fading of the printed image due to being exposed to the light or the active gas in the environment. Thus, a colorant and an ink composition having a particularly good color, an excellent fastness to light and active gases (NOx, SOx other than the oxidative gas such as ozone, etc.) in the environment and, and having a high solubility is more and more strongly demanded.

Recently, as a phthalocyanine colorant to balance both color and the fastness to ozone and light, the phthalocyanine colorant having a particular sulfinyl group or a sulfonyl group is described in Patent Document 1. Further, in the phthalocyanine colorant described in the corresponding literature, it is described that β-position substitution type (in the case where each of $R_1$ to $R_{16}$ in the Formula (IV) is set to be the positions 1 to 16, the one having a specific sulfonyl group or sulfinyl group at position 2 and/or 3, position 6 and/or 7, position 10 and/or 11, position 14 and/or 15) as a substitution position of a substituent group has better color and fastness to light and ozone than α,β-position mixed type (there is no regularity in a substitution position of a substituent group).

As a phthalocyanine colorant to balance both color and the fastness to ozone and light, the azaphthalocyanine colorant having a sulfo group and a substituted sulfamoyl group is described in Patent Document 2.

PRIOR ART DOCUMENTS

Patent Documents

[Patent Document 1] Japanese Patent Application Laid-Open No. 2002-249677
[Patent Document 2] International Patent WO2010/020802

SUMMARY OF THE INVENTION

Problems to be Solved

However, among the phthalocyanine colorants described in Patent Document 1, in α,β-position mixed type, the ozone fastness and the print density are not being sufficiently compatible. In the α,β-position mixed type as described above, the print density and the fastness are balance by adjusting the ratio of substituted position (α-position (1, 4, 5, 8, 9, 12, 13 and 16-positions) versus β-position (2, 3, 6, 7, 10, 11, 14 and the 15-position) to control the association in the molecule. That is, because both have a trade-off relationship, the other performance is not sufficient in order to satisfy the performance of the one performance.

Further, in the ink for inkjet recording comprising only a β-position substitution type phthalocyanine colorant, it is found that the ozone fastness and the print density are not compatible, and there is room for further improvement for the print density.

An aspect I of the present invention has been made in view of such circumstances, and an object thereof is to provide a coloring composition and an ink for inkjet recording having a good ozone fastness and a high print density.

An aspect II of the present invention has been made in view of such circumstances, and an object thereof is to provide a coloring composition and an ink for inkjet recording which suppress bronzing and have a good ozone fastness and a high print density.

An aspect III of the present invention has been made in view of such circumstances, and an object thereof is to provide a coloring composition and an ink for inkjet recording which suppress bronzing and have a good ozone fastness and a high print density.

Means for Solving the Problems

In the aspect I, the present inventors have found that the trade-off relationship may be broken by using with a mixture of an α-position substitution type phthalocyanine and a β-position substitution type phthalocyanine, thereby accomplishing the present invention. Further, the coloring composition of the present invention was unexpectedly found to have excellent storage stability over time.

In the aspect II, the present inventors have found that the association may be suppressed and the trade-off relationship may be broken by using with a mixture of a phthalocyanine having a specific structure and an azaphthalocyanine having a specific substituent group, thereby accomplishing the present invention. Further, gray and black images prepared by using the coloring composition of the present invention as a cyanide ink and combining the commercially available magenta ink and yellow ink was unexpectedly found to appear the same color visually under the other light source (e.g. a fluorescent lamp shown in sunlight, etc.) and thus the light source dependency is excellent.

In the aspect III, the present inventors have found that the association may be suppressed and the trade-off relationship may be broken by using a mixture of a phthalocyanine having a specific structure and a phthalocyanine having a specific substituent group, thereby accomplishing the present invention. Further, the coloring composition of the present invention was unexpectedly found to be hardly precipitated even in aqueous solution, and have excellent storage stability over time. Because the good storage stability over time can adjust the dye aqueous solution as a raw material of the ink for inkjet in a high concentration, it is advantageous in terms of storage and transport, and because there is no precipitation of the dye when preparing the ink for inkjet ink by using a highly concentrated dye aqueous solution, the deviation of concentration is less likely to occur, and thus it is useful.

The objects of the present invention have been achieved by the following method.

[1] A coloring composition including a phthalocyanine dye represented by the following Formula (1), and a phthalocyanine dye represented by the following Formula (I-2), the following Formulas (II-2), or the following Formula (III-2).

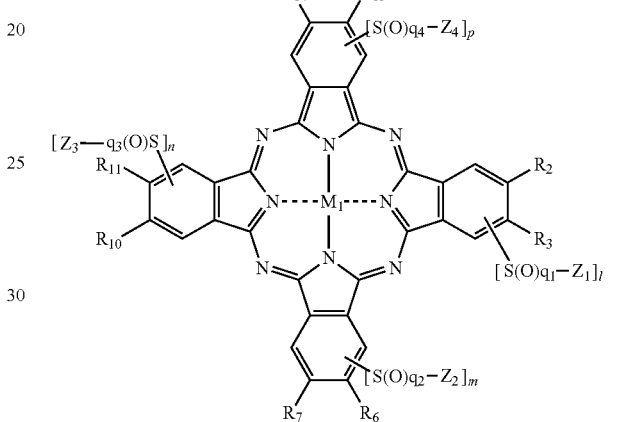

(1)

In Formula (1), $R_2$, $R_3$, $R_6$, $R_7$, $R_{10}$, $R_{11}$, $R_{14}$ and $R_{15}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group. These groups may further have a substituent.

$Z_1$, $Z_2$, $Z_3$ and $Z_4$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. However, at least one of $Z_1$, $Z_2$, $Z_3$ and $Z_4$ has an ionic hydrophilic group as a substituent l, m, n, p, $q_1$, $q_2$, $q_3$ and $q_4$ each independently represent 1 or 2.

$M_1$ represents a hydrogen atom, a metal element, a metal oxide, a metal hydroxide or a metal halide.

Formula (I-2):

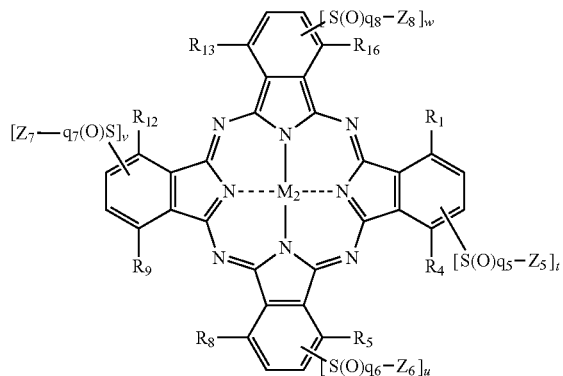

Formula (II-2):

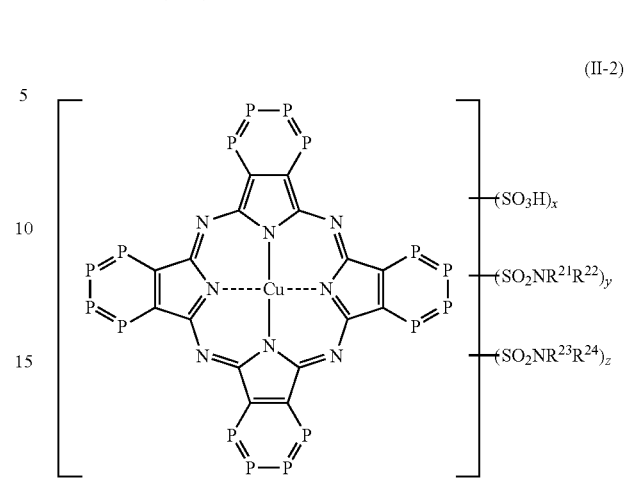

In Formula (I-2),
$R_1$, $R_4$, $R_5$, $R_8$, $R_9$, $R_{12}$, $R_{13}$ and $R_{16}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group. These groups may further have a substituent.

$Z_5$, $Z_6$, $Z_7$, and $Z_8$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. However, at least one of $Z_5$, $Z_6$, $Z_7$ and $Z_8$ has an ionic hydrophilic group as a substituent.

t, u, v, w, $q_5$, $q_6$, $q_7$ and $q_8$ each independently represent 1 or 2.

$M_2$ represents a hydrogen atom, a metal element, a metal oxide, a metal hydroxide or a metal halide.

In Formula (II-2),
P's each independently represents a nitrogen atom or CH, and at least one of P's represents a nitrogen atom. However, in the four rings containing P's, the number of P's representing nitrogen atoms is 2 or less, respectively.

$R^{21}$ and $R^{22}$ each independently represent a hydrogen atom or a substituted or unsubstituted alkyl group.

$R^{23}$ represents a hydrogen atom or a substituted or unsubstituted hydrocarbon group.

$R^{24}$ represents a substituted or unsubstituted hydrocarbon group.

$R^{23}$ and $R^{24}$ may be bound to each other with nitrogen atom to form a substituted or unsubstituted heterocyclic ring.

x, y, and z each independently represent 0 to 4.
x+y+z is 1 to 4.

Formula (III-2):

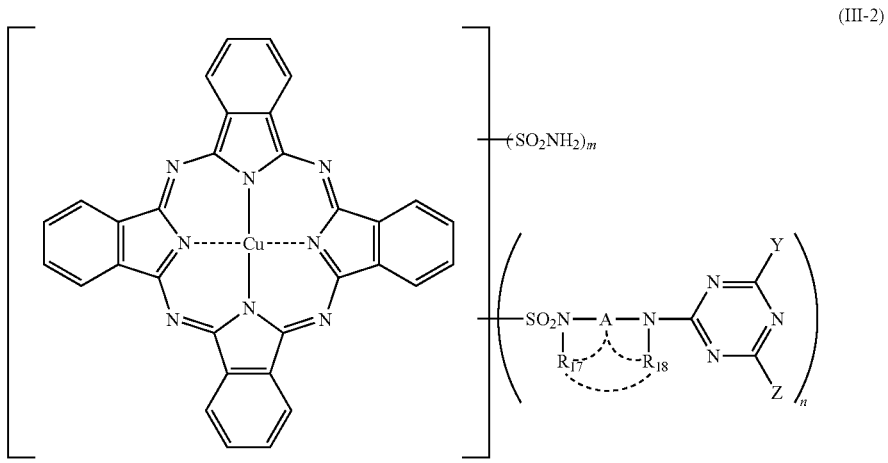

In Formula (III-2),
$R_{17}$ and $R_{18}$ each independently represent a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heterocyclic group, or a substituted or unsubstituted alkenyl group. A represents a divalent linking group, and adjacent $R_{17}$, $R_{18}$, and A may be bound to each other to form a ring. Y and Z each independently represent a halogen atom, a hydroxyl group, a sulfonate group, a carboxyl group, an amino group, a substituted or unsubstituted alkoxy group, a substituted or unsubstituted cycloalkyloxy group, a substituted or unsubstituted aryloxy group, a substituted or unsubstituted heterocyclic oxy group, a substituted or unsubstituted aralkyloxy group, a substituted or unsubstituted alkenyloxy group, a substituted or unsubstituted alkylamino group, a substituted or unsubstituted cycloalkyl amino group, a substituted or unsubstituted arylamino group, a substituted or unsubstituted heterocyclic amino group, a substituted or unsubstituted aralkylamino group, a substituted or unsubstituted alkenyl amino group, a substituted or unsubstituted dialkylamino group, a substituted or unsubstituted alkylthio group, a substituted or unsubstituted arylthio group, a substituted or unsubstituted heterocyclic thio group, a substituted or unsubstituted aralkyl thio group, or a substituted or unsubstituted alkenylthio group. However, at least one of Y and Z has a sulfonate group, a carboxyl group, or an ionic hydrophilic group as a substituent. m and n is 1 to 3, and the sum of m and n is 2 to 4.

[2] A coloring composition disclosed in [1], characterized in that in the phthalocyanine dye represented by Formula (I-2), $Z_5$, $Z_6$, $Z_7$, and $Z_8$ each independently represent a substituted or unsubstituted alkyl group, a substituted or unsubstituted aryl group, or a substituted or unsubstituted heterocyclic group.

[3] A coloring composition disclosed in [1] or [2], characterized in that in the phthalocyanine dye represented by Formula (I-2), $R_1$, $R_4$, $R_5$, $R_8$, $R_9$, $R_{12}$, $R_{13}$ and $R_{16}$ are a hydrogen atom.

[4] A coloring composition disclosed in any one of [1] to [3], characterized in that in the phthalocyanine dye represented by Formula (I-2), $Z_5$, $Z_6$, $Z_7$, and $Z_8$ represent a substituted alkyl group, and at least one of the substituents possessed by the alkyl group is —SONHR group (however, R represents a substituted or unsubstituted alkyl group or a substituted or unsubstituted phenyl group).

[5] A coloring composition disclosed in any one of [1] to [4], characterized in that in the phthalocyanine dye represented by Formula (I-2), t, u, v and w are 1.

[6] A coloring composition disclosed in any one of [1] to [5], characterized in that in the phthalocyanine dye represented by Formula (I-2), $q_5$, $q_6$, $q_7$ and $q_8$ are 2.

[7] A coloring composition disclosed in [1], characterized in that the azaphthalocyanine dye represented by Formula (II-2) is an azaphthalocyanine dye represented by Formulas (II-3-1) or Formula (II-3-2).

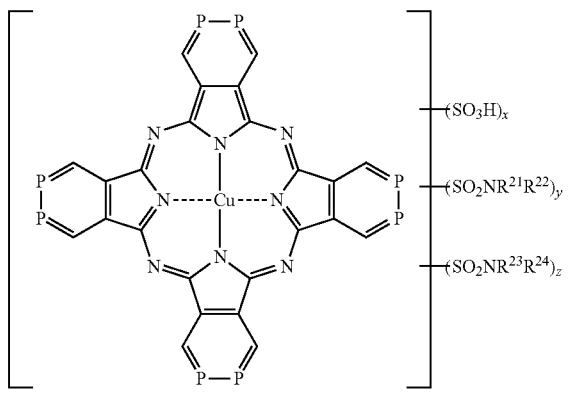

(I-3-1)

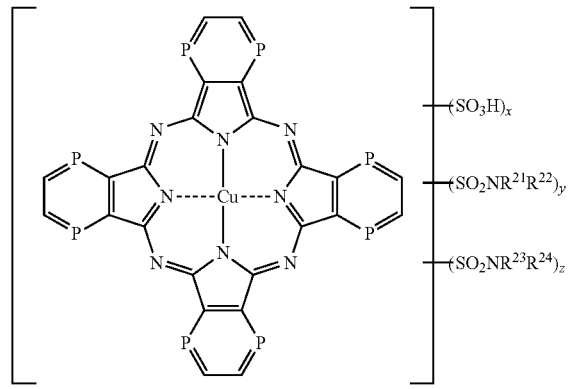

(I-3-2)

In Formula (II-3-1) and Formula (II-3-2),

P's each independently represents a nitrogen atom or CH, and at least one of P's represents a nitrogen atom.

$R^{21}$ and $R^{22}$ each independently represent a hydrogen atom or a substituted or unsubstituted alkyl group.

$R^{23}$ and $R^{24}$ each independently represent a hydrogen atom, a substituted or unsubstituted alkyl group, or a substituted or unsubstituted aryl group.

x, y, and z each independently represent 0 to 4.

x+y+z is 1 to 4.

[8] A coloring composition disclosed in [1] or [7], characterized in that in the Formula (II-2), Formula (II-3-1), or Formula (II-3-2), $R^{23}$ represents a hydrogen atom, and $R^{24}$ is a substituted alkyl group substituted with a substituent represented by Formula (T1).

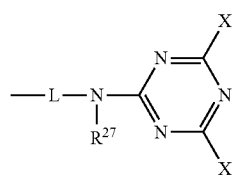

(T1)

In Formula (T1),

L represents a single bond or a substituted or unsubstituted alkylene group.

X each independently represents a substituent selected from —$OR^{25}$, —$SR^{25}$, and —$NR^{25}R^{26}$, $R^{25}$ and $R^{26}$ each independently represent a hydrogen atom, a substituted or unsubstituted alkyl group, a substituted or unsubstituted aryl group, or a substituted or unsubstituted heterocyclic group, and at least one of $R^{25}$ and $R^{26}$ has an ionic hydrophilic group as a substituent. $R^{27}$ represents a hydrogen atom or a substituted or unsubstituted alkyl group.

[9] A coloring composition disclosed in [8], characterized in that the substituent represented by Formula (T1) is a substituent represented by Formula (T2).

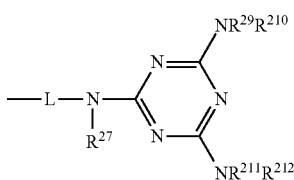

In Formula (T2),

L represents a single bond or a substituted or unsubstituted alkylene group.

$R^{29}$, $R^{210}$, and $R^{211}$ each independently represent a hydrogen atom, or a substituted or unsubstituted alkyl group, and $R^{212}$ represents a substituted alkyl group, a substituted aryl group, or a substituted heterocyclic group, and has at least one ionic hydrophilic group as a substituent. $R^{27}$ represents a hydrogen atom or a substituted or unsubstituted alkyl group.

[10] A coloring composition disclosed in [1], characterized in that the phthalocyanine dye represented by Formula (III-2) is a phthalocyanine dye represented by Formula (III-2-1).

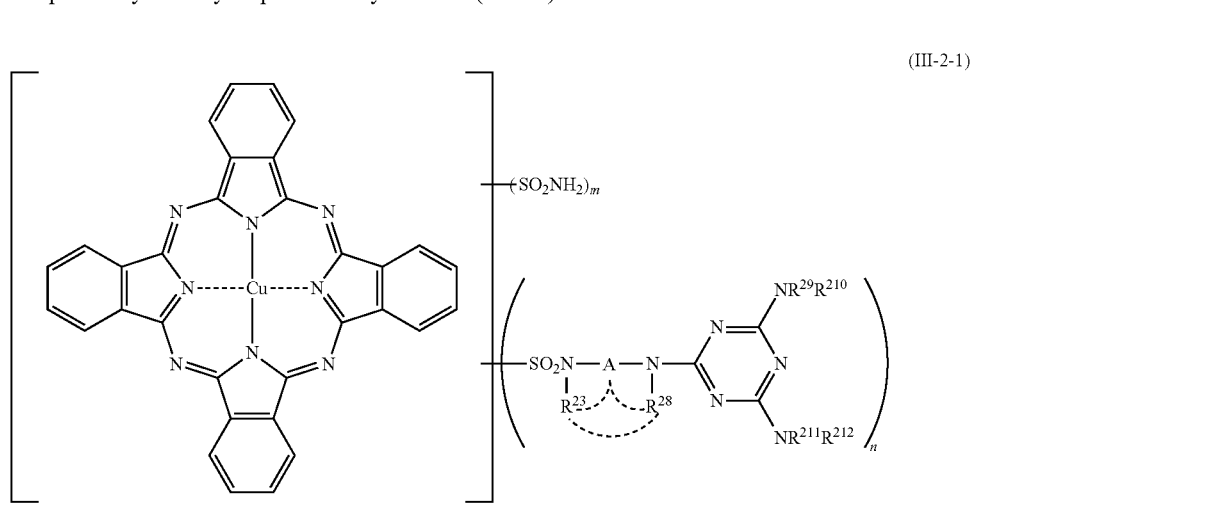

In Formula (III-2-1), $R^{27}$ and $R^{28}$ each independently represent a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heterocyclic group, or a substituted or unsubstituted alkenyl group. A represents a divalent linking group, and adjacent $R^{27}$, $R^{28}$, and A may be bound to each other to form a ring.

$R^{29}$, $R^{210}$, and $R^{211}$ each independently represent a hydrogen atom, or a substituted or unsubstituted alkyl group, and $R^{212}$ represents a sulfonate group, a carboxyl group, a substituted alkyl group, a substituted aryl group, or a substituted heterocyclic group, and has at least one ionic hydrophilic group as a substituent. m and n is 1 to 3, and the sum of m and n is 2 to 4.

[11] A coloring composition described in any one of [1] to [10], characterized in that in a phthalocyanine dye represented by Formula (1), $R_2$, $R_3$, $R_6$, $R_7$, $R_{10}$, $R_{11}$, $R_{14}$ and $R_{15}$ are a hydrogen atom.

[12] A coloring composition described in any one of [1] to [11], characterized in that in a phthalocyanine dye represented by Formula (1), $Z_1$, $Z_2$, $Z_3$, and $Z_4$ each independently represent a substituted or unsubstituted alkyl group, a substituted or unsubstituted aryl group, or a substituted or unsubstituted heterocyclic group.

[13] A coloring composition described in any one of [1] to [12], characterized in that in a phthalocyanine dye represented by Formula (1), l, m, n and p are 1.

[14] A coloring composition described in any one of [1] to [13], characterized in that in a phthalocyanine dye represented by Formula (1), $q_1$, $q_2$, $q_3$ and $q_4$ are 2.

[15] A coloring composition described in any one of [1] to [14], further including a compound represented by Formula (AB9).

(AB9)

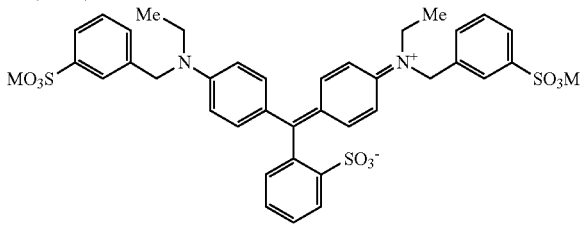

In Formula (AB9),

Me represents a methyl group, and M represents a hydrogen atom, a lithium, a sodium, a potassium, or an ammonium.

[16] A coloring composition described in any one of [1] to [15], characterized in that the mass ratio of a phthalocyanine dye represented by Formula (1) and the phthalocyanine dye represented by Formula (I-2), Formula (II-2), or Formula (III-2) is 50/50 to 10/90.

[17] A coloring composition described in any one of [1] to [16], characterized in that the content of the phthalocyanine dye represented by Formula (1) is 1% by mass to 20% by mass.

[18] A coloring composition described in any one of [1] to [17], characterized in that the mass ratio of the total amount of the phthalocyanine dye represented by Formula (1), and the phthalocyanine dye represented by Formula (I-2), Formula (II-2), or Formula (III-2) to the compound represented by Formula (AB9) is 90/10 to 99/1.

[19] An ink for inkjet recording including a coloring composition described in any one of [1] to [18].

Effects of the Invention

In accordance with an aspect I of the present invention, a coloring composition and an ink for inkjet recording which have a good ozone fastness and a high print density, and which is further excellent in storage stability over time can be provided.

In accordance with an aspect II of the present invention, a coloring composition and an ink for inkjet recording which have a good ozone fastness and a high print density, which suppress bronze gloss and achieve excellent color, and which is further excellent in light source dependency can be provided.

In accordance with an aspect III of the present invention, a coloring composition and an ink for inkjet recording which have a good ozone fastness and a high print density, which suppress bronze gloss and achieve excellent color, and which is further excellent in storage stability over time can be provided.

EMBODIMENTS FOR CARRYING OUT THE INVENTION

In the present invention, substituent group A is defined as follows.
(Group A of Substituents)
A halogen atom (e.g., a chlorine atom, a bromine atom); a straight chain or a branched chain alkyl group having 1 to 12 carbon atoms, an aralkyl group having 7 to 18 carbon atoms, an alkenyl group having 2 to 12 carbon atoms, a straight chain or a branched chain alkynyl group having 2 to 12 carbon atoms, a cycloalkyl group having 3 to 12 carbon atoms, which may have a side chain, a cycloalkenyl group having 3 to 12 carbon atoms, which may have a side chain (specific examples of such groups include methyl, ethyl, propyl, isopropyl, t-butyl, 2-methanesulfonylethyl, 3-phenoxypropyl, trifluoromethyl, cyclopentyl); aryl group (e.g., phenyl, 4-t-butilphenyl, 2,4-di-t-amylphenyl); heterocyclic ring group (e.g., imidazolyl, pyrazolyl, triazolyl, 2-furyl, 2-thienyl, 2-pyrimidinyl, 2-benzothiazolyl); alkyloxy group (e.g., methoxy, ethoxy, 2-methoxyethoxy, 2-methanesulfonylethoxy); aryloxy group (e.g., phenoxy, 2-methylphenoxy, 4-t-butylphenoxy, 3-nitrophenoxy, 3-t-butyloxycarbamoylphenoxy, 3-methoxycarbamoyl); acylamino group (e.g., acetamide, benzamide, 4-(3-t-butyl-4-hydroxyphenoxy)butanamido); alkylamino group (e.g., methylamino, butylamino, diethylamino, methylbutylamino); anilino group (e.g., phenylamino, 2-chloroanilino); ureido group (e.g., phenylureido, methylureido, N,N-dibutyl ureido); sulfamoylamino group (e.g., N,N-dipropylsulfamoylamino); alkylthio group (e.g., methylthio, octylthio, 2-phenoxyethylthio); arylthio group (e.g., phenylthio, 2-butoxy-5-t-octylphenylthio, 2-carboxyphenylthio); alkyloxycarbonylamino group (e.g., methoxycarbonylamino); sulfonamide group (e.g., methanesulfonamide, benzenesulfonamide, p-toluenesulfonamide, octadecane); carbamoyl group (e.g., N-ethylcarbamoyl, N,N-dibutyl carbamoyl); sulfamoyl group (e.g., N-ethylsulfamoyl, N,N-dipropylsulfamoyl, N,N-diethyl-sulfamoyl); sulfonyl group (e.g., methanesulfonyl, octanesulfonyl, benzenesulfonyl, toluenesulfonyl); alkyloxycarbonyl group (e.g., methoxycarbonyl, butyloxy carbonyl); heterocyclic oxy group (e.g., 1-phenyl tetrazol-5-oxy, 2-tetrahydropyranyloxy); azo group (e.g., phenylazo, 4-methoxyphenylazo, 4-pivaloylaminophenylazo 2-hydroxy-4-propanoylphenylazo); acyloxy groups (e.g., acetoxy); carbamoyloxy group (e.g., N-methylcarbamoyloxy, N-phenylcarbamoyloxy); silyloxy group (e.g., trimethylsilyloxy, dibutylmethylsilyloxy); aryloxycarbonylamino group (e.g., phenoxycarbonylamino); imide group (e.g., N-succinimide, N-phthalimide); heterocyclic thio group (e.g., 2-Benzothiazolylthio, 2,4-diphenoxy-1,3,5-triazole-6-thio, 2-pyridyldithio); sulfinyl group (e.g., 3-phenoxypropylsulfinyl); phosphonyl group (e.g., phenoxyphosphonyl, octyloxy phosphonyl, phenyl phosphonyl); aryloxycarbonyl group (e.g., phenoxycarbonyl); acyl group (e.g., acetyl, 3-phenylpropanoyl, benzoyl); ionic hydrophilic group (e.g., a carboxyl group, a sulfo group, and quaternary ammonium groups); other cyano group, a hydroxyl group, a nitro group, and an amino group.

The coloring composition of the present invention contains a phthalocyanine dye represented by the following Formula (1), and a phthalocyanine dye represented by the following Formula (I-2), the following Formula (II-2), or the following Formula (III-2).

[Phthalocyanine Dye Represented by the Formula (1)]
First, the phthalocyanine dye represented by Formula (1) will explain in detail.

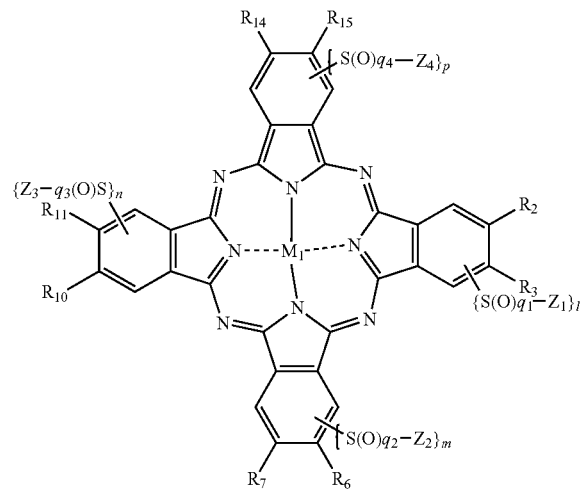

(1)

In Formula (1),
$R_2$, $R_3$, $R_6$, $R_7$, $R_{10}$, $R_{11}$, $R_{14}$ and $R_{15}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group. These groups may further have a substituent.

$Z_1$, $Z_2$, $Z_3$ and $Z_4$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. However, at least one of $Z_1$, $Z_2$, $Z_3$ and $Z_4$ has an ionic hydrophilic group as a substituent l, m, n, p, $q_1$, $q_2$, $q_3$ and $q_4$ each independently represent 1 or 2.

$M_1$ represents a hydrogen atom, a metal element, a metal oxide, a metal hydroxide or a metal halide.

In Formula (1), $R_2$, $R_3$, $R_6$, $R_7$, $R_{10}$, $R_{11}$, $R_{14}$ and $R_{15}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group. These groups may further have a substituent.

Examples of the halogen atom represented by $R_2$, $R_3$, $R_6$, $R_7$, $R_{10}$, $R_{11}$, $R_{14}$ and $R_{15}$ include a fluorine atom, a chlorine atom and a bromine atom.

An alkyl group represented by $R_2$, $R_3$, $R_6$, $R_7$, $R_{10}$, $R_{11}$, $R_{14}$ and $R_{15}$ includes an alkyl group having a substituent group and an unsubstituted alkyl group. As an alkyl group, the alkyl group having 1 to 12 carbon atoms when excluding the substituent is preferred. Examples of the substituent group include a hydroxyl group, an alkoxy group, a cyano group, a halogen atom, and an ionic hydrophilic group. Examples of the alkyl group include methyl, ethyl, butyl, isopropyl, t-butyl, hydroxyethyl, methoxyethyl, cyanoethyl, trifluoromethyl, 3-sulfopropyl, and 4-sulfobutyl.

A cycloalkyl group represented by $R_2$, $R_3$, $R_6$, $R_7$, $R_{10}$, $R_{11}$, $R_{14}$ and $R_{15}$ includes a cycloalkyl group having a substituent group and an unsubstituted cycloalkyl group. As a cycloalkyl group, the cycloalkyl group having 5 to 12 carbon atoms when excluding the substituent is preferred. An example of the substituent group includes an ionic hydrophilic group. An example of the cycloalkyl group includes a cyclohexyl group.

An alkenyl group represented by $R_2$, $R_3$, $R_6$, $R_7$, $R_{10}$, $R_{11}$, $R_{14}$ and $R_{15}$ includes an alkenyl group having a substituent group and an unsubstituted alkenyl group. As an alkenyl group, the alkenyl group having 2 to 12 carbon atoms when excluding the substituent is preferred. An example of the substituent group includes an ionic hydrophilic group. Examples of the alkenyl group include a vinyl group, allyl group, or the like.

An aralkyl group represented by $R_2$, $R_3$, $R_6$, $R_7$, $R_{10}$, $R_{11}$, $R_{14}$ and $R_{15}$ includes an aralkyl group having a substituent group and an unsubstituted aralkyl group. As an aralkyl group, the aralkyl group having 7 to 12 carbon atoms when excluding the substituent is preferred. An example of the substituent group includes an ionic hydrophilic group. Examples of the aralkyl group include a benzyl group, and 2-phenethyl group.

An aryl group represented by $R_2$, $R_3$, $R_6$, $R_7$, $R_{10}$, $R_{11}$, $R_{14}$ and $R_{15}$ includes an aryl group having a substituent group and an unsubstituted aryl group. As an aryl group, the aryl group having 6 to 12 carbon atoms when excluding the substituent is preferred. Examples of the substituent group include an alkyl group, an alkoxy group, a halogen atom, alkylamino group, and an ionic hydrophilic group. Examples of the aryl group include phenyl, p-tolyl, p-methoxyphenyl, o-chlorophenyl, and m-(3-sulfopropylamino)phenyl.

A heterocyclic group represented by $R_2$, $R_3$, $R_6$, $R_7$, $R_{10}$, $R_{11}$, $R_{14}$ and $R_{15}$ includes a heterocyclic group having a substituent group and an unsubstituted heterocyclic group. As a heterocyclic group, 5-membered or 6-membered heterocyclic group is preferred. An example of the substituent group includes an ionic hydrophilic group. Examples of the heterocyclic group include 2-pyridyl group, 2-thienyl group, and 2-furyl group.

An alkylamino group represented by $R_2$, $R_3$, $R_6$, $R_7$, $R_{10}$, $R_{11}$, $R_{14}$ and $R_{15}$ includes an alkylamino group having a substituent group and an unsubstituted alkylamino group. As an alkylamino group, the alkylamino group having carbon atoms of 1 to 6 when excluding the substituent is preferred. An example of the substituent group includes an ionic hydrophilic group. Examples of the alkylamino group include a methylamino group, and a diethylamino group.

An alkoxy group represented by $R_2$, $R_3$, $R_6$, $R_7$, $R_{10}$, $R_{11}$, $R_{14}$ and $R_{15}$ includes an alkoxy group having a substituent group and an unsubstituted alkoxy group. As an alkoxy group, the alkoxy group having 1 to 12 carbon atoms when excluding the substituent is preferred. Examples of the substituent group include an alkoxy group, a hydroxyl group, and an ionic hydrophilic group. Examples of the alkoxy group include a methoxy group, an ethoxy group, an isopropoxy group, a methoxyethoxy group, a hydroxyethoxy group, and 3-carboxypropoxy group.

An aryloxy group represented by $R_2$, $R_3$, $R_6$, $R_7$, $R_{10}$, $R_{11}$, $R_{14}$ and $R_{15}$ includes an aryloxy group having a substituent group and an unsubstituted aryloxy group. As an aryloxy group, the aryloxy group having 6 to 12 carbon atoms when excluding the substituent is preferred. Examples of the substituent group include an alkoxy group and an ionic hydrophilic group. Examples of the aryloxy group include a phenoxy group, p-methoxyphenoxy group, and o-methoxyphenoxy group.

An amide group represented by $R_2$, $R_3$, $R_6$, $R_7$, $R_{10}$, $R_{11}$, $R_{14}$ and $R_{15}$ includes an amide group having a substituent group and an unsubstituted amide group. As an amide group, the amide group having 2 to 12 carbon atoms when excluding the substituent is preferred. An example of the substituent group includes an ionic hydrophilic group. Examples of the amide group include an acetamide group, a propionamide group, benzamide group, and 3,5-disulfobenzamide group.

An arylamino group represented by $R_2$, $R_3$, $R_6$, $R_7$, $R_{10}$, $R_{11}$, $R_{14}$ and $R_{15}$ includes an arylamino group having a substituent group and an unsubstituted arylamino group. As an arylamino group, the arylamino group having 6 to 12 carbon atoms when excluding the substituent is preferred. Examples of the substituent group include a halogenic atom and an ionic hydrophilic group. Examples of the arylamino group include an anilino group and 2-chloroanilino group.

An ureido group represented by $R_2$, $R_3$, $R_6$, $R_7$, $R_{10}$, $R_{11}$, $R_{14}$ and $R_{15}$ includes an ureido group having a substituent group and an unsubstituted ureido group. As an ureido group, the ureido group having 1 to 12 carbon atoms when excluding the substituent is preferred. Examples of the substituent group include an alkyl group and an aryl group. Examples of the ureido group include 3-methylureido group, 3,3-dimethylureido group and 3-phenylureido group.

A sulfamoylamino group represented by $R_2$, $R_3$, $R_6$, $R_7$, $R_{10}$, $R_{11}$, $R_{14}$ and $R_{15}$ includes a sulfamoylamino group having a substituent group and an unsubstituted sulfamoylamino group. An example of the substituent group includes an alkyl group. An example of the sulfamoylamino group includes N,N-dipropylsulfamoylamino group.

An alkylthio group represented by $R_2$, $R_3$, $R_6$, $R_7$, $R_{10}$, $R_{11}$, $R_{14}$ and $R_{15}$ includes an alkylthio group having a substituent group and an unsubstituted alkylthio group. As an alkylthio group, the alkylthio group having 1 to 12 carbon atoms when excluding the substituent is preferred. An example of the substituent group includes an ionic hydrophilic group. Examples of the alkylthio group include a methylthio group and an ethylthio group.

An arylthio group represented by $R_2$, $R_3$, $R_6$, $R_7$, $R_{10}$, $R_{11}$, $R_{14}$ and $R_{15}$ includes an arylthio group having a substituent group and an unsubstituted arylthio group. As an arylthio group, the arylthio group having 6 to 12 carbon atoms when excluding the substituent is preferred. Examples of the substituent group include an alkyl group and an ionic hydrophilic group. Examples of the arylthio group include a phenylthio group and a p-tolylthio group.

An alkoxycarbonylamino group represented by $R_2$, $R_3$, $R_6$, $R_7$, $R_{10}$, $R_{11}$, $R_{14}$ and $R_{15}$ includes an alkoxycarbonylamino group having a substituent group and an unsubstituted alkoxycarbonylamino group. As an alkoxycarbonylamino group, the alkoxycarbonylamino group having 2 to 12 carbon atoms when excluding the substituent is preferred. An example of the substituent group includes an ionic hydrophilic group. An example of the alkoxycarbonylamino group includes an ethoxycarbonylamino group.

A sulfonamide group represented by $R_2$, $R_3$, $R_6$, $R_7$, $R_{10}$, $R_{11}$, $R_{14}$ and $R_{15}$ includes a sulfonamide group having a substituent group and an unsubstituted sulfonamide group. As a sulfonamide group, the sulfonamide group having 1 to 12 carbon atoms when excluding the substituent is preferred. An example of the substituent group includes an ionic hydrophilic group. Examples of the sulfonamide group include methanesulfonamide, benzenesulfonamide, and 3-carboxybenzenesulfonamide.

A carbamoyl group represented by $R_2$, $R_3$, $R_6$, $R_7$, $R_{10}$, $R_{11}$, $R_{14}$ and $R_{15}$ includes a carbamoyl group having a substituent group and an unsubstituted carbamoyl group. An example of the substituent group includes an alkyl group. Examples of the carbamoyl group include a methylcarbamoyl group and a dimethylcarbamoyl group.

A sulfamoyl group represented by $R_2$, $R_3$, $R_6$, $R_7$, $R_{10}$, $R_{11}$, $R_{14}$ and $R_{15}$ includes a sulfamoyl group having a substituent group and an unsubstituted sulfamoyl group. Examples of the substituent group include an alkyl group and an aryl group. Examples of the sulfamoyl group include a dimethylsulfamoyl group and a di-(2-hydroxyethyl)sulfamoyl group, and a phenylsulfamoyl group.

An alkoxycarbonyl group represented by $R_2$, $R_3$, $R_6$, $R_7$, $R_{10}$, $R_{11}$, $R_{14}$ and $R_{15}$ includes an alkoxycarbonyl group having a substituent group and an unsubstituted alkoxycarbonyl group. As an alkoxycarbonyl group, the alkoxycarbonyl group having 2 to 12 carbon atoms when excluding the substituent is preferred. An example of the substituent group includes an ionic hydrophilic group. Examples of the alkoxycarbonyl group include a methoxycarbonyl group and an ethoxycarbonyl group.

A heterocyclic oxy group represented by $R_2$, $R_3$, $R_6$, $R_7$, $R_{10}$, $R_{11}$, $R_{14}$ and $R_{15}$ includes a heterocyclic oxy group having a substituent group and an unsubstituted heterocyclic oxy group. As a heterocyclic oxy group, the heterocyclic oxy group having 5-membered or 6-membered heterocyclic ring is preferred. Examples of the substituent group include a hydroxyl group and an ionic hydrophilic group. An example of the heterocyclic oxy group includes 2-tetrahydropiranyl oxy group.

An azo group represented by $R_2$, $R_3$, $R_6$, $R_7$, $R_{10}$, $R_{11}$, $R_{14}$ and $R_{15}$ includes an azo group having a substituent group and an unsubstituted azo group. An example of the azo group includes p-nitrophenylazo group.

An acyloxy group represented by $R_2$, $R_3$, $R_6$, $R_7$, $R_{10}$, $R_{11}$, $R_{14}$ and $R_{15}$ includes an acyloxy group having a substituent group and an unsubstituted acyloxy group. As an acyloxy group, the acyloxy group having 1 to 12 carbon atoms when excluding the substituent is preferred. An example of the substituent group includes an ionic hydrophilic group. Examples of the acyloxy group include an acetoxy group and a benzoyloxy group.

A carbamoyloxy group represented by $R_2$, $R_3$, $R_6$, $R_7$, $R_{10}$, $R_{11}$, $R_{14}$ and $R_{15}$ includes a carbamoyloxy group having a substituent group and an unsubstituted carbamoyloxy group. An example of the substituent group includes an alkyl group. An example of the carbamoyloxy group includes N-methyl carbamoyloxy group.

A silyloxy group represented by $R_2$, $R_3$, $R_6$, $R_7$, $R_{10}$, $R_{11}$, $R_{14}$ and $R_{15}$ includes a silyloxy group having a substituent group and an unsubstituted silyloxy group. An example of the substituent group includes an alkyl group. An example of the silyloxy group includes trimethylsilyloxy group.

An aryloxycarbonyl group represented by $R_2$, $R_3$, $R_6$, $R_7$, $R_{10}$, $R_{11}$, $R_{14}$ and $R_{15}$ includes an aryloxycarbonyl group having a substituent group and an unsubstituted aryloxycarbonyl group. As an aryloxycarbonyl group, the aryloxycarbonyl group having 7 to 12 carbon atoms when excluding the substituent is preferred. An example of the substituent group includes an ionic hydrophilic group. An example of the aryloxycarbonyl group includes a phenoxycarbonyl group.

An aryloxycarbonylamino group represented by $R_2$, $R_3$, $R_6$, $R_7$, $R_{10}$, $R_{11}$, $R_{14}$ and $R_{15}$ includes an aryloxycarbonylamino group having a substituent group and an unsubstituted aryloxycarbonylamino group. As an aryloxycarbonylamino group, the aryloxycarbonylamino group having 7 to 12 carbon atoms when excluding the substituent is preferred. An example of the substituent group includes an ionic hydrophilic group. An example of the aryloxycarbonylamino group includes a phenoxycarbonylamino group.

An imide group represented by $R_2$, $R_3$, $R_6$, $R_7$, $R_{10}$, $R_{11}$, $R_{14}$ and $R_{15}$ includes an imide group having a substituent group and an unsubstituted imide group. Examples of the imide group include N-phthalimide group and N-succinimide group.

A heterocyclic thio group represented by $R_2$, $R_3$, $R_6$, $R_7$, $R_{10}$, $R_{11}$, $R_{14}$ and $R_{15}$ includes a heterocyclic thio group having a substituent group and an unsubstituted heterocyclic thio group. As a heterocyclic thio group, the heterocyclic thio group having 5-membered or 6-membered heterocyclic ring is preferred. An example of the substituent group includes an ionic hydrophilic group. An example of the heterocyclic thio group includes 2-pyridylthio group.

A phosphoryl group represented by $R_2$, $R_3$, $R_6$, $R_7$, $R_{10}$, $R_{11}$, $R_{14}$ and $R_{15}$ includes a phosphoryl group having a substituent group and an unsubstituted azo group. Examples of the phosphoryl group include phenoxyphosphoryl group and phenylphosphoryl group.

An acyl group represented by $R_2$, $R_3$, $R_6$, $R_7$, $R_{10}$, $R_{11}$, $R_{14}$ and $R_{15}$ includes an acyl group having a substituent group and an unsubstituted acyl group. As an acyl group, the aryloxycarbonyl group having 1 to 12 carbon atoms when excluding the substituent is preferred. An example of the substituent group includes an ionic hydrophilic group. Examples of the acyl group include an acetyl group and a benzoyl group.

An ionic hydrophilic group represented by $R_2$, $R_3$, $R_6$, $R_7$, $R_{10}$, $R_{11}$, $R_{14}$ and $R_{15}$ includes a sulfo group, a carboxyl group, and a quaternary ammonium group, or the like. As an ionic hydrophilic group, a sulfo group and a carboxyl group are preferred, and particularly, a sulfo group is preferred. The carboxyl group and the sulfo group may be in the form of a salt, and examples of the counter ion for forming the salt include an alkali metal ion (e.g., sodium ion, potassium ion) and organic cations (e.g., tetramethylguanidium ions).

As $R_2$, $R_3$, $R_6$, $R_7$, $R_{10}$, $R_{11}$, $R_{14}$ and $R_{15}$, among them, a hydrogen atom, a halogen atom, an alkyl group, an aryl group, a cyano group, an alkoxy group, an amide group, a ureido group, a sulfonamide group, a carbamoyl group, a sulfamoyl group, and an alkoxycarbonyl group are preferred, particularly, a hydrogen atom, a halogen atom, and a cyano group are more preferred, and a hydrogen atom is most preferred.

In Formula (1), $Z_1$, $Z_2$, $Z_3$ and $Z_4$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. However, at least one of $Z_1$, $Z_2$, $Z_3$ and $Z_4$ has an ionic hydrophilic group as a substituent. Examples of the substituent include the substituent described in the above-mentioned substituent group A.

An alkyl group represented by $Z_1$, $Z_2$, $Z_3$ and $Z_4$ includes an alkyl group having a substituent group and an unsubstituted alkyl group. As an alkyl group, the alkyl group having 1 to 12 carbon atoms when excluding the substituent is preferred. Examples of the substituent group include a hydroxyl group, an alkoxy group, a cyano group, an alkylamino group (RNH—, RR'N—), a carbamoyl group (—CONHR), a sulfamoyl group (—SO$_2$NHR, —SO$_2$NRR'), a sulfonylamino group (—NHSO$_2$R), —SONHR group, —SONRR' group, a halogen atom, and an ionic hydrophilic group (In addition, The R,R' represents an alkyl group and a phenyl group, and they may also have a substituent. Examples of the substituent include an alkylamino group, a hydroxyl group, an ionic hydrophilic group, or the like. R,R' may form a ring by a chemical bond). Examples of the alkyl group include methyl, ethyl, butyl, n-propyl, isopropyl, t-butyl, hydroxyethyl, methoxyethyl, cyanoethyl, trifluoromethyl, 3-sulfopropyl, and 4-sulfobutyl.

A cycloalkyl group represented by $Z_1$, $Z_2$, $Z_3$ and $Z_4$ includes a cycloalkyl group having a substituent group and an unsubstituted cycloalkyl group. As a cycloalkyl group, the cycloalkyl group having 5 to 12 carbon atoms when excluding the substituent is preferred. An example of the substituent group includes an ionic hydrophilic group. An example of the cycloalkyl group includes a cyclohexyl group.

An alkenyl group represented by $Z_1$, $Z_2$, $Z_3$ and $Z_4$ includes an alkenyl group having a substituent group and an unsubstituted alkenyl group. As an alkenyl group, the alkenyl group having 2 to 12 carbon atoms when excluding the substituent is preferred. An example of the substituent group includes an ionic hydrophilic group. Examples of the alkenyl group include a vinyl group, allyl group, or the like.

An aralkyl group represented by $Z_1$, $Z_2$, $Z_3$ and $Z_4$ includes an aralkyl group having a substituent group and an unsubstituted aralkyl group. As an aralkyl group, the aralkyl group having 7 to 12 carbon atoms when excluding the substituent is preferred. An example of the substituent group includes an ionic hydrophilic group. Examples of the aralkyl group include a benzyl group and 2-phenethyl group.

An aryl group represented by $Z_1$, $Z_2$, $Z_3$ and $Z_4$ includes an aryl group having a substituent group and an unsubstituted aryl group. As an aryl 1 group, the aryl group having 6 to 12 carbon atoms when excluding the substituent is preferred. Examples of the aryl group include phenyl, p-tolyl, p-methoxyphenyl, o-chlorophenyl, m-(3-sulfopropylamino)phenyl, and m-sulfophenyl. Examples of the substituent include an alkyl group (R—), an alkoxy group (RO—), an alkylamino group (RNH—, RR'N—), a carbamoyl group (—CONHR), a sulfamoyl group (—SO$_2$NHR), a sulfonylamino group (—NHSO$_2$R), a halogen atom, and an ionic hydrophilic group (Further, the R,R' represents an alkyl group and a phenyl group, and R,R' may have an ionic hydrophilic group).

A heterocyclic group represented by $Z_1$, $Z_2$, $Z_3$ and $Z_4$ includes a heterocyclic group having a substituent group and an unsubstituted heterocyclic group, and further the heterocyclic group may form a condensed ring with another ring. As a heterocyclic group, 5-membered or 6-membered heterocyclic group is preferred. As a heterocyclic group, 5-membered or 6-membered heterocyclic group is preferred. The heterocyclic group may also form a condensed ring with another ring. Examples of the heterocyclic group, the substitution position of the heterocyclic ring is not limited, each independently include imidazole, benzoimidazole, pyrazole, benzopyrazole, triazole, thiazole, benzothiazole, isothiazole, benzoisothiazole, oxazole, benzoxazole, thiadiazole, oxadiazole, pyrrole, benzo pyrrole, indole, isoxazole, benzoisoxazole, thiophene, benzothiophene, furan, benzofuran, pyridine, quinoline, isoquinoline, pyridazine, pyrimidine, pyrazine, cinnoline, phthalazine, quinazoline, quinoxaline, triazine, and the like. Examples of the substituent include an alkyl group (R—), an aryl group (R—), an alkoxy group (RO—), an alkylamino group (RNH—, RR'N—), a carbamoyl group (—CONHR), a sulfamoyl group (—SO$_2$NHR), a sulfonylamino group (—NHSO$_2$R), a sulfonyl group (—SO$_2$R), an acylamino group (—NHCOR), a halogen atom, and an ionic hydrophilic group (Further, the R,R' represents an alkyl group and an aryl group, and R,R' may have an ionic hydrophilic group or a substituent group having an ionic hydrophilic group).

As $Z_1$, $Z_2$, $Z_3$ and $Z_4$, a substituted or unsubstituted alkyl group, a substituted or unsubstituted aryl group, and a substituted or unsubstituted heterocyclic group are preferred, a substituted alkyl group, a substituted aryl group, and a substituted heteroaryl group are more preferred, and a substituted alkyl is even more preferred.

At least one of $Z_1$, $Z_2$, $Z_3$ and $Z_4$ has an ionic hydrophilic group as a substituent. Examples of the ionic hydrophilic group as a substituent include a sulfo group, a carboxyl group, and a quaternary ammonium group, or the like. As the corresponding ionic hydrophilic group, a carboxyl group and a sulfo group are preferred, and particularly, a sulfo group is preferred. The carboxyl group and the sulfo group may be in the form of a salt, and examples of the counter ion for forming the salt include an alkali metal ion (e.g., sodium ion, potassium ion) and organic cations (e.g., tetramethylguanidium ions).

In Formula (1), l, m, n and p each independently represent 1 or 2. That is, $4 \leq l+m+n+p \leq 8$ are satisfied. Preferably, $4 \leq l+m+n+p \leq 6$ is satisfied, and most preferably, each is in the case of 1 (l=m=n=p=1).

In Formula (1), q1, q2, q3 and q4 each independently represent 1 or 2. In particular, $q_1=q_2=q_3=q_4=2$ is preferred.

In Formula (1), $M_1$ represents a hydrogen atom, a metal element, a metal oxide, a metal hydroxide or a metal halide, respectively.

Preferred examples of $M_1$ include, in addition to a hydrogen atom, a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi, and the like. Among them, Cu, Ni, Zn, Al, and the like are particularly preferred, and Cu is most preferred. As a metal oxide, VO, GeO and the like may be preferred. Further, as a metal hydroxide, Si(OH)$_2$, Cr(OH)$_2$, Sn(OH)$_2$ and the like may be preferred. Moreover, as a metal halide, AlCl, SiCl$_2$, VCl, VCl$_2$, VOCl, FeCl, GaCl, ZrCl, and the like may be preferred.

[Phthalocyanine Dye Represented by Formula (I-2)]

Next, the phthalocyanine dye represented by Formula (I-2) will be described in detail.

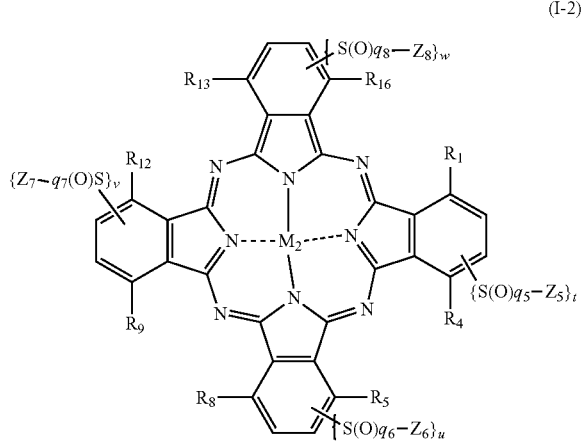

(I-2)

In Formula (I-2), $R_1, R_4, R_5, R_8, R_9, R_{12}, R_{13}$ and $R_{16}$ are each independently the same as $R_2, R_3, R_6, R_7, R_{10}, R_{11}, R_{14}$ and $R_{15}$ in the Formula (1) as described above.

$Z_5, Z_6, Z_7$ and $Z_8$ are each independently the same as $Z_1, Z_2, Z_3$ and $Z_4$ in the Formula (1) as described above.

t, u, v, w, $q_5, q_6, q_7$ and $q_8$ each independently represent 1 or 2.

$M_2$ is the same as $M_1$ in the Formula (1).

$R_1, R_4, R_5, R_8, R_9, R_{12}, R_{13}$ and $R_{16}$ are each independently the same as $R_6, R_7, R_{10}, R_{11}, R_{14}$ and $R_{15}$ in the Formula (1), and a hydrogen atom, a halogen atom, an alkyl group, an aryl group, a cyano group, an alkoxy group, an amide group, an ureido group, a sulfonamide group, a carbamoyl group, a sulfamoyl group and an alkoxycarbonyl group are preferred, particularly a hydrogen atom, a halogen atom, and a cyano group are more preferred, and a hydrogen atom is most preferred.

Such groups may also have a substituent. Examples of the substituent include the substituents described in the above mentioned Substituent Group A.

$Z_5, Z_6, Z_7$ and $Z_8$ are each independently the same as $Z_1, Z_2, Z_3$ and $Z_4$ in the Formula (1) as described above.

As $Z_5, Z_6, Z_7$ and $Z_8$, a substituted or unsubstituted alkyl group, a substituted or unsubstituted aryl group, a substituted or unsubstituted heterocyclic group are preferred, and a substituted alkyl group, a substituted aryl group, and a substituted heterocyclic group are more preferred, and a substituted alkyl group is far more preferred. Further, at least one of the substituents that the substituted alkyl group has is most preferably —SONHR group in the viewpoint of ozone fastness.

The ionic hydrophilic group that at least one of $Z_5, Z_6, Z_7$ and $Z_8$ has as a substituent is the same as the ionic hydrophilic group that $Z_1, Z_2, Z_3$ and $Z_4$ in the Formula (1) have as a substituent, and the preferred examples are also the same.

In Formula (I-2), t, u, v and w each independently represent 1 or 2. That is, 4≤t+u+v+w≤8 are satisfied. Preferably, 4≤t+u+v+w≤6 is satisfied, and most preferably, each is in the case of 1 (t=u=v=w=1).

In Formula (I-2), $q_5, q_6, q_7$ and $q_8$ each independently represent 1 or 2. In particular, $q_5=q_6=q_7=q_8=2$ is preferred.

$M_2$ is the same as $M_1$ in the Formula (1), and the preferred examples are also the same.

[Synthesis of Phthalocyanine Dye]

The phthalocyanine derivatives used in the present invention may be, for example, synthesized by the methods described, cited in Shirai Kobayashi co-authored "Phthalocyanine—Chemistry and Function—" (PP. 1 to 62), issued by IPC Co., Ltd., C. C. Leznoff-A. B. P. Lever co-authored "Phthalocyanines Properties and Applications" (PP. 1 to 54), issued by VCH, or the like, or by combining the methods similar to those.

Hereinafter, the synthesis of the phthalocyanine dye represented by Formula (I-2) will be described as an example.

Among the phthalocyanine dyes represented by the Formula (I-2) of the present invention, the compound in which $R_1, R_4, R_5, R_8, R_9, R_{12}, R_{13}$ and $R_{16}$ are hydrogen, and $q_5, q_6, q_7$ and $q_8$ are 2 may be, for example, synthesized by reacting a phthalonitrile derivative represented by the Formula (V) and/or a diiminoisoindoline derivative represented by the Formula (VI) and a metal derivative represented by the Formula M-(Y) below.

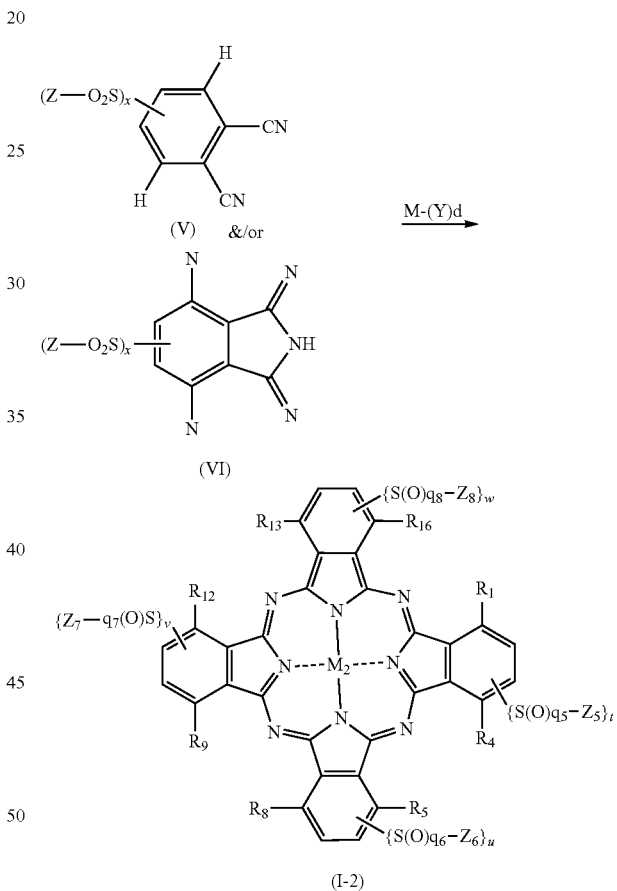

(I-2)

In Formula (I-2), $R_1, R_4, R_5, R_8, R_9, R_{12}, R_{13}$ and $R_{16}$ are each independently the same as $R_2, R_3, R_6, R_7, R_{10}, R_{11}, R_{14}$ and $R_{15}$ in the Formula (1) as described above.

$Z_5, Z_6, Z_7$ and $Z_8$ are each independently the same as $Z_1, Z_2, Z_3$ and $Z_4$ in the Formula (1) as described above.

t, u, v, w, $q_5, q_6, q_7$ and $q_8$ each independently represent 1 or 2.

M and $M_2$ are the same as $M_1$ in the Formula (1), and $M=M_2$.

The x in the Formula (V) and/or the Formula (VI) is the same as t, u, v, and w in the Formula (I-2). Z represents the substituent corresponding to $Z_5, Z_6, Z_7$ and $Z_8$.

Y represents a monovalent or a divalent ligand such as a halogen atom, an acetate anion, an acetylacetonate, oxygen, and the like, and d is an integer of 1 to 4.

Examples of metal derivatives represented by M-(Y)d include halides, carboxylic acid derivatives, sulfates, nitrates, carbonyl compounds, oxides, complexes, and the like of Al, Si, Ti, V, Mn, Fe, Co, Ni, Cu, Zn, Ge, Ru, Rh, Pd, In, Sn, Pt, and Pb. Specific examples thereof include copper chloride, copper bromide, copper iodide, nickel chloride, nickel bromide, nickel acetate, cobalt chloride, cobalt bromide, cobalt acetate, iron chloride, zinc chloride, zinc bromide, zinc iodide, zinc acetate, vanadium chloride, vanadium oxy trichloride, palladium chloride, palladium acetate, aluminum chloride, manganese chloride, manganese acetate, acetylacetone manganese, manganese chloride, lead chloride, lead acetate, indium chloride, titanium chloride, tin chloride and the like.

As for the used amounts of the metal derivatives and the phthalonitrile compound represented by Formula (V), a molar ratio of 1:3 to 1:6 is preferred. Further, as for the used amounts of the metal derivatives and the diiminoisoindiline derivatives represented by Formula (VI), a molar ratio of 1:3 to 1:6 is preferred.

The reaction is usually performed in the presence of solvents. As the solvent, organic solvents having a boiling point of 80° C. or more, preferably 130° C. or more are used. For example, n-amyl alcohol, n-quisanol, cyclohexanol, 2-methyl-1-pentanol, 1-heptanol, 2-heptanol, 1-octanol, 2-ethylhexanol, benzyl alcohol, ethylene glycol, propylene glycol, ethoxy ethanol, propoxy ethanol, butoxy ethanol, dimethylamino ethanol, diethylamino ethanol, trichlorobenzene, chloronaphthalene, sulfolane, nitrobenzene, quinoline, urea and the like factors. The used amount of the solvent is 1 to 100 times by mass, preferably 5 to 20 times by mass of the phthalonitrile compound.

In the reaction, 1,8-diazabicyclo[5.4.0]-7-undecene (DBU) or ammonium molybdate may be added as a catalyst. The added amount is 0.1 times by mole to 10 times by mole, preferably 0.5 times by mole to 2 times by mole based on 1 mole of the phthalonitrile compound and/or diiminoisoindoline derivatives.

The reaction temperature is in the range of 80° C. to 300° C., preferably in the range of 100° C. to 250° C., particularly preferably in the range of 130° C. to 230° C. If the temperature is less than 80° C., the reaction rate is extremely slow. If the temperature exceeds 300° C. the decomposition of the phthalocyanine compound is likely to occur.

The reaction time is in the range of 2 to 20 hours, preferably in the range of 5 to 15 hours, and particularly preferably in the range of 5 to 10 hours. If the reaction time is less than 2 hours, the unreacted raw materials are left in abundance. If the reaction time exceeds 20 hours, the decomposition of the phthalocyanine compound is likely to occur.

The product obtained by such a reaction is treated according to the method of post-processing of a conventional organic synthetic reaction, purified or not purified before being used as a product. That is, for example, without purifying the thing which is liberated from the reaction system, or the operation of purification is performed alone or in combination thereof by recrystallization, or column chromatography (e.g., gel permission chromatography (SEPHADEX™ LH-20: manufactured by Pharmacia Co.), or the like to provide the products. After completion of the reaction, the reaction solvent was distilled off, or poured onto water or ice without distilling off, or neutralized or not neutralized, and the thing liberated is not purified, or the operation of purification is performed alone or in combination thereof by recrystallization, or column chromatography, or the like to provide the products. Further, after completion of the reaction, the reaction solvent was distilled off, or poured onto water or ice without distilling off, or neutralized or not neutralized, and the thing extract with an organic solvent/water solution is not purified, or the operation of purification is performed alone or in combination thereof by crystallization, or column chromatography, or the like to provide the products.

In the thus-obtained phthalocyanine dye represented by the Formula (I-2), the phthalocyanine compounds (e.g., in the case of t=u=v=w=1) in which $R_1$, $R_4$, $R_5$, $R_8$, $R_9$, $R_{12}$, $R_{13}$ and $R_{16}$ are hydrogen, and $q_5$, $q_6$, $q_7$ and $q_8$ are 2 are usually isomers in each substitution site of $Ra(SO_2—Z_5)$, $Rb(SO_2—Z_6)$, $Rc(SO_2—Z_7)$, $Rd(SO_2—Z_8)$, which is a mixture of compounds represented by the Formulas (a)-1 to (a)-4 below.

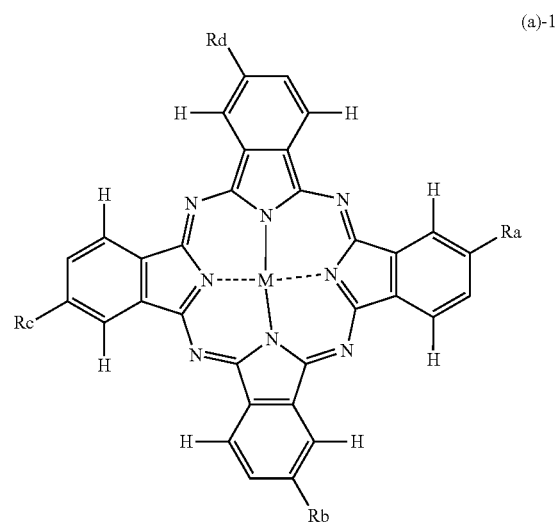

(a)-1

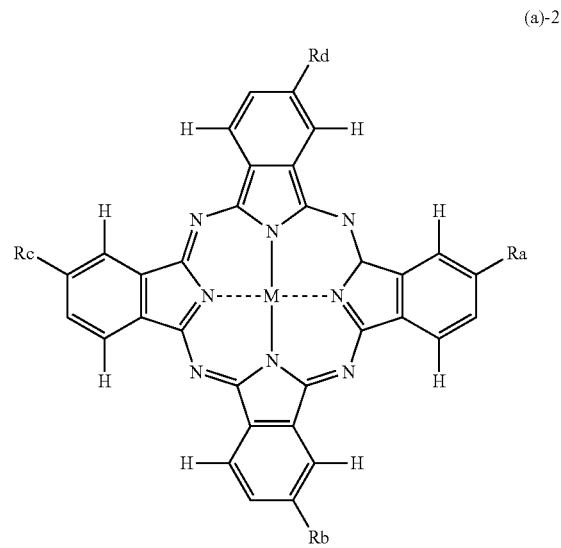

(a)-2

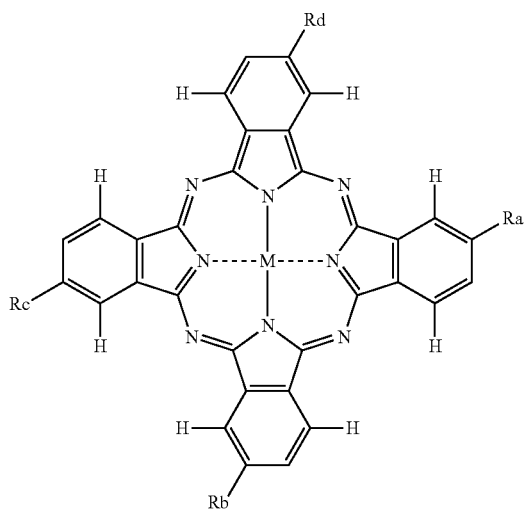

(a)-3

That is, the compound represented by the Formula (a)-1 to (a)-4 is β-substituted type (A phthalocyanine compound having a specific substituent of position 2 and/or 3, position 6 and/or 7, position 10 and/or 11, position 14 and/or 15 in the case where $R_1$ to $R_{16}$ of the Formula (IV) each correspond to the positions of 1 to 16).

The phthalocyanine dye represented by the Formula (1) of the present invention corresponds to α-substituted type (a phthalocyanine compound having a specific substituent of position 1 and/or 4, position 5 and/or 8, position 9 and/or 12, position 13 and/or 16), and the phthalocyanine dye represented by the Formula (I-2) corresponds to β-substituted type (a phthalocyanine compound having a specific substituent of position 2 and/or 3, position 6 and/or 7, position 10 and/or 11, position 14 and/or 15). In the present invention, even in any substituted type, it is important to have a specific substituent represented by —SO—Z and/or —SO$_2$—Z for good fastness.

Specific examples of the phthalocyanine dye represented by the Formula (1) or the Formula (I-2) are illustrated using the Formula (IV) below, but the phthalocyanine dye used in the present invention is not limited to the following examples.

(a)-4

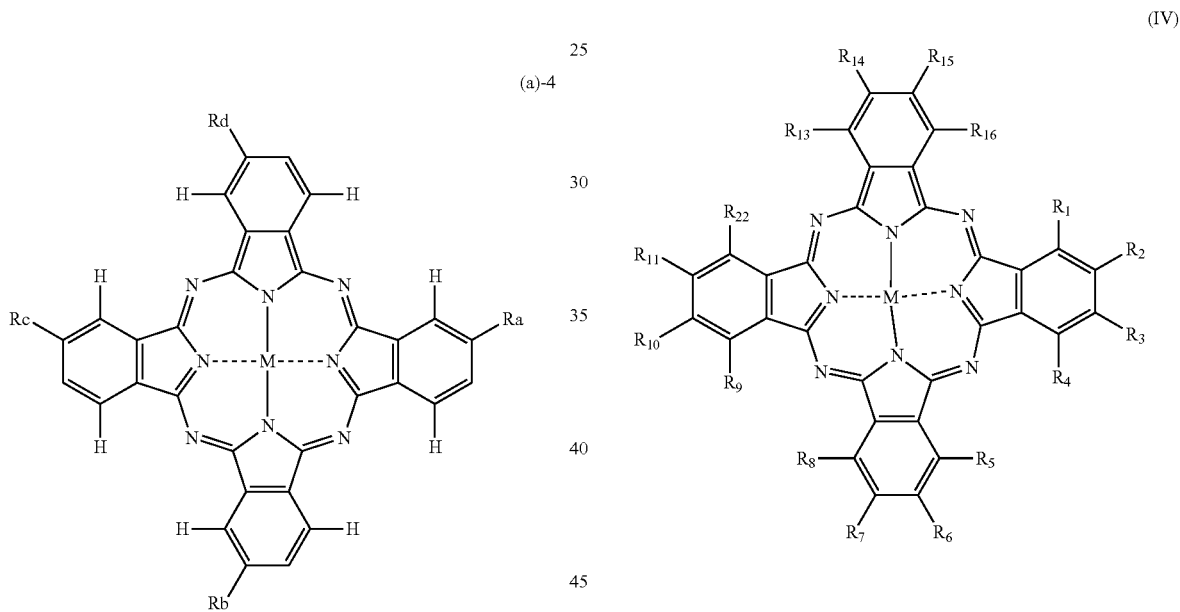

(IV)

Examples of the Phthalocyanine Dye Represented by the Formula (1)

TABLE 1

| Exemplary Compound | M | $R_1 R_4$ | $R_2 R_3$ | $R_5 R_8$ | $R_6 R_7$ |
|---|---|---|---|---|---|
| 101 α | Cu | H, —SO—(CH$_2$)$_3$SO$_3$Na | H, H | H, —SO—(CH$_2$)$_3$SO$_3$Na | H, H |
| 102 α | Cu | H, —SO$_2$—(CH$_2$)$_3$SO$_3$Na | H, H | H, —SO$_2$—(CH$_2$)$_3$SO$_3$Na | H, H |
| 103 α | Cu | H, —SO—C$_6$H$_4$—O(CH$_2$)$_4$SO$_2$Na | H, H | H, —SO—C$_6$H$_4$—O(CH$_2$)$_4$SO$_3$Na | H, H |
| 104 α | Cu | H, —SO$_2$—C$_6$H$_4$—O(CH$_2$)$_4$SO$_3$Na | H, H | H, —SO$_2$—C$_6$H$_4$—O(CH$_2$)$_4$SO$_3$Na | H, H |

TABLE 1-continued

| Exemplary Compound | M | $R_1R_4$ | $R_2R_3$ | $R_5R_8$ | $R_6R_7$ |
|---|---|---|---|---|---|
| 105 α | Cu | —SO—$(CH_2)_3SO_3Na$, —SO—$(CH_2)_3SO_3Na$ | H, H | —SO—$(CH_2)_3SO_3Na$, —SO—$(CH_2)_3SO_3Na$ | H, H |
| 106 α | Cu | —$SO_2$—$(CH_2)_3SO_3Na$, —$SO_2$—$(CH_2)_3SO_3Na$ | H, H | —$SO_2$—$(CH_2)_3SO_3Na$, —$SO_2$—$(CH_2)_3SO_3Na$ | H, H |

| Exemplary Compound | M | $R_9R_{12}$ | $R_{10}R_{11}$ | $R_{13}R_{16}$ | $R_{14}R_{15}$ |
|---|---|---|---|---|---|
| 101 α | Ni | H, —SO—$(CH_2)_3SO_3Na$ | H, H | H, —SO—$(CH_2)_3SO_3Na$ | H, H |
| 102 α | Zn | H, —$SO_2$—$(CH_2)_3SO_3Na$ | H, H | H, —$SO_2$—$(CH_2)_3SO_3Na$ | H, H |
| 103 α | Cu | H, 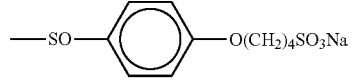 | H, H | H, 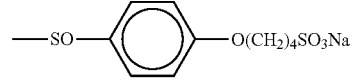 | H, H |
| 104 α | Cu | H, 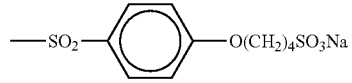 | H, H | H, 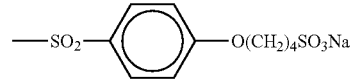 | H, H |
| 105 α | Cu | —SO—$(CH_2)_3SO_3Na$, —SO—$(CH_2)_3SO_3Na$ | H, H | —SO—$(CH_2)_3SO_3Na$, —SO—$(CH_2)_3SO_3Na$ | H, H |
| 106 α | Cu | —$SO_2$—$(CH_2)_3SO_3Na$, —$SO_2$—$(CH_2)_3SO_3Na$ | H, H | —$SO_2$—$(CH_2)_3SO_3Na$, —$SO_2$—$(CH_2)_3SO_3Na$ | H, H |

*In the table, specific examples of each pair of $(R_1R_4)$ $(R_2R_3)$ $(R_5R_8)$ $(R_6R_7)$ $(R_9R_{12})$ $(R_{10}R_{11})$ $(R_{13}R_{16})$ $(R_{14}R_{15})$ are independently in a random order.

TABLE 2

| Exemplary Compound | M | $R_1R_4$ | $R_2R_3$ |
|---|---|---|---|
| 107 α | Cu | H, 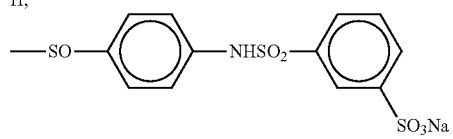 | H, H |
| 108 α | Cu | H, 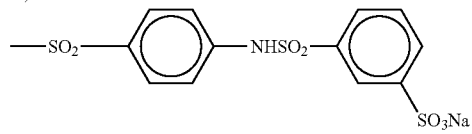 | H, H |
| 109 α | Cu | H, 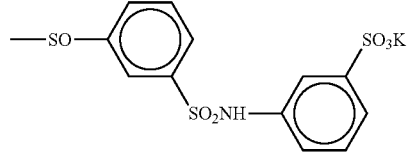 | H, H |
| 110 α | Cu | H, 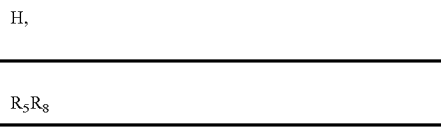 | H, H |

| Exemplary Compound | M | $R_5R_8$ | $R_6R_7$ |
|---|---|---|---|
| 107 α | Cu | H, 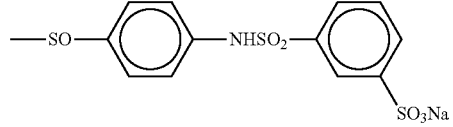 | H, H |

TABLE 2-continued

| | | | | |
|---|---|---|---|---|
| 108 α | Cu | H, —SO$_2$—⟨phenyl⟩—NHSO$_2$—⟨phenyl-SO$_3$Na⟩ | | H, H |
| 109 α | Cu | H, —SO—⟨phenyl-SO$_2$NH—⟨phenyl-SO$_3$K⟩⟩ | | H, H |
| 110 α | Cu | H, —SO—⟨phenyl-SO$_2$NH—⟨phenyl-SO$_3$K⟩⟩ | | H, H |

| Exemplary Compound | M | $R_9R_{12}$ | $R_{10}R_{11}$ |
|---|---|---|---|
| 107 α | Cu | H, —SO—⟨phenyl⟩—NHSO$_2$—⟨phenyl-SO$_3$Na⟩ | H, H |
| 108 α | Cu | H, —SO$_2$—⟨phenyl⟩—NHSO$_2$—⟨phenyl-SO$_3$Na⟩ | H, H |
| 109 α | Cu | H, —SO—⟨phenyl-SO$_2$NH—⟨phenyl-SO$_3$K⟩⟩ | H, H |
| 110 α | Cu | H, —SO—⟨phenyl-SO$_2$NH—⟨phenyl-SO$_3$K⟩⟩ | H, H |

| Exemplary Compound | M | $R_{13}R_{16}$ | $R_{14}R_{15}$ |
|---|---|---|---|
| 107 α | Cu | H, —SO—⟨phenyl⟩—NHSO$_2$—⟨phenyl-SO$_3$Na⟩ | H, H |

TABLE 2-continued
| 108 α | Cu | H, 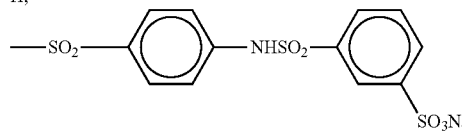 | H, H |
| 109 α | Cu | H, 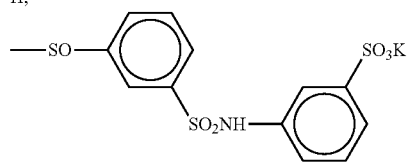 | H, H |
| 110 α | Cu | H, 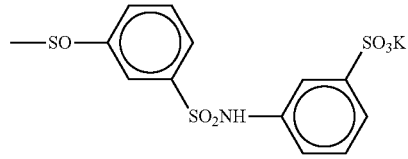 | H, H |
*In the table, specific examples of each pair of ($R_1R_4$) ($R_2R_3$) ($R_5R_8$) ($R_6R_7$) ($R_9R_{12}$) ($R_{10}R_{11}$) ($R_{13}R_{16}$) ($R_{14}R_{15}$) are independently in a random order.
TABLE 3
| Exemplary Compound | M | $R_1R_4$ | $R_2R_3$ | $R_5R_8$ | $R_6R_7$ |
|---|---|---|---|---|---|
| 111 α | Cu | H, 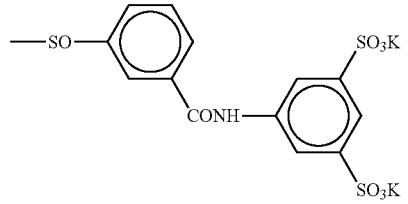 | H, H | H, 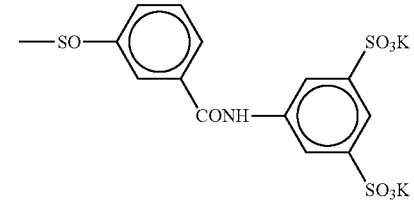 | H, H |
| 112 α | Cu | H, 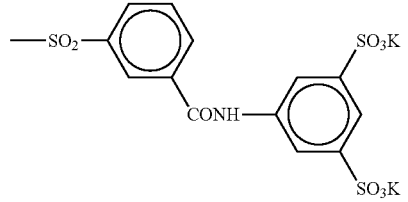 | H, H | H, 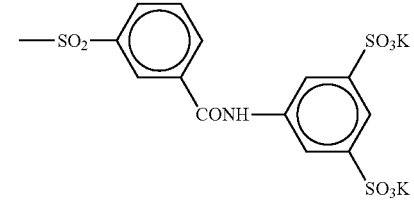 | H, H |
| 113 α | Cu | H, 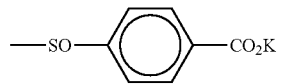 | H, H | H, 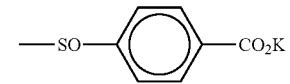 | H, H |
| 114 α | Cu | H, 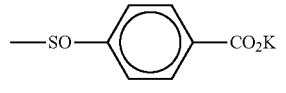 | H, H | H, 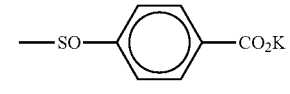 | H, H |

TABLE 3-continued

| Exemplary Compound | M | $R_9R_{12}$ | $R_{10}R_{11}$ | $R_{13}R_{16}$ | $R_{14}R_{15}$ |
|---|---|---|---|---|---|
| 111 α | Cu | H, —SO—C6H4—CONH—C6H3(SO3K)2 | H, H | H, —SO—C6H4—CONH—C6H3(SO3K)2 | H, H |
| 112 α | Cu | H, —SO2—C6H4—CONH—C6H3(SO3K)2 | H, H | H, —SO2—C6H4—CONH—C6H3(SO3K)2 | H, H |
| 113 α | Cu | H, —SO—C6H4—CO2K | H, H | H, —SO—C6H4—CO2K | H, H |
| 114 α | Cu | H, —SO—C6H4—CO2K | H, H | H, —SO—C6H4—CO2K | H, H |

*In the table, specific examples of each pair of $(R_1R_4)$ $(R_2R_3)$ $(R_5R_8)$ $(R_6R_7)$ $(R_9R_{12})$ $(R_{10}R_{11})$ $(R_{13}R_{16})$ $(R_{14}R_{15})$ are independently in a random order.

TABLE 4

| Exemplary Compound | M | $R_1R_4$ | $R_2R_3$ | $R_5R_8$ | $R_6R_7$ |
|---|---|---|---|---|---|
| 115 α | Cu | H, —SO—C6H4—CO2Na | H, H | H, —SO—C6H4—CO2Na | H, H |
| 116 α | Cu | H, —SO2—C6H4—CO2Na | H, H | H, —SO2—C6H4—CO2Na | H, H |
| 117 α | Cu | H, —SO—(imidazole-N(CH2)4SO3K) | H, H | H, —SO—(imidazole-N(CH2)4SO3K) | H, H |
| 118 α | Cu | H, —SO2—(imidazole-N(CH2)4SO3K) | H, H | H, —SO2—(imidazole-N(CH2)4SO3K) | H, H |

TABLE 4-continued

| Exemplary Compound | M | $R_9R_{12}$ | $R_{10}R_{11}$ | $R_{13}R_{16}$ | $R_{14}R_{15}$ |
|---|---|---|---|---|---|
| 115 α | Cu | H, —SO—C6H4(CO2Na) | H, H | H, —SO—C6H4(CO2Na) | H, H |
| 116 α | Cu | H, —SO2—C6H4(CO2Na) | H, H | H, —SO2—C6H4(CO2Na) | H, H |
| 117 α | Cu | H, —SO—(imidazole-N-(CH2)4SO3K) | H, H | H, —SO—(imidazole-N-(CH2)4SO3K) | H, H |
| 118 α | Cu | H, —SO2—(imidazole-N-(CH2)4SO3K) | H, H | H, —SO2—(imidazole-N-(CH2)4SO3K) | H, H |

In the table, specific examples of each pair of ($R_1R_4$) ($R_2R_3$) ($R_5R_8$) ($R_6R_7$) ($R_9R_{12}$) ($R_{10}R_{11}$) ($R_{13}R_{16}$) ($R_{14}R_{15}$) are independently in a random order.

TABLE 5

| Exemplary Compound | M | $R_1R_4$ | $R_2R_3$ | $R_5R_8$ | $R_6R_7$ |
|---|---|---|---|---|---|
| 119 α | Cu | H, —SO—(benzimidazole-N-(CH2)3SO3Na) | H, H | H, —SO—(benzimidazole-N-(CH2)3SO3Na) | H, H |
| 120 α | Cu | H, —SO2—(benzimidazole-N-(CH2)3SO3Na) | H, H | H, —SO2—(benzimidazole-N-(CH2)3SO3Na) | H, H |
| 121 α | Cu | H, —SO—(1,2,4-triazole-N-(CH2)3SO3K) | H, H | H, —SO—(1,2,4-triazole-N-(CH2)3SO3K) | H, H |

TABLE 5-continued

| | | | | | | |
|---|---|---|---|---|---|---|
| 122 α | Cu | H, —SO₂-(1,2,4-triazol-3-yl with N4-(CH₂)₃SO₃K) | H, H | | —SO₂-(1,2,4-triazol-3-yl with N4-(CH₂)₃SO₃K) | H, H |

| Exemplary Compound | M | $R_9 R_{12}$ | $R_{10} R_{11}$ | $R_{13} R_{16}$ | $R_{14} R_{15}$ |
|---|---|---|---|---|---|
| 119 α | Cu | H, —SO-(benzimidazol-2-yl with N1-(CH₂)₃SO₃Na) | H, H | H, —SO-(benzimidazol-2-yl with N1-(CH₂)₃SO₃Na) | H, H |
| 120 α | Cu | H, —SO₂-(benzimidazol-2-yl with N1-(CH₂)₃SO₃Na) | H, H | H, —SO₂-(benzimidazol-2-yl with N1-(CH₂)₃SO₃Na) | H, H |
| 121 α | Cu | H, —SO-(1,2,4-triazol-3-yl with N4-(CH₂)₃SO₃K) | H, H | H, —SO-(1,2,4-triazol-3-yl with N4-(CH₂)₃SO₃K) | H, H |
| 122 α | Cu | H, —SO₂-(1,2,4-triazol-3-yl with N4-(CH₂)₃SO₃K) | H, H | H, —SO₂-(1,2,4-triazol-3-yl with N4-(CH₂)₃SO₃K) | H, H |

*In the table, specific examples of each pair of $(R_1R_4)$ $(R_2R_3)$ $(R_5R_8)$ $(R_6R_7)$ $(R_9R_{12})$ $(R_{10}R_{11})$ $(R_{13}R_{16})$ $(R_{14}R_{15})$ are independently in a random order.

TABLE 6

| Exemplary Compound | M | $R_1 R_4$ | $R_2 R_3$ | $R_5 R_8$ | $R_6 R_7$ |
|---|---|---|---|---|---|
| 123 α | Cu | H, —SO-(4-methyl-5-CH₂CO₂Na-thiazolin-2-yl) | H, H | H, —SO-(4-methyl-5-CH₂CO₂Na-thiazolin-2-yl) | H, H |
| 124 α | Cu | H, —SO₂-(4-methyl-5-CH₂CO₂Na-thiazolin-2-yl) | H, H | H, —SO₂-(4-methyl-5-CH₂CO₂Na-thiazolin-2-yl) | H, H |
| 125 α | Cu | H, —SO-(5-(NHSO₂-(3-SO₃Na-phenyl))-1,3,4-thiadiazol-2-yl) | H, H | H, —SO-(5-(NHSO₂-(3-SO₃Na-phenyl))-1,3,4-thiadiazol-2-yl) | H, H |

TABLE 6-continued

| | M | $R_9R_{12}$ | $R_{10}R_{11}$ | $R_{13}R_{16}$ | $R_{14}R_{15}$ |
|---|---|---|---|---|---|
| 126 α | Cu | H, [—SO$_2$-thiadiazole-NHSO$_2$-C$_6$H$_4$-SO$_3$Na] | H, H | H, [—SO$_3$-thiadiazole-NHSO$_2$-C$_6$H$_4$-SO$_3$Na] | H, H |

| Exemplary Compound | M | $R_9R_{12}$ | $R_{10}R_{11}$ | $R_{13}R_{16}$ | $R_{14}R_{15}$ |
|---|---|---|---|---|---|
| 123 α | Cu | H, [—SO-(4-methyl-5-CH$_2$CO$_2$Na-thiazoline)] | H, H | H, [—SO-(4-methyl-5-CH$_2$CO$_2$Na-thiazoline)] | H, H |
| 124 α | Cu | H, [—SO$_2$-(4-methyl-5-CH$_2$CO$_2$Na-thiazoline)] | H, H | H, [—SO$_2$-(4-methyl-5-CH$_2$CO$_2$Na-thiazoline)] | H, H |
| 125 α | Cu | H, [—SO-thiadiazole-NHSO$_2$-C$_6$H$_4$-SO$_2$Na] | H, H | H, [—SO-thiadiazole-NHSO$_2$-C$_6$H$_4$-SO$_3$Na] | H, H |
| 126 α | Cu | H, [—SO$_2$-thiadiazole-NHSO$_2$-C$_6$H$_4$-SO$_3$Na] | H, H | H, [—SO$_2$-thiadiazole-NHSO$_2$-C$_6$H$_4$-SO$_3$Na] | H, H |

*In the table, specific examples of each pair of ($R_1R_4$) ($R_2R_3$) ($R_5R_8$) ($R_6R_7$) ($R_9R_{12}$) ($R_{10}R_{11}$) ($R_{13}R_{16}$) ($R_{14}R_{15}$) are independently in a random order.

TABLE 7

| Exemplary Compound | M | $R_1R_4$ | $R_2R_3$ | $R_5R_8$ | $R_6R_7$ |
|---|---|---|---|---|---|
| 127 α | Cu | H, [—SO$_2$-thiadiazole-SO$_2$(CH$_2$)$_4$SO$_3$NH$_4$] | H, H | H, [—SO$_2$-thiadiazole-SO$_2$(CH$_2$)$_4$SO$_3$NH$_4$] | H, H |
| 128 α | Cu | H, [benzothiazole-SO$_2$-, 6-NHCO-C$_6$H$_3$(SO$_3$Na)$_2$] | H, H | H, [benzothiazole-SO$_2$-, 6-NHCO-C$_6$H$_3$(SO$_3$Na)$_2$] | H, H |
| 129 α | Cu | H, [—SO$_2$-oxadiazole-C$_6$H$_4$-NHCOC$_2$H$_4$CO$_2$H] | H, H | H, [—SO$_2$-oxadiazole-C$_6$H$_4$-NHCOC$_2$H$_4$CO$_2$H] | H, H |

TABLE 7-continued

| | | | | | | |
|---|---|---|---|---|---|---|
| 130 α | Cu | H, 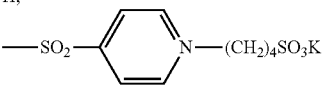 | | H, H | H, 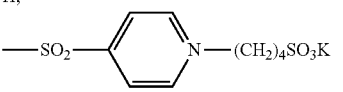 | H, H |

| Exemplary Compound | M | $R_9R_{12}$ | $R_{10}R_{11}$ | $R_{13}R_{16}$ | | $R_{14}R_{15}$ |
|---|---|---|---|---|---|---|
| 127 α | Cu | H, 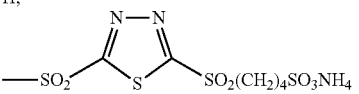 | H, H | H, 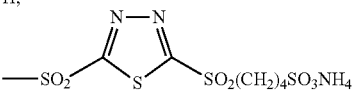 | | H, H |
| 128 α | Cu | H, 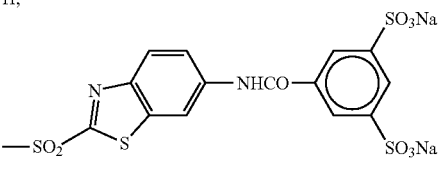 | H, H | H, 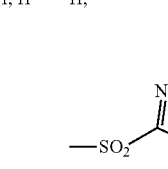 | | H, H |
| 129 α | Cu | H, 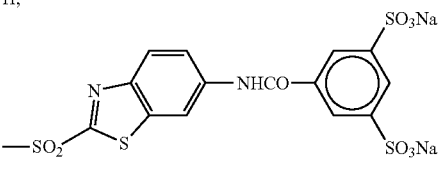 | H, H | H, 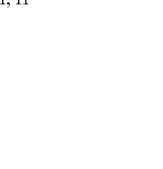 | | H, H |
| 130 α | Cu | H, 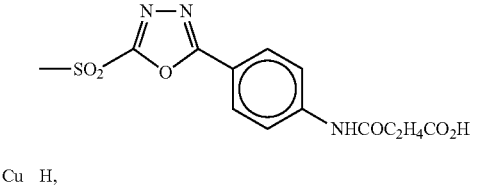 | H, H | H, 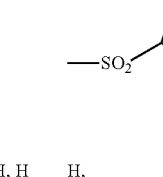 | | H, H |

*In the table, specific examples of each pair of $(R_1R_4)$ $(R_2R_3)$ $(R_5R_8)$ $(R_6R_7)$ $(R_9R_{12})$ $(R_{10}R_{11})$ $(R_{13}R_{16})$ $(R_{14}R_{15})$ are independently in a random order.

TABLE 8

| Exemplary Compound | M | $R_1R_4$ | $R_2R_3$ | $R_5R_8$ | $R_6R_7$ |
|---|---|---|---|---|---|
| 134 α | Ni | —SO₂—(CH₂)₃SO₃Na, —SO₂—(CH₂)₃SO₃Na | H, H | —SO₂—(CH₂)₃SO₃Na, —SO₂—(CH₂)₃SO₃Na | H, H |
| 135 α | Zn | H, —SO₂—(CH₂)₃SO₃Na | H, H | H, —SO₂—(CH₂)₃SO₃Na | H, H |
| 136 α | Zn | H, 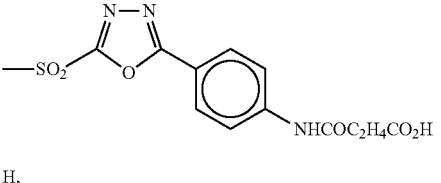 | H, H | H, —SO₂—(CH₂)₃SO₃Na | H, H |
| 137 α | Cu | H,  | H, H | H, —SO₂—(CH₂)₃SO₃Na | H, H |

| Exemplary Compound | M | $R_9R_{12}$ | $R_{10}R_{11}$ | $R_{13}R_{16}$ | $R_{14}R_{15}$ |
|---|---|---|---|---|---|
| 134 α | Ni | —SO₂—(CH₂)₃SO₃Na, —SO₂—(CH₂)₃SO₃Na | H, H | —SO₂—(CH₂)₃SO₃Na, —SO₂—(CH₂)₃SO₃Na | H, H |
| 135 α | Zn | H, —SO₂—(CH₂)₃SO₃Na | H, H | H, —SO₂—(CH₂)₃SO₃Na | H, H |
| 136 α | Zn | H, —SO₂—(CH₂)₃SO₃Na | H, H | H, —SO₂—(CH₂)₃SO₃Na | H, H |

TABLE 8-continued

| | | | | | | |
|---|---|---|---|---|---|---|
| 137 α | Cu | H, —$SO_2$—$(CH_2)_3SO_3Na$ | H, H | H, —$SO_2$—$(CH_2)_3SO_3Na$ | | H, H |

*In the table, specific examples of each pair of ($R_1R_4$) ($R_2R_3$) ($R_5R_8$) ($R_6R_7$) ($R_9R_{12}$) ($R_{10}R_{11}$) ($R_{13}R_{16}$) ($R_{14}R_{15}$) are independently in a random order.

TABLE 9

| Exemplary Compound | M | $R_1R_4$ | $R_2R_3$ | $R_5R_8$ | $R_6R_7$ |
|---|---|---|---|---|---|
| 101 β | Cu | H, H | H, —SO—$(CH_2)_3SO_3Na$ | H, H | H, —SO—$(CH_2)_3SO_3Na$ |
| 102 β | Cu | H, H | H, —$SO_2$—$(CH_2)_3SO_3Na$ | H, H | H, —$SO_2$—$(CH_2)_3SO_3Na$ |
| 103 β | Cu | H, H | H, —SO—⟨phenyl⟩—$O(CH_2)_4SO_3Na$ | H, H | H, —SO—⟨phenyl⟩—$O(CH_2)_4SO_3Na$ |
| 104 β | Cu | H, H | H, —$SO_2$—⟨phenyl⟩—$O(CH_2)_4SO_3Na$ | H, H | H, —$SO_2$—⟨phenyl⟩—$O(CH_2)_4SO_3Na$ |
| 105 β | Cu | H, H | —SO—$(CH_2)_3SO_3Na$, —SO—$(CH_2)_3SO_3Na$ | H, H | —SO—$(CH_2)_3SO_3Na$, —SO—$(CH_2)_3SO_3Na$ |
| 106 β | Cu | H, H | —$SO_2$—$(CH_2)_3SO_3Na$, —$SO_2$—$(CH_2)_3SO_3Na$ | H, H | —$SO_2$—$(CH_2)_3SO_3Na$, —$SO_2$—$(CH_2)_3SO_3Na$ |

| Exemplary Compound | M | $R_9R_{12}$ | $R_{10}R_{11}$ | $R_{13}R_{16}$ | $R_{14}R_{15}$ |
|---|---|---|---|---|---|
| 101 β | Cu | H, H | H, —SO—$(CH_2)_3SO_3Na$ | H, H | H, —SO—$(CH_2)_3SO_3Na$ |
| 102 β | Cu | H, H | H, —$SO_2$—$(CH_2)_3SO_3Na$ | H, H | H, —$SO_2$—$(CH_2)_3SO_3Na$ |
| 103 β | Cu | H, H | H, —SO—⟨phenyl⟩—$O(CH_2)_4SO_3Na$ | H, H | H, —SO—⟨phenyl⟩—$O(CH_2)_4SO_3Na$ |
| 104 β | Cu | H, H | H, —$SO_2$—⟨phenyl⟩—$O(CH_2)_4SO_3Na$ | H, H | H, —$SO_2$—⟨phenyl⟩—$O(CH_2)_4SO_3Na$ |
| 105 β | Cu | H, H | —SO—$(CH_2)_3SO_3Na$, —SO—$(CH_2)_3SO_3Na$ | H, H | —SO—$(CH_2)_3SO_3Na$, —SO—$(CH_2)_3SO_3Na$ |
| 106 β | Cu | H, H | —$SO_2$—$(CH_2)_3SO_3Na$, —$SO_2$—$(CH_2)_3SO_3Na$ | H, H | —$SO_2$—$(CH_2)_3SO_3Na$, —$SO_2$—$(CH_2)_3SO_3Na$ |

(Examples of the phthalocyanine dye represented by Formula (2))

*In the table, specific examples of each pair of ($R_1R_4$) ($R_2R_3$) ($R_5R_8$) ($R_6R_7$) ($R_9R_{12}$) ($R_{10}R_{11}$) ($R_{13}R_{16}$) ($R_{14}R_{15}$) are independently in a random order.

TABLE 10

| Exemplary Compound | M | $R_1R_4$ | $R_2R_3$ | $R_5R_8$ | $R_6R_7$ |
|---|---|---|---|---|---|
| 107 β | Cu | H, H | H, —SO—⟨phenyl⟩—$NHSO_2$—⟨phenyl-$SO_3Na$⟩ | H, H | H, —SO—⟨phenyl⟩—$NHSO_2$—⟨phenyl-$SO_3Na$⟩ |

TABLE 10-continued
| Exemplary Compound | M | $R_1R_4$ | $R_2R_3$ | $R_5R_8$ | $R_6R_7$ | | |
|---|---|---|---|---|---|---|---|
| 108 β | Cu | H, H | H, | 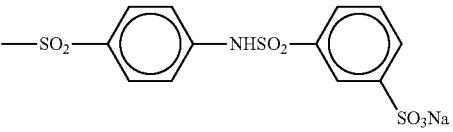 | H, H | H, | 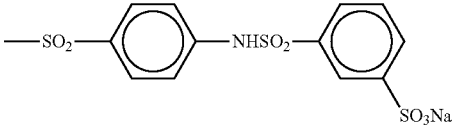 |
| 109 β | Cu | H, H | H, | 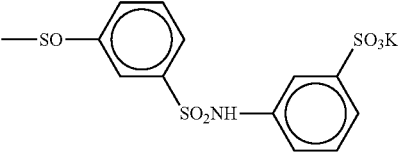 | H, H | H, | 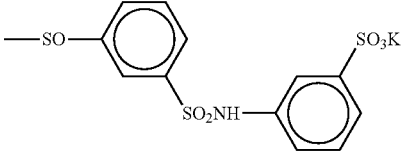 |
| 110 β | Cu | H, H | H, | 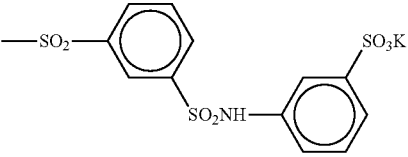 | H, H | H, | 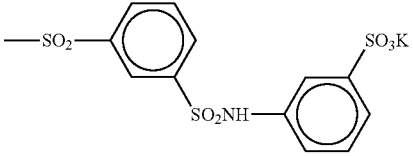 |
| Exemplary Compound | M | $R_9R_{12}$ | $R_{10}R_{11}$ | | $R_{13}R_{16}$ | $R_{14}R_{15}$ | |
|---|---|---|---|---|---|---|---|
| 107 β | Cu | H, H | H, | 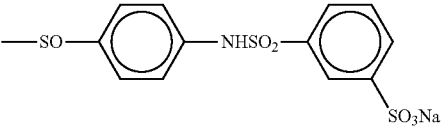 | H, H | H, | 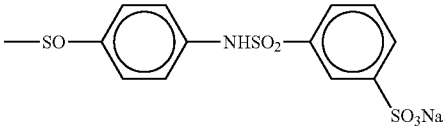 |
| 108 β | Cu | H, H | H, | 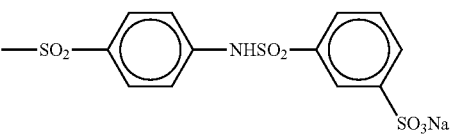 | H, H | H, | 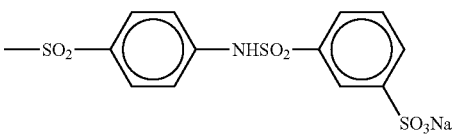 |
| 109 β | Cu | H, H | H, | 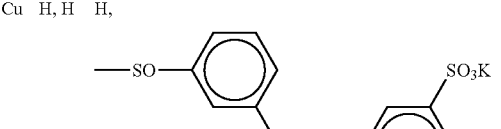 | H, H | H, | 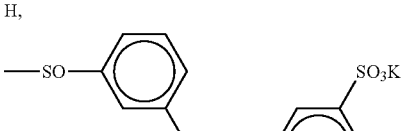 |
| 110 β | Cu | H, H | H, | 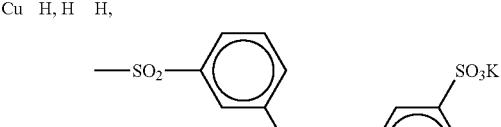 | H, H | H, | 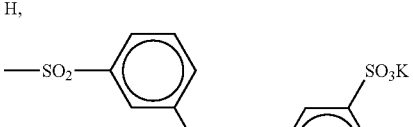 |
*In the table, specific examples of each pair of $(R_1R_4)$ $(R_2R_3)$ $(R_5R_8)$ $(R_6R_7)$ $(R_9R_{12})$ $(R_{10}R_{11})$ $(R_{13}R_{16})$ $(R_{14}R_{15})$ are independently in a random order.

TABLE 11
| Exemplary Compound | M | R1R4 | R2R3 | R5R8 | R6R7 |
|---|---|---|---|---|---|
| 111 β | Cu | H, H | H, 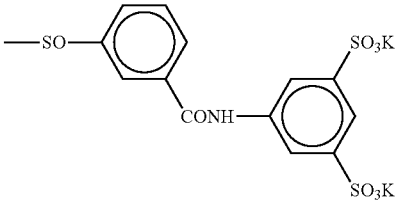 | H, H | H, 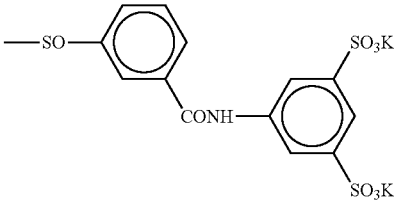 |
| 112 β | Cu | H, H | H, 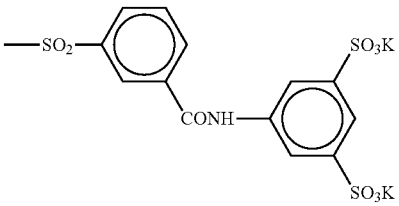 | H, H | H, 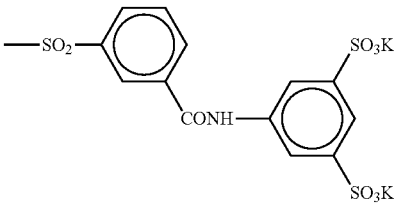 |
| 113 β | Cu | H, H | H, 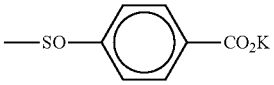 | H, H | H,  |
| 114 β | Cu | H, H | H, 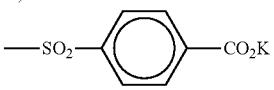 | H, H | H,  |
| Exemplary Compound | M | R9R12 | R10R11 | R13R16 | R14R15 |
|---|---|---|---|---|---|
| 111 β | Cu | H, H | H, 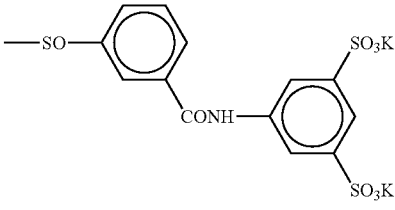 | H, H | H, 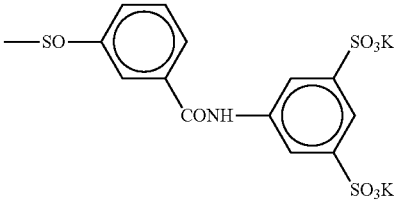 |
| 112 β | Cu | H, H | H, 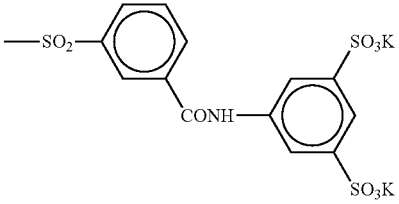 | H, H | H, 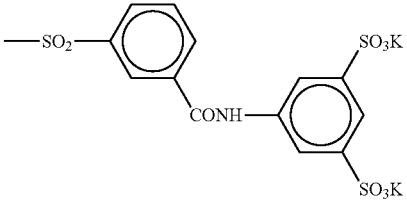 |
| 113 β | Cu | H, H | H, 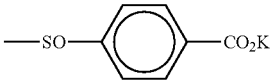 | H, H | H,  |
| 114 β | Cu | H, H | H, 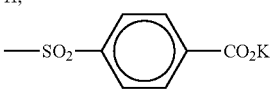 | H, H | H, 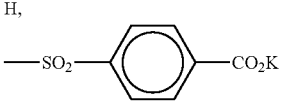 |
*In the table, specific examples of each pair of (R1R4) (R2R3) (R5R8) (R6R7) (R9R12) (R10R11) (R13R16) (R14R15) are independently in a random order.

TABLE 12

| Exemplary Compound | M | $R_1R_4$ | $R_2R_3$ | $R_5R_8$ | $R_6R_7$ |
|---|---|---|---|---|---|
| 115 β | Cu | H, H | H, —SO—(2-$CO_2Na$-phenyl) | H, H | H, —SO—(2-$CO_2Na$-phenyl) |
| 116 β | Cu | H, H | H, —$SO_2$—(2-$CO_2Na$-phenyl) | H, H | H, —$SO_2$—(2-$CO_2Na$-phenyl) |
| 117 β | Cu | H, H | H, —SO—(1-$(CH_2)_4SO_3K$-imidazol-2-yl) | H, H | H, —SO—(1-$(CH_2)_4SO_3K$-imidazol-2-yl) |
| 118 β | Cu | H, H | H, —$SO_2$—(1-$(CH_2)_4SO_3K$-imidazol-2-yl) | H, H | H, —$SO_2$—(1-$(CH_2)_4SO_3K$-imidazol-2-yl) |

| Exemplary Compound | M | $R_9R_{12}$ | $R_{10}R_{11}$ | $R_{13}R_{16}$ | $R_{14}R_{15}$ |
|---|---|---|---|---|---|
| 115 β | Cu | H, H | H, —SO—(2-$CO_2Na$-phenyl) | H, H | H, —SO—(2-$CO_2Na$-phenyl) |
| 116 β | Cu | H, H | H, —$SO_2$—(2-$CO_2Na$-phenyl) | H, H | H, —$SO_2$—(2-$CO_2Na$-phenyl) |
| 117 β | Cu | H, H | H, —SO—(1-$(CH_2)_4SO_3K$-imidazol-2-yl) | H, H | H, —SO—(1-$(CH_2)_4SO_3K$-imidazol-2-yl) |
| 118 β | Cu | H, H | H, —$SO_2$—(1-$(CH_2)_4SO_3K$-imidazol-2-yl) | H, H | H, —$SO_2$—(1-$(CH_2)_4SO_3K$-imidazol-2-yl) |

*In the table, specific examples of each pair of $(R_1R_4)$ $(R_2R_3)$ $(R_5R_8)$ $(R_6R_7)$ $(R_9R_{12})$ $(R_{10}R_{11})$ $(R_{13}R_{16})$ $(R_{14}R_{15})$ are independently in a random order.

TABLE 13

| Exemplary Compound | M | $R_1R_4$ | $R_2R_3$ | $R_5R_8$ | $R_6R_7$ |
|---|---|---|---|---|---|
| 119 β | Cu | H, H | H, —SO—(benzimidazole-N-(CH$_2$)$_3$SO$_3$Na) | H, H | H, —SO—(benzimidazole-N-(CH$_2$)$_3$SO$_3$Na) |
| 120 β | Cu | H, H | H, —SO$_2$—(benzimidazole-N-(CH$_2$)$_3$SO$_3$Na) | H, H | H, —SO$_2$—(benzimidazole-N-(CH$_2$)$_3$SO$_3$Na) |
| 121 β | Cu | H, H | H, —SO—(1,2,4-triazole-N-(CH$_2$)$_3$SO$_3$K) | H, H | H, —SO—(1,2,4-triazole-N-(CH$_2$)$_3$SO$_3$K) |
| 122 β | Cu | H, H | H, —SO$_2$—(1,2,4-triazole-N-(CH$_2$)$_3$SO$_3$K) | H, H | H, —SO$_2$—(1,2,4-triazole-N-(CH$_2$)$_3$SO$_3$K) |

| Exemplary Compound | M | $R_9R_{12}$ | $R_{10}R_{11}$ | $R_{13}R_{16}$ | $R_{14}R_{15}$ |
|---|---|---|---|---|---|
| 119 β | Cu | H, H | H, —SO—(benzimidazole-N-(CH$_2$)$_3$SO$_3$Na) | H, H | H, —SO—(benzimidazole-N-(CH$_2$)$_3$SO$_3$Na) |
| 120 β | Cu | H, H | H, —SO$_2$—(benzimidazole-N-(CH$_2$)$_3$SO$_3$Na) | H, H | H, —SO$_2$—(benzimidazole-N-(CH$_2$)$_3$SO$_3$Na) |
| 121 β | Cu | H, H | H, —SO—(1,2,4-triazole-N-(CH$_2$)$_3$SO$_3$K) | H, H | H, —SO—(1,2,4-triazole-N-(CH$_2$)$_3$SO$_3$K) |
| 122 β | Cu | H, H | H, —SO$_2$—(1,2,4-triazole-N-(CH$_2$)$_3$SO$_3$K) | H, H | H, —SO$_2$—(1,2,4-triazole-N-(CH$_2$)$_3$SO$_3$K) |

*In the table, specific examples of each pair of ($R_1R_4$) ($R_2R_3$) ($R_5R_8$) ($R_6R_7$) ($R_9R_{12}$) ($R_{10}R_{11}$) ($R_{13}R_{16}$) ($R_{14}R_{15}$) are independently in a random order.

TABLE 14
| Exemplary Compound | M | $R_1R_4$ | $R_2R_3$ | $R_5R_8$ | $R_6R_7$ |
|---|---|---|---|---|---|
| 123 β | Cu | H, H | H, 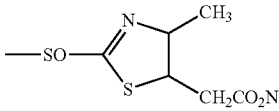 | H, H | H, 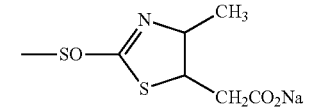 |
| 124 β | Cu | H, H | H, 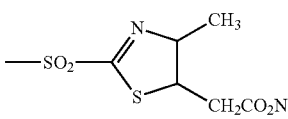 | H, H | H, 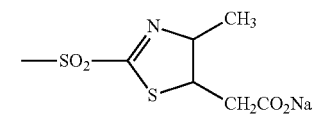 |
| 125 β | Cu | H, H | H, 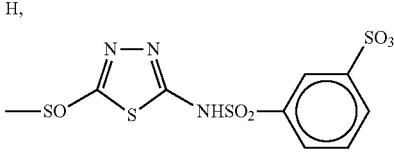 | H, H | H, 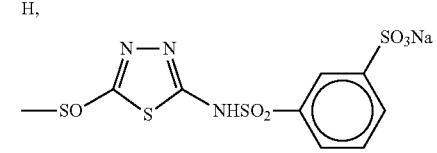 |
| 126 β | Cu | H, H | H, 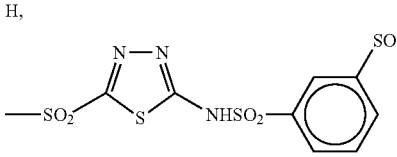 | H, H | H, 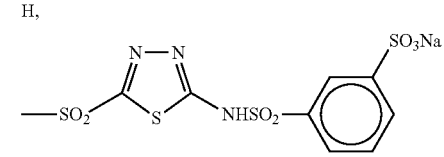 |
| Exemplary Compound | M | $R_9R_{12}$ | $R_{10}R_{11}$ | $R_{13}R_{16}$ | $R_{14}R_{15}$ |
|---|---|---|---|---|---|
| 123 β | Cu | H, H | H, 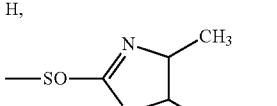 | H, H | H, 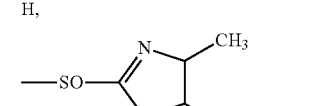 |
| 124 β | Cu | H, H | H, 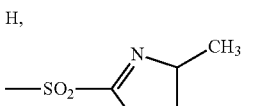 | H, H | H, 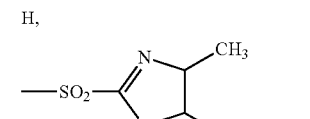 |
| 125 β | Cu | H, H | H, 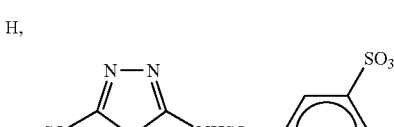 | H, H | H, 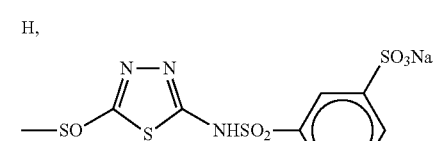 |
| 126 β | Cu | H, H | H, 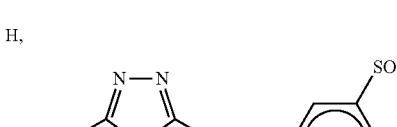 | H, H | H, 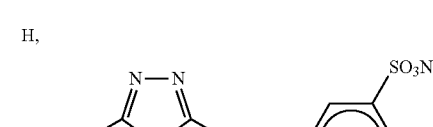 |
*In the table, specific examples of each pair of ($R_1R_4$) ($R_2R_3$) ($R_5R_8$) ($R_6R_7$) ($R_9R_{12}$) ($R_{10}R_{11}$) ($R_{13}R_{16}$) ($R_{14}R_{15}$) are independently in a random order.

TABLE 15

| Exemplary Compound | M | R₁R₄ | R₂R₃ | R₅R₈ | R₆R₇ |
|---|---|---|---|---|---|
| 127 β | Cu | H, H | H, —SO₂-(1,3,4-thiadiazole)-SO₂(CH₂)₄SO₃NH₄ | H, H | H, —SO₂-(1,3,4-thiadiazole)-SO₂(CH₂)₄SO₃NH₄ |
| 128 β | Cu | H, H | H, —SO₂-(benzothiazole)-NHCO-(phenyl with SO₃Na, SO₂Na) | H, H | H, —SO₂-(benzothiazole)-NHCO-(phenyl with SO₃Na, SO₂Na) |
| 129 β | Cu | H, H | H, —SO₂-(1,3,4-oxadiazole)-(phenyl)-NHCOC₂H₄CO₂H | H, H | H, —SO₂-(1,3,4-oxadiazole)-(phenyl)-NHCOC₂H₄CO₂H |
| 130 β | Cu | H, H | H, —SO₂-(pyridinium)-N—(CH₂)₄SO₃K | H, H | H, —SO₂-(pyridinium)-N—(CH₂)₄SO₃K |

| Exemplary Compound | M | R₉R₁₂ | R₁₀R₁₁ | R₁₃R₁₆ | R₁₄R₁₅ |
|---|---|---|---|---|---|
| 127 β | Cu | H, H | H, —SO₂-(1,3,4-thiadiazole)-SO₂(CH₂)₄SO₃NH₄ | H, H | H, —SO₂-(1,3,4-thiadiazole)-SO₂(CH₂)₄SO₃NH₄ |
| 128 β | Cu | H, H | H, —SO₂-(benzothiazole)-NHCO-(phenyl with SO₃Na, SO₂Na) | H, H | H, —SO₂-(benzothiazole)-NHCO-(phenyl with SO₃Na, SO₂Na) |
| 129 β | Cu | H, H | H, —SO₂-(1,3,4-oxadiazole)-(phenyl)-NHCOC₂H₄CO₂H | H, H | H, —SO₂-(1,3,4-oxadiazole)-(phenyl)-NHCOC₂H₄CO₂H |
| 130 β | Cu | H, H | H, —SO₂-(pyridinium)-N—(CH₂)₄SO₃K | H, H | H, —SO₂-(pyridinium)-N—(CH₂)₄SO₃K |

*In the table, specific examples of each pair of (R₁R₄) (R₂R₃) (R₅R₈) (R₆R₇) (R₉R₁₂) (R₁₀R₁₁) (R₁₃R₁₆) (R₁₄R₁₅) are independently in a random order.

TABLE 16

| Exemplary Compound | M | $R_1R_4$ | $R_2R_3$ | $R_5R_8$ | $R_6R_7$ |
|---|---|---|---|---|---|
| 134 β | Ni | H, H | $-SO_2-(CH_2)_3SO_3Na$, $-SO_2-(CH_2)_3SO_3Na$ | H, H | $-SO_2-(CH_2)_3SO_3Na$, $-SO_2-(CH_2)_3SO_3Na$ |
| 135 β | Zn | H, H | H, $-SO_2-(CH_2)_3SO_3Na$ | H, H | H, $-SO_2-(CH_2)_3SO_3Na$ |
| 136 β | Zn | H, H | H, $-SO_2(CH_2)_3SO_2-\text{[pyridinium-N-Me]}$ | H, H | H, $-SO_2-(CH_2)_3SO_3Na$ |
| 137 β | Cu | H, H | H, $-SO_2(CH_2)_3SONHCH_2CH(OH)CH_3$ | H, H | H, $-SO_2-(CH_2)_3SO_3Na$ |
| 138 β | Cu | H, H | H, $-SO_2(CH_2)_3SONHCH_2CH(OH)CH_3$ | H, H | H, $-SO_2(CH_2)_3SONHCH_2CH(OH)CH_3$ |
| 139 β | Cu | H, H | H, $-SO_2(CH_2)_3SO-\text{[piperazine-N-Me]}$ | H, H | H, $-SO_2-(CH_2)_3SO_3Na$ |

| Exemplary Compound | M | $R_9R_{12}$ | $R_{10}R_{11}$ | $R_{13}R_{16}$ | $R_{14}R_{15}$ |
|---|---|---|---|---|---|
| 134 β | Ni | H, H | $-SO_2-(CH_2)_3SO_3Na$, $-SO_2-(CH_2)_3SO_3Na$ | H, H | $-SO_2-(CH_2)_3SO_3Na$, $-SO_2-(CH_2)_3SO_3Na$ |
| 135 β | Zn | H, H | H, $-SO_2-(CH_2)_3SO_3Na$ | H, H | H, $-SO_2-(CH_2)_3SO_3Na$ |
| 136 β | Zn | H, H | H, $-SO_2-(CH_2)_3SO_3Na$ | H, H | H, $-SO_2-(CH_2)_3SO_3Na$ |
| 137 β | Cu | H, H | H, $-SO_2-(CH_2)_3SO_3Na$ | H, H | H, $-SO_2-(CH_2)_3SO_3Na$ |
| 138 β | Cu | H, H | H, $-SO_2-(CH_2)_3SO_3Na$ | H, H | H, $-SO_2-(CH_2)_3SO_3Na$ |
| 139 β | Cu | H, H | H, $-SO_2-(CH_2)_3SO_3Na$ | H, H | H, $-SO_2-(CH_2)_3SO_3Na$ |

*In the table, specific examples of each pair of ($R_1R_4$) ($R_2R_3$) ($R_5R_8$) ($R_6R_7$) ($R_9R_{12}$) ($R_{10}R_{11}$) ($R_{13}R_{16}$) ($R_{14}R_{15}$) are independently in a random order.

[Azaphthalocyanine Dye Represented by Formula (II-2)]

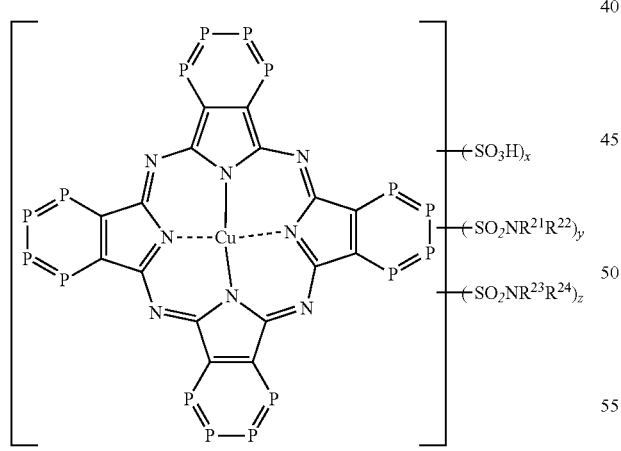

(II-2)

In Formula (II-2),

P's each independently represents a nitrogen atom or CH, and at least one of P's represents a nitrogen atom. However, in the four rings containing P's, the number of P's representing nitrogen atoms is 2 or less, respectively.

$R^{21}$ and $R^{22}$ each independently represent a hydrogen atom or a substituted or unsubstituted alkyl group.

$R^{23}$ represents a hydrogen atom or a substituted or unsubstituted hydrocarbon group.

$R^{24}$ represents a substituted or unsubstituted hydrocarbon group.

$R^{23}$ and $R^{24}$ may be bound to each other with nitrogen atom to form a substituted or unsubstituted heterocyclic ring.

x, y, and z each independently represents 0 to 4.

x+y+z is 1 to 4.

The azaphthalocyanine dye represented by Formula (II-2) is preferably the azaphthalocyanine dye represented by the Formula (II-3-1) or the Formula (II-3-2) below.

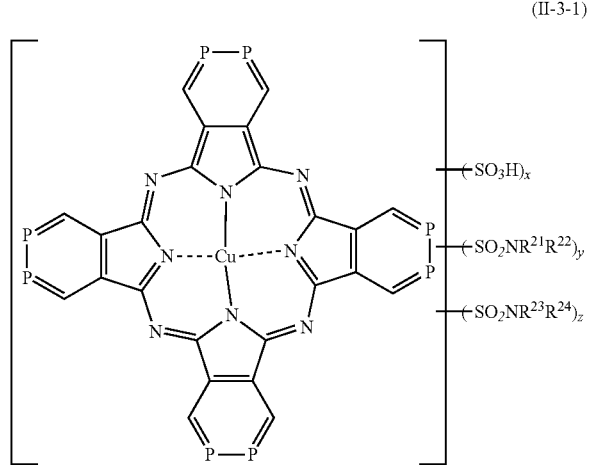

(II-3-1)

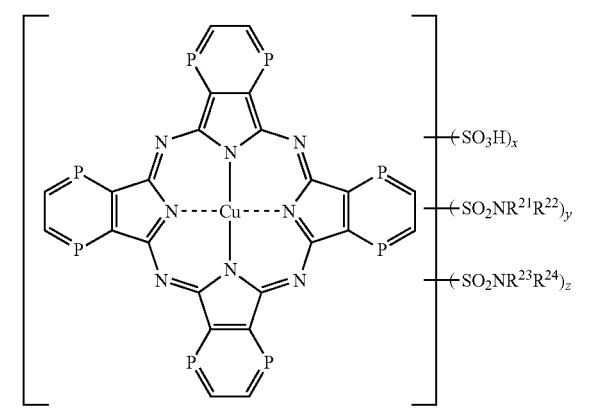

(II-3-2)

In Formula (II-3-1) and Formula (II-3-2),

P's each independently represents a nitrogen atom or CH, and at least one of P's represents a nitrogen atom.

$R^{21}$ and $R^{22}$ each independently represent a hydrogen atom or a substituted or unsubstituted alkyl group.

$R^{23}$ represents a hydrogen atom or a substituted or unsubstituted hydrocarbon group.

$R^{24}$ represents a substituted or unsubstituted hydrocarbon group.

$R^{23}$ and $R^{24}$ may be bound to each other with nitrogen atom to form a substituted or unsubstituted heterocyclic ring.

x, y, and z each independently represents 0 to 4.

x+y+z is 1 to 4.

x, y, z, $R^{21}$, $R^{22}$, $R^{23}$ and $R^{24}$ in Formula (II-2), Formula (II-3-1) and Formula (II-3-2) will be described.

As a substituted or unsubstituted alkyl group represented by $R^{21}$ and $R^{22}$, an alkyl group having 1 to 12 carbon atoms is preferred, an alkyl group having 1 to 8 carbon atoms is more preferred, and an alkyl group having 1 to 4 carbon atoms is far more preferred. As a substituent, the substituent group A can be mentioned, and a hydroxyl group, an alkoxy group, a cyano group, a halogen atom and an ionic hydrophilic group is preferred, and a hydroxyl group or an ionic hydrophilic group is more preferred. As an alkyl group, methyl, ethyl, butyl, isopropyl, n-propyl, or t-butyl is preferred, methyl, or n-propyl is more preferred, and n-propyl is far more preferred.

$R^{21}$ preferably represents a methyl group or a hydrogen atom, and more preferably represents a hydrogen atom.

$R^{22}$ preferably represents a hydrogen atom or a substituted or unsubstituted alkyl group having 1 to 4 carbon atoms, a substituted group having a substituent is preferably a hydroxyl group, preferably represents n-propyl or a hydrogen atom, and more preferably represents a hydrogen atom.

As a substituted or unsubstituted hydrocarbon group represented by $R^{23}$ and $R^{24}$, a substituted or unsubstituted alkyl group, a substituted or unsubstituted heterocyclic group, or a substituted or unsubstituted aryl groups are preferred.

As a substituted or unsubstituted alkyl group represented by $R^{23}$ and $R^{24}$, when excluding the substituent, the alkyl group having 1 to 12 carbon atoms is preferred, the alkyl group having 1 to 8 carbon atoms is more preferred, and the alkyl group having 1 to 4 carbon atoms is far more preferred. As a substituent, the substituent group A can be mentioned. As an alkyl group, methyl, ethyl, butyl, isopropyl, and t-butyl are preferred.

As a substituted or unsubstituted heterocyclic group represented by $R^{23}$ and $R^{24}$, 5- or 6-membered heterocyclic ring group is preferred. As a substituent, the substituent group A can be mentioned, and an ionic hydrophilic group is included. As a heterocyclic group, 2-pyridyl group, 2-thienyl group and 2-furyl group are preferred.

As a substituted or unsubstituted aryl group represented by $R^{23}$ and $R^{24}$, the alkyl group having 6 to 12 carbon atoms when excluding the substituent is preferred. Examples of the substituent include the substituent group A, and an alkyl group, an alkoxy group, a halogen atom, an alkylamino group and an ionic hydrophilic group are preferred. As an aryl group, phenyl or naphthyl is preferred.

$R^{23}$ preferably represents a methyl group or a hydrogen atom, and more preferably represents a hydrogen atom.

$R^{24}$ is preferably a substituent represented by the Formula (T1).

$R^{23}$ in the Formula (II-2), the Formula (II-3-1) or the Formula (II-3-2) represents a hydrogen atom, and $R^{24}$ preferably represents a substituent group represented by the Formula (T1).

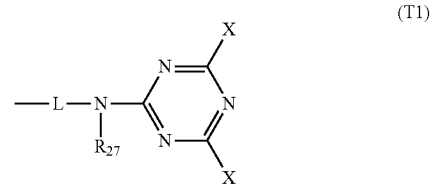

(T1)

In Formula (T1),

L represents a single bond or a substituted or unsubstituted alkylene group.

X each independently represents a substituent selected from $-OR^{25}$, $-SR^{25}$, and $-NR^{25}R^{26}$, $R^{25}$ and $R^{26}$ each independently represent a hydrogen atom, a substituted or unsubstituted alkyl group, a substituted or unsubstituted aryl group, or a substituted or unsubstituted heterocyclic group, and at least one of $R^{25}$ and $R^{26}$ has an ionic hydrophilic group as a substituent. $R^{27}$ represents a hydrogen atom or a substituted or unsubstituted alkyl group.

As a substituted or unsubstituted alkylene group represented by L, when excluding the substituent, the alkylene group having 1 to 12 carbon atoms is preferred, the alkylene group having 1 to 8 carbon atoms is more preferred, and the alkylene group having 1 to 4 carbon atoms is far more preferred. As a substituent, the substituent group A can be mentioned. As an alkylene group, methylene, ethylene, butylene, isopropylene, and t-butylene are preferred.

X is preferably —$NR^{25}R^{26}$.

A substituted or unsubstituted alkyl group, a substituted or unsubstituted aryl group, or a substituted or unsubstituted heterocyclic group represented by $R^{25}$ and $R^{26}$ include the same group represented by $R^{23}$ and $R^{24}$.

As a substituted or unsubstituted alkyl group represented by $R^{27}$, when removing a substituent, the alkyl group having 1 to 12 carbon atoms is preferred, the alkyl group having 1 to 8 carbon atoms is more preferred, and the alkyl group having 1 to 4 carbon atoms is far more preferred. As an alkyl group, methyl, ethyl, butyl, isopropyl, and t-butyl are preferred. As a substituent, the substituent group A can be mentioned.

$R^{27}$ preferably represents a methyl group or a hydrogen atom, and more preferably represents a hydrogen atom.

A substituent represented by the Formula (T1) is preferably a substituent represented by the following Formula (T2).

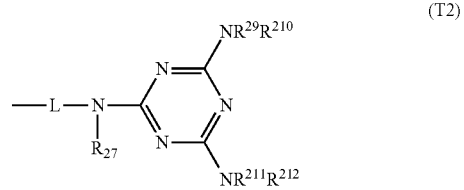

(T2)

In Formula (T2),

L represents a single bond or a substituted or unsubstituted alkylene group.

$R^{29}$, $R^{210}$, and $R^{211}$ each independently represent a hydrogen atom, or a substituted or unsubstituted alkyl group, and $R^{212}$ represents a substituted alkyl group, a substituted aryl group, or a substituted heterocyclic group, and has an ionic hydrophilic group as at least a substituent. $R^{27}$ represents a hydrogen atom or a substituted or unsubstituted alkyl group.

L and $R^{27}$ are the same as L and $R^{27}$ in the Formula (T1), and the preferable is the same.

A substituted or unsubstituted alkyl group represented by $R^{29}$, $R^{210}$, and $R^{211}$ is the same as examples of the R27 in the Formula (T1), and the preferable is the same.

$R^{27}$, $R^{29}$, $R^{210}$, and $R^{211}$ preferably represent a methyl group or a hydrogen atom, and more preferably represent a hydrogen atom.

$R^{212}$ preferably represents a substituted aryl group and has an ionic hydrophilic group as at least a substituent, and as substituent, the substituent group A may be mentioned. As a substituent, an ionic hydrophilic group is preferred, and a sulfo group, a carboxyl group, a carboxylthio group, a sulfino group, a phosphono group, dihydroxyphosphino group, and a quaternary ammonium group are preferred, and a carboxyl group and a sulfo group are more preferred, and a sulfo group is far more preferred. The carboxyl group and the sulfo group may be in the form of a salt, and examples of the counter ion for forming the salt include an alkali metal ion (e.g., sodium ion, potassium ion) and organic cations (e.g., tetramethylguanidium ions).

$R^{212}$ is preferably an aryl group substituted by one to three ionic hydrophilic groups, and more preferably an aryl group substituted by two ionic hydrophilic groups (preferably a carboxyl group or a sulfo group).

Hereinafter, specific examples of the substituent represented by the Formula (T1) will be described, but the present invention is not limited to these embodiments.

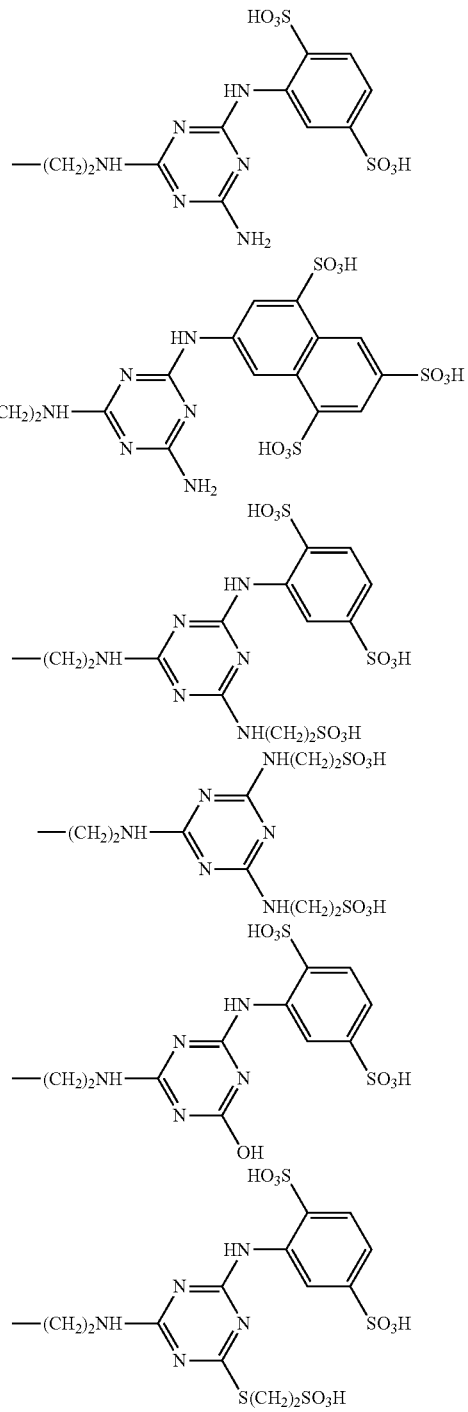

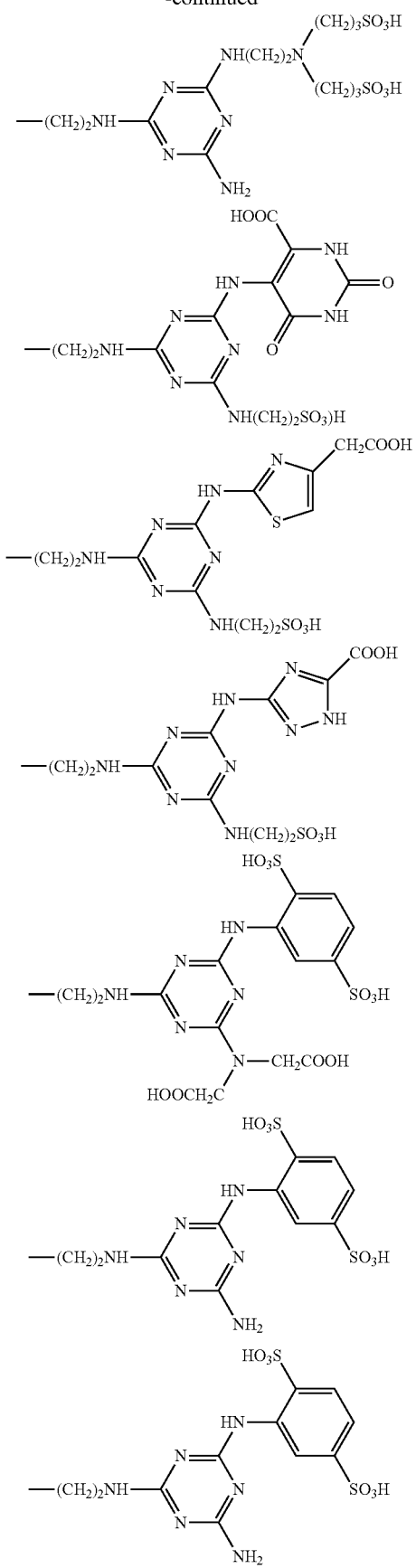
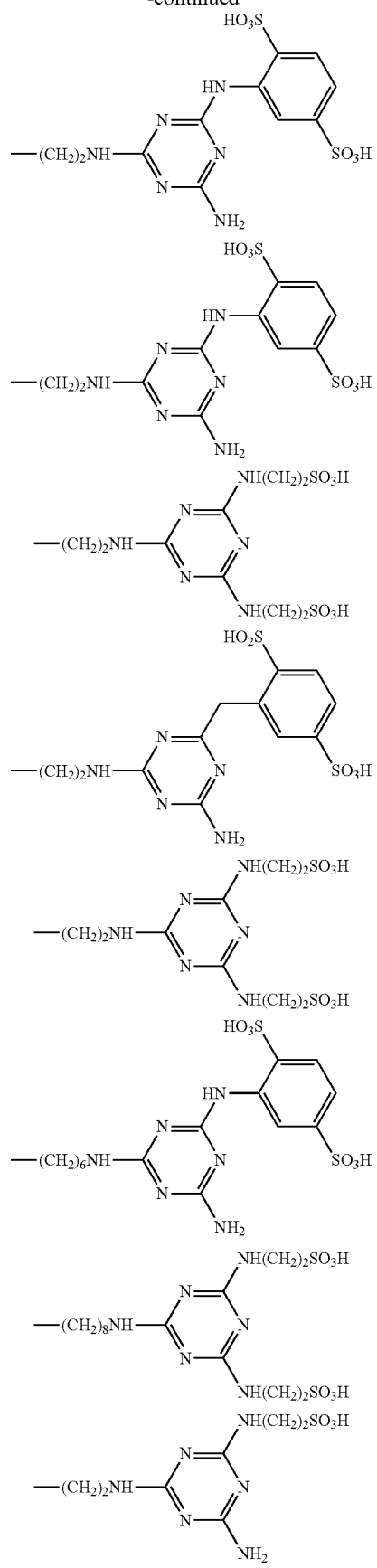

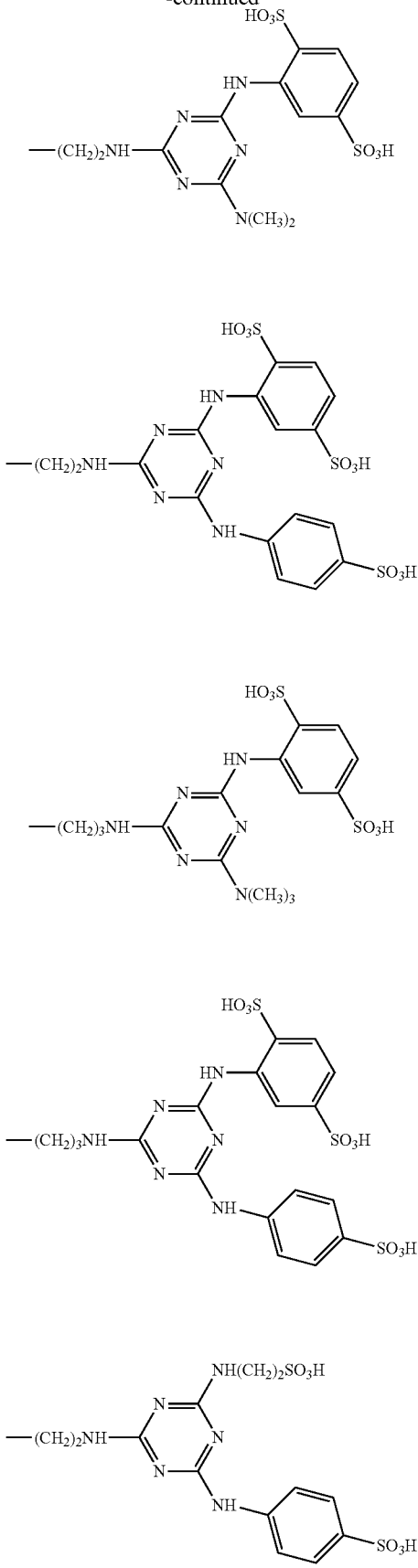
Hereinafter, specific examples of the compound represented by the Formula (II-2) will be described, but the present invention is not limited to these embodiments.
(2-1)
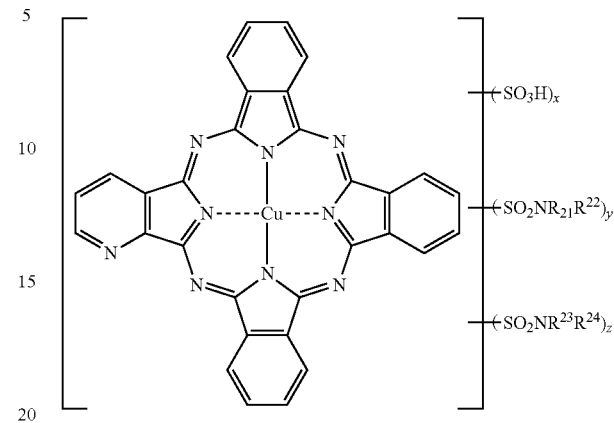
TABLE 9
| | $R^{21}$ | $R^{22}$ | $R^{23}$ | $R^{24}$ |
|---|---|---|---|---|
| 1 | H | H | H | ![structure] |
| 2 | H | H | H | ![structure] |
| 3 | H | H | H | ![structure] |
| 4 | H | H | H | ![structure] |

TABLE 9-continued
| | $R^{21}$ | $R^{22}$ | $R^{23}$ | $R^{24}$ |
|---|---|---|---|---|
| 5 | H | H | H | 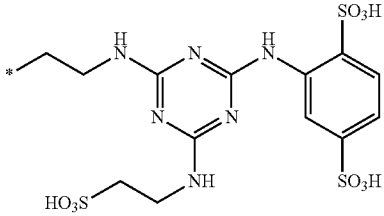 [SMILES: *CCNc1nc(NCCS(=O)(=O)O)nc(Nc2cc(S(=O)(=O)O)ccc2S(=O)(=O)O)n1] |
TABLE 10
| | $R^{21}$ | $R^{22}$ | $R^{23}$ | $R^{24}$ |
|---|---|---|---|---|
| 6 | H | 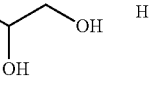 | H |  |
| 7 | H | 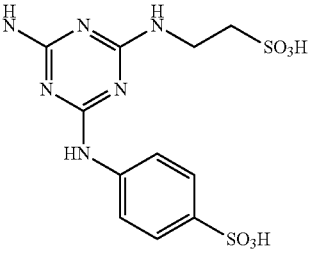 | H | 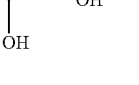 |
| 8 | H |  | H | 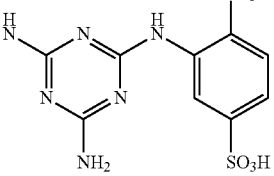 |
| 9 | H | 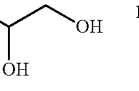 | H |  |
| 10 | H | 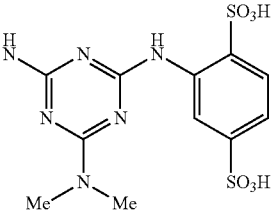 | H | 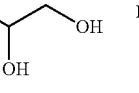 |

TABLE 11

| | R21 | R22 | R23 | R24 |
|---|---|---|---|---|
| 11 | H | *–CH2CH2OH | H | *–CH2CH2–NH–[triazine(NMe2)]–NH–[phenyl(2,5-(SO3H)2)] |
| 12 | H | H | H | *–CH2CH2–[phenyl(2-SO3H, 4-SO3H)] |
| 13 | H | H | H | *–CH2CH2–SO3H |
| 14 | H | Me | H | *–CH2CH2–SO3H |
| 15 | Me | Me | H | *–CH2CH2–SO3H |
| 16 | H | *–CH2–CH(OH)–CH2OH | H | *–CH2CH2–SO3H |
| 17 | H | Me | H | *–CH2CH2–[phenyl(2-SO3H, 4-SO3H)] |
| 18 | H | *–CH2–CH(OH)–CH2OH | H | *–CH2CH2–[phenyl(2-SO3H, 4-SO3H)] |
| 19 | H | H | H | *–CH2CH2–NH–[triazine(NH-CH2CH2OH)]–NH–[phenyl(4-SO3H)] |
| 20 | H | H | H | *–CH2CH2–NH–[triazine(NH-CH2CH2SO3H)]–NH–[naphthyl(SO3H)] |

TABLE 12

| | R²¹ | R²² | R²³ | R²⁴ |
|---|---|---|---|---|
| 21 | H | H | H | *-NH-triazine(-NH₂)-NH-naphthalene(SO₃H)(SO₃H) |
| 22 | H | H | H | *-NH-triazine(-NH-CH₂CH₂-O-CH₂CH₂-OH)-NH-naphthalene(SO₃H)(SO₃H) |
| 23 | H | H | H | *-NH-triazine(-NH-CH₂CH₂-O-CH₂CH₂-OH)-NH-C₆H₄-SO₃H |
| 24 | H | H | H | *-NH-triazine(-morpholino)-NH-naphthalene(SO₃H)(SO₃H) |
| 25 | H | H | H | *-NH-triazine(-morpholino)-NH-naphthalene(SO₃H)(SO₃H) |

TABLE 13

| | R²¹ | R²² | R²³ | R²⁴ |
|---|---|---|---|---|
| 26 | H | H | H | *-NH-triazine(-morpholino)-NH-C₆H₃(SO₃H)(SO₃H) |
| 27 | H | H | H | *-NH-triazine(-morpholino)-NH-C₆H₃(SO₃H)(SO₃H) |
| 28 | H | H | H | *-NH-triazine(-NH-CH₂CH₂-SO₃H)-NH-C₆H₄-SO₃H |
| 29 | H | H | H | *-NH-triazine(-NH-CH₂CH₂-SO₃H)-NH-C₆H₄-SO₃H |
| 30 | H | H | H | *-NH-triazine(-N(CH₂CH₂CO₂H)₂)-NH-C₆H₄-SO₃H |

TABLE 14

| | R²¹ | R²² | R²³ | R²⁴ |
|---|---|---|---|---|
| 31 | H | H | H | *-NH-triazine(-NH-CH₂CH₂-SO₃H)-NH-C₆H₃(CO₂H)(CO₂H) |

TABLE 14-continued

| | R21 | R22 | R23 | R24 |
|---|---|---|---|---|
| 32 | H | H | H | *-propyl-NH-triazine(N-piperazine-N-ethyl)-NH-(2,4-disulfophenyl) |
| 33 | H | H | H | *-propyl-NH-triazine(2-ethylpiperidin-1-yl)-NH-(2,4-disulfophenyl) |
| 34 | H | H | H | *-propyl-NH-triazine(3-methylpyrrolidin-1-yl)-NH-(2,4-disulfophenyl) |
| 35 | H | H | H | *-propyl-NH-triazine(2-carboxypyrrolidin-1-yl)-NH-(2,4-disulfophenyl) |

TABLE 15

| | R21 | R22 | R23 | R24 |
|---|---|---|---|---|
| 36 | H | H | H | *-propyl-NH-triazine(pyrrolidin-1-yl)-NH-(2,4-disulfophenyl) |
| 37 | H | H | H | *-propyl-NH-triazine(NH2)-NH-(1,6-disulfonaphthalen-4-yl) |

(2-2)

Cu phthalocyanine-pyridine complex with —(SO3H)x, —(SO2NR21R22)y, —(SO2NR23R24)z substituents

TABLE 16

| | R21 | R22 | R23 | R24 |
|---|---|---|---|---|
| 38 | H | H | H | *-propyl-NH-triazine(NH-CH2CH2SO3H)-NH-(4-sulfophenyl) |
| 39 | H | H | H | *-propyl-NH-triazine(NH2)-NH-(2,4-disulfophenyl) |
| 40 | H | H | H | *-propyl-NH-triazine(N(Me)2)-NH-(2,4-disulfophenyl) |

TABLE 16-continued
| | $R^{21}$ | $R^{22}$ | $R^{23}$ | $R^{24}$ |
|---|---|---|---|---|
| 41 | H | H | H | 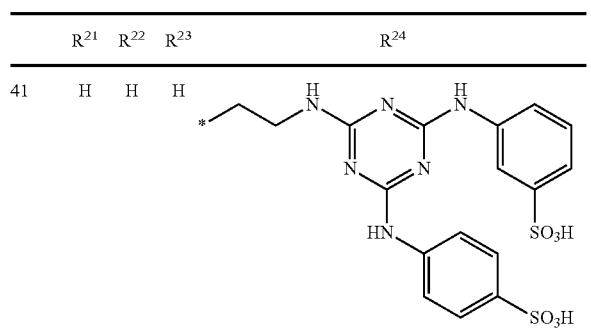 |
| 42 | H | H | H | 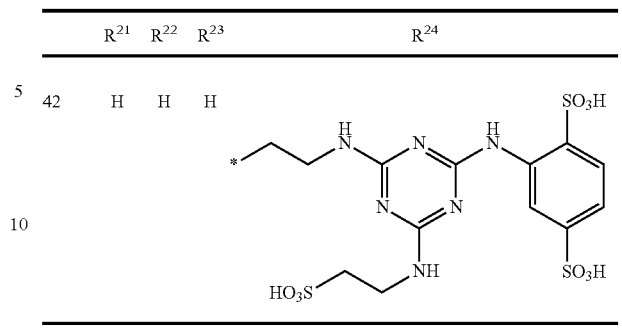 |
TABLE 17
| | $R^{21}$ | $R^{22}$ | $R^{23}$ | $R^{24}$ |
|---|---|---|---|---|
| 43 | H | *–CH₂CH(OH)CH₂OH | H | |
| 44 | H | *–CH₂CH(OH)CH₂OH | H | |
| 45 | H | *–CH₂CH(OH)CH₂OH | H | |
| 46 | H | *–CH₂CH(OH)CH₂OH | H | |
| 47 | H | *–CH₂CH(OH)CH₂OH | H | |
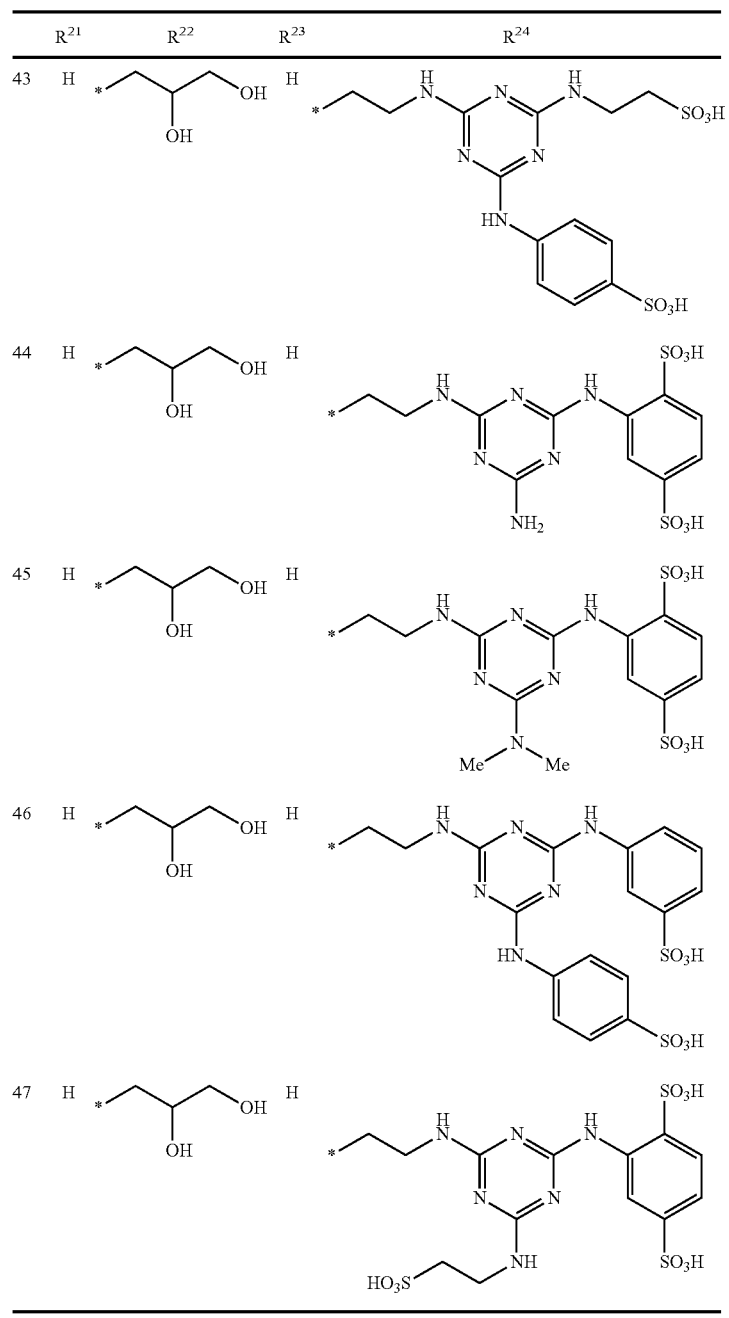

TABLE 18
| | R²¹ | R²² | R²³ | R²⁴ |
|---|---|---|---|---|
| 48 | H | *–CH₂CH₂OH | H |  |
| 50 | H | H | H | 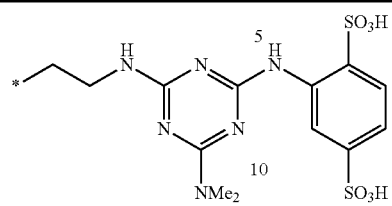 |
| 51 | H | H | H | *–CH₂CH₂SO₃H |
| 52 | H | Me | H | *–CH₂CH₂SO₃H |
| 53 | Me | Me | H | *–CH₂CH₂SO₃H |
| 54 | H | *–CH₂CH(OH)CH₂OH | H | *–CH₂CH₂SO₃H |
| 55 | H | Me | H | 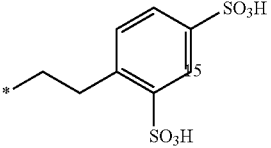 [SMILES: *CCc1ccc(S(=O)(=O)O)cc1S(=O)(=O)O] |
| 56 | H | *–CH₂CH(OH)CH₂OH | H | 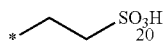 |
| 57 | H | H | H | 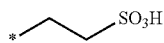 |
| 58 | H | H | H | 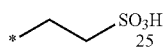 |

TABLE 19

| | R²¹ | R²² | R²³ | R²⁴ |
|---|---|---|---|---|
| 59 | H | H | H | *-NH-(triazine with NH₂)-NH-naphthyl(SO₃H)₂ |
| 60 | H | H | H | *-NH-(triazine with NH-CH₂CH₂-O-CH₂CH₂-OH)-NH-naphthyl(SO₃H)₂ |
| 61 | H | H | H | *-NH-(triazine with NH-CH₂CH₂-O-CH₂CH₂-OH)-NH-C₆H₄-SO₃H |
| 62 | H | H | H | *-NH-(triazine with morpholino)-NH-naphthyl(SO₃H)₂ |
| 63 | H | H | H | *-NH-(triazine with morpholino)-NH-naphthyl(SO₃H)₂ |

TABLE 20

| | R²¹ | R²² | R²³ | R²⁴ |
|---|---|---|---|---|
| 64 | H | H | H | *-NH-(triazine with morpholino)-NH-C₆H₃(SO₃H)₂ |
| 65 | H | H | H | *-NH-(triazine with morpholino)-NH-C₆H₃(SO₃H)₂ |
| 66 | H | H | H | *-NH-(triazine with NH-CH₂CH₂-SO₃H)-NH-C₆H₄-SO₃H |
| 67 | H | H | H | *-NH-(triazine with NH-CH₂CH₂-SO₃H)-NH-C₆H₄-SO₃H |
| 68 | H | H | H | *-NH-(triazine with N(CH₂CH₂CO₂H)₂)-NH-C₆H₄-SO₃H |

TABLE 21

| | R²¹ | R²² | R²³ | R²⁴ |
|---|---|---|---|---|
| 69 | H | H | H | *-NH-(triazine with NH-CH₂CH₂-SO₃H)-NH-C₆H₃(CO₂H)₂ |

TABLE 21-continued

| | $R^{21}$ | $R^{22}$ | $R^{23}$ | $R^{24}$ |
|---|---|---|---|---|
| 70 | H | H | H | (structure) |
| 71 | H | H | H | (structure) |
| 72 | H | H | H | (structure) |
| 73 | H | H | H | (structure) |

TABLE 22

| | $R^{21}$ | $R^{22}$ | $R^{23}$ | $R^{24}$ |
|---|---|---|---|---|
| 74 | H | H | H | (structure) |
| 75 | H | H | H | (structure) |

The azaphthalocyanine compounds represented by the Formula (II-2) according to the present invention can be synthesized by the method described in the International Publication WO2010/020802.

[Azaphthalocyanine Dye Represented by the Formula (III-2)]

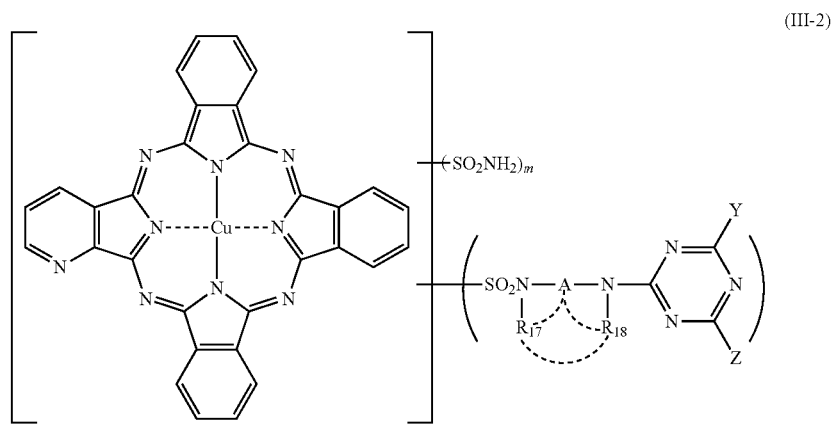

(III-2)

In Formula (III-2).

$R_{17}$ and $R_{18}$ each independently represents a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heterocyclic group, or a substituted or unsubstituted alkenyl group. A represents a divalent linking group, and adjacent $R_{17}$, $R_{18}$, and A may be bound to each other to form a ring. Y and Z each independently represents a halogen atom, a hydroxyl group, a sulfonate group, a carboxyl group, an amino group, a substituted or unsubstituted alkoxy group, a substituted or unsubstituted cycloalkyloxy group, a substituted or unsubstituted aryloxy group, a substituted or unsubstituted heterocyclic oxy group, a substituted or unsubstituted aralkyloxy group, a substituted or unsubstituted alkenyloxy group, a substituted or unsubstituted alkylamino group, a substituted or unsubstituted cycloalkyl amino group, a substituted or unsubstituted arylamino group, a substituted or unsubstituted heterocyclic amino group, a substituted or unsubstituted aralkylamino group, a substituted or unsubstituted alkenyl amino group, a substituted or unsubstituted dialkylamino group, a substituted or unsubstituted alkylthio group, a substituted or unsubstituted arylthio group, a substituted or unsubstituted heterocyclic thio group, a substituted or unsubstituted aralkyl thio group, or a substituted or unsubstituted alkenylthio group. However, at least one of Y and Z has a sulfonate group, a carboxyl group, or an ionic hydrophilic group as a substituent. m and n is 1 to 3, and the sum of m and n is 2 to 4.

As a substituted or unsubstituted alkyl group represented by $R^{17}$ and $R^{18}$, an alkyl group having 1 to 12 carbon atoms is preferred, an alkyl group having 1 to 8 carbon atoms is more preferred, and an alkyl group having 1 to 4 carbon atoms is far more preferred. As a substituent, the substituent group A can be mentioned, and a hydroxyl group, an alkoxy group, a cyano group, a halogen atom and an ionic hydrophilic group are preferred, and a hydroxyl group or an ionic hydrophilic group are more preferred. As an alkyl group, methyl, ethyl, butyl, isopropyl, n-propyl, or t-butyl is preferred, methyl or n-propyl is more preferred, and n-propyl is tar more preferred.

$R^{27}$ and $R^{28}$ preferably represent a methyl group or a hydrogen atom, and more preferably represent a hydrogen atom.

A cycloalkyl group represented by $R^{17}$ and $R^{18}$ includes a cycloalkyl group having a substituent group and an unsubstituted cycloalkyl group. As a cycloalkyl group, the cycloalkyl group having 5 to 12 carbon atoms when excluding the substituent is preferred. An example of the substituent group includes an ionic hydrophilic group. An example of the cycloalkyl group includes a cyclohexyl group.

An aralkyl group represented by $R^{17}$ and $R^{18}$ includes an aralkyl group having a substituent group and an unsubstituted aralkyl group. As an aralkyl group, the aralkyl group having 7 to 12 carbon atoms when excluding the substituent is preferred. An example of the substituent group includes an ionic hydrophilic group. Examples of the aralkyl group include a benzyl group, and 2-phenethyl group.

As an aryl group represented by $R^{17}$ and $R^{18}$, the aryl group having 6 to 12 carbon atoms when excluding the substituent is preferred. Examples of the substituent group include the substituent group A, and an alkyl group, an alkoxy group, a halogen atom, alkylamino group, and an ionic hydrophilic group are preferred. As an aryl group, phenyl or naphtyl is preferred.

As a heterocyclic group represented by $R^{17}$ and $R^{18}$, 5-membered or 6-membered heterocyclic group is preferred. Example of the substituent group include the substituent group A and an ionic hydrophilic group. As a heterocyclic group, 2-piridyl group, 2-thienyl group, and 2-furyl group are preferred.

An alkenyl group represented by $R^{17}$ and $R^{18}$ includes an alkenyl group having a substituent group and an unsubstituted alkenyl group. As an alkenyl group, the alkenyl group having 2 to 12 carbon atoms when excluding the substituent is preferred. An example of the substituent includes an ionic hydrophilic group. As examples of alkenyl the group, vinyl group, allyl group and the like are preferred.

An aryloxy group represented by $R^{17}$ and $R^{18}$ includes an aryloxy group having a substituent group and an unsubstituted aralkyl group. As an aryloxy group, the aryloxy group having 6 to 12 carbon atoms when excluding the substituent is preferred. Examples of the substituent group include an alkoxy group and the substituent group A. As examples of the aryloxy group, phenoxy, p-methoxyphenoxy group and o-methoxy-phenoxy group are preferred.

As a halogen atom, a substituted or unsubstituted alkoxy group, a substituted or unsubstituted cycloalkyloxy group, a substituted or unsubstituted aryloxy group, a substituted or unsubstituted heterocyclic oxy group, a substituted or unsubstituted aralkyloxy group, a substituted or unsubstituted alkenyloxy group, a substituted or unsubstituted alkylamino groups, substituted or unsubstituted cycloalkylamino group, a substituted or unsubstituted arylamino group, a substituted or unsubstituted heterocyclic amino group, a substituted or unsubstituted aralkylamino group, a substituted or unsubstituted alkenylamino group, a substituted or unsubstituted dialkylamino groups, substituted or unsubstituted alkylthio group, a substituted or unsubstituted arylthio group, a substituted or unsubstituted heterocyclic thio group, a substituted or unsubstituted aralkylthio group, a substituted or unsubstituted alkenylthio group represented by Y and Z, examples listed in the substituent group A may be mentioned.

A divalent linking group represented by A includes an alkylene group, an arylene group, a heterocyclic residue, —CO—, —SOn- (n is 0, 1, 2), —NR— (R represents a hydrogen atom, an alkyl group, or an aryl represents group), —O—, and a combination of these divalent linking groups, and they may also have a substituent group such as an alkyl group, an aryl group, an alkoxy group, an amino group, an acyl group, an acylamino group, a halogen atom, a hydroxyl group, a carboxyl group, a sulfamoyl group, a carbamoyl group, a sulfonamide group, or the like. An alkylene group is preferred, and an ethylene group or n-propylene group is more preferred.

The phthalocyanine dye represented by the Formula (III-2) is preferably the phthalocyanine dye represented by the following Formula (III-2-1).

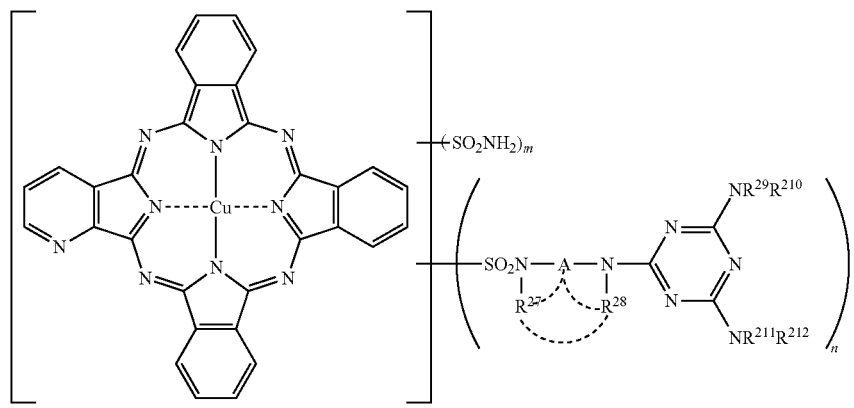

(III-2-1)

In Formula (III-2-1), $R^{27}$ and $R^{28}$ each independently represent a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heterocyclic group, or a substituted or unsubstituted alkenyl group. A represents a divalent linking group, respectively, and adjacent $R^{27}$, $R^{28}$, and A may be bound to each other to form a ring.

$R^{29}$, $R^{210}$, and $R^{211}$ each independently represent a hydrogen atom, or a substituted or unsubstituted alkyl group, and $R^{212}$ represents a sulfonate group, a carboxyl group, a substituted alkyl group, a substituted aryl group, or a substituted heterocyclic group, and has an ionic hydrophilic group as at least a substituent. m and n are 1 to 3, and the sum of m and n is 2 to 4.

A, $R^{27}$ and $R^{28}$ are the same as A, $R^{17}$ and $R^{18}$ in the Formula (1), and the preferable is also the same.

As a substituted or unsubstituted alkyl group represented by $R^{29}$, $R^{210}$, and $R^{211}$, the alkyl group having 1 to 12 carbon atoms is preferred, and the alkyl group has having 1 to 8 carbon atoms is more preferred, and the alkyl group having 1 to 4 carbon atoms is far more preferred. As a substituent, the substituent group A can be mentioned, and a hydroxyl group, an alkoxy group, a cyano group, a halogen atom and an ionic hydrophilic group is preferred, and a hydroxyl group or an ionic hydrophilic group is more preferred. As an alkyl group, methyl, ethyl, butyl, isopropyl, n-propyl, or t-butyl is preferred, methyl, or n-propyl is more preferred, and n-propyl is far more preferred.

$R^{27}$ and $R^{28}$ preferably represent a methyl group or a hydrogen atom, and more preferably represents a hydrogen atom.

$R^{212}$ preferably represents a substituted aryl group and has an ionic hydrophilic group as at least a substituent, and as substituent, the substituent group A may be mentioned. As a substituent, an ionic hydrophilic group is preferred, and a sulfo group, a carboxyl group, a carboxylthio group, a sulfino group, a phosphono group, dihydroxyphosphino group, and a quaternary ammonium group are preferred, and a carboxyl group and a sulfo group are more preferred, and a sulfo group is far more preferred. The carboxyl group and the sulfo group may be in the form of a salt, and examples of the counter ion for forming the salt include an alkali metal ion (e.g., sodium ion, potassium ion) and organic cations (e.g., tetramethylguanidium ions).

$R^{212}$ represents a sulfonate group, a carboxyl group, a substituted alkyl group, a substituted aryl group, or a substituted heterocyclic group, and a substituted alkyl group or a substituted aryl group is more preferred.

$R^{212}$ is preferably an aryl group substituted by one to three ionic hydrophilic groups, and more preferably an aryl group substituted by two ionic hydrophilic groups (preferably a carboxyl group or a sulfo group).

Hereinafter, specific examples of the substituent including the linking group A in the Formula (III-2) will be described, but the present invention is not limited to these embodiments.

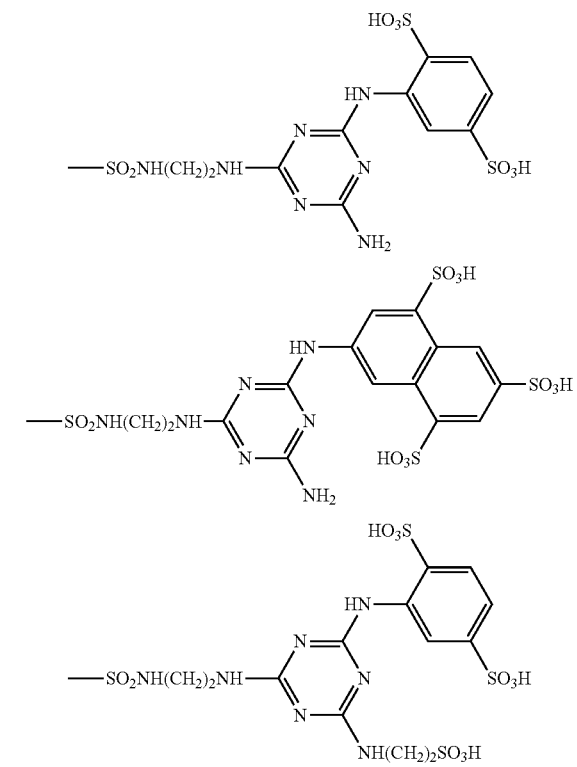

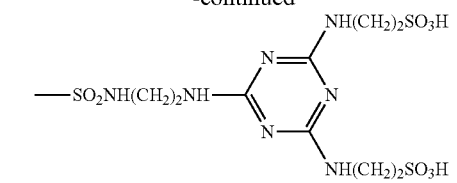
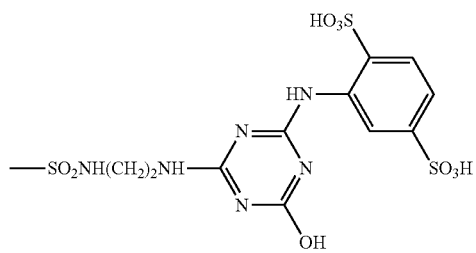
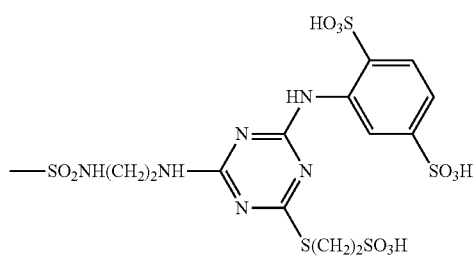
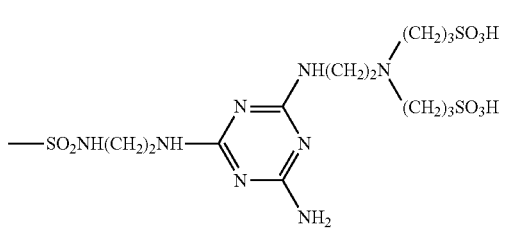
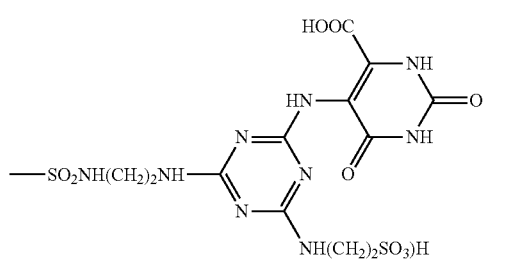
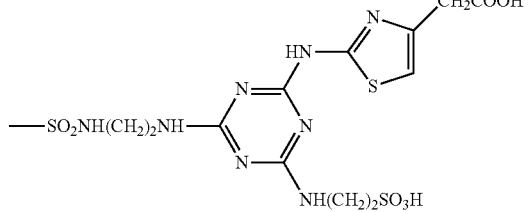
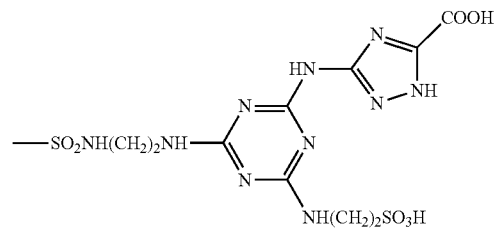
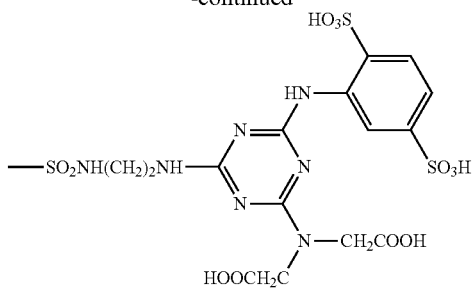
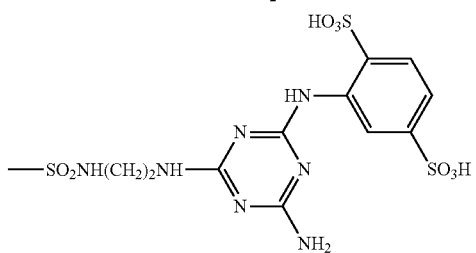
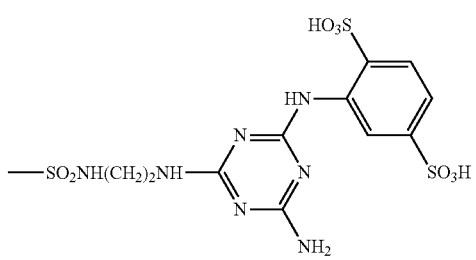
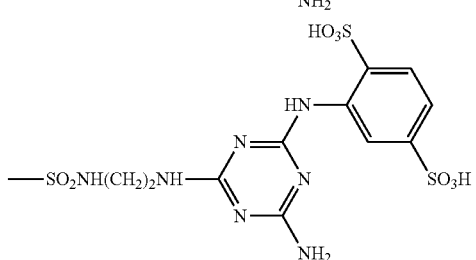
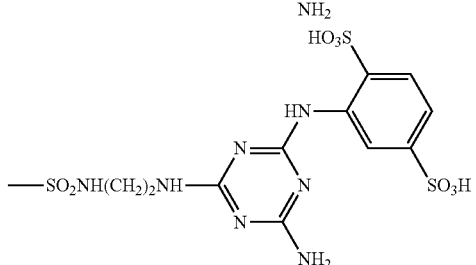
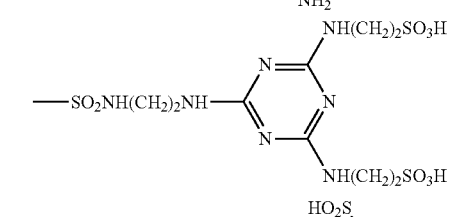
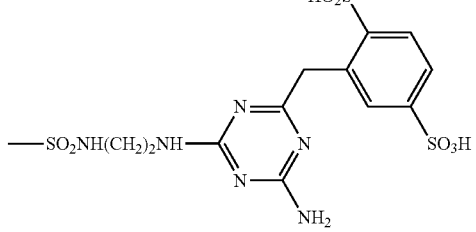

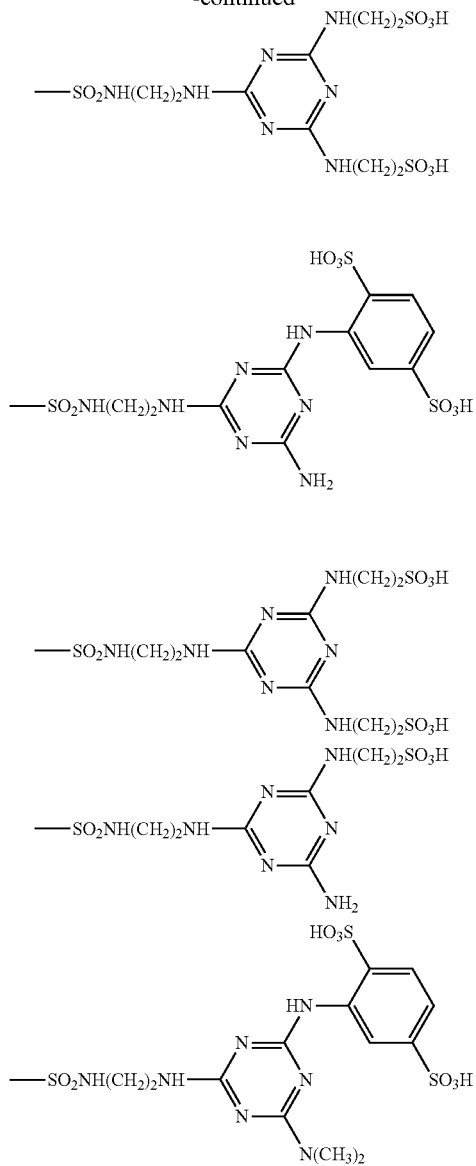
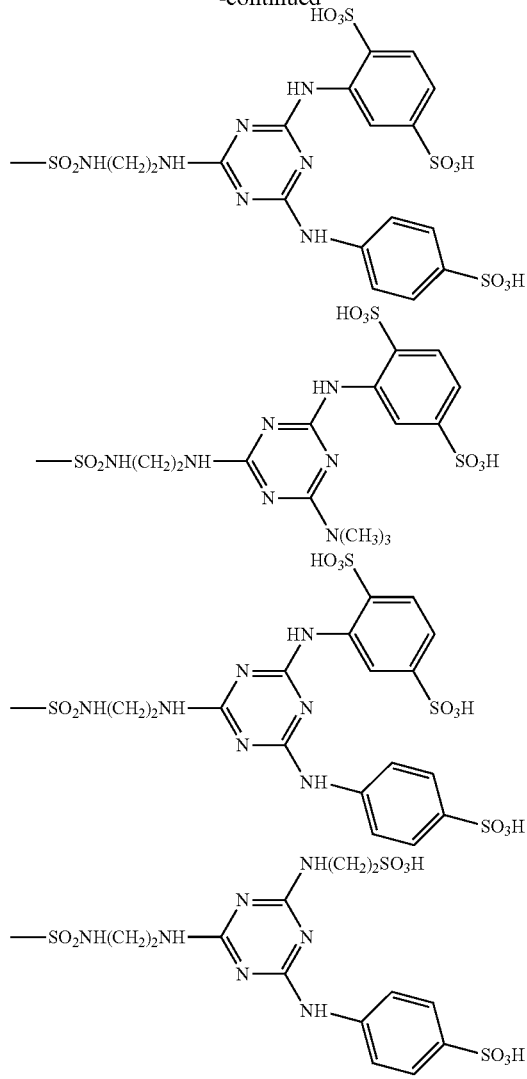
Specific examples of the phthalocyanine dye represented by the Formula (III-2) will be described below, but the present invention is not limited to these examples.
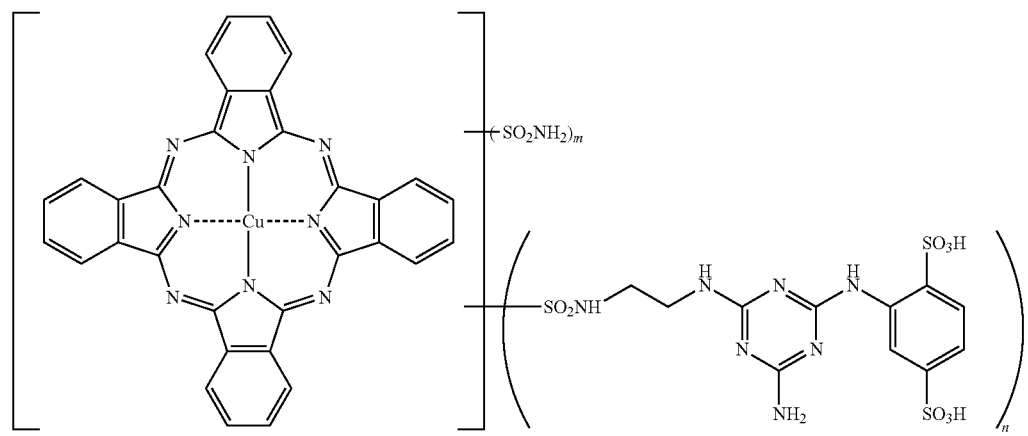

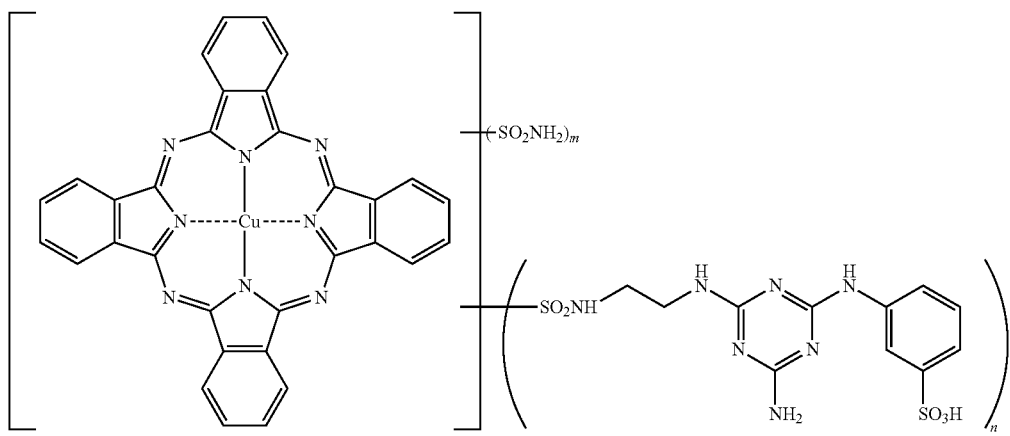
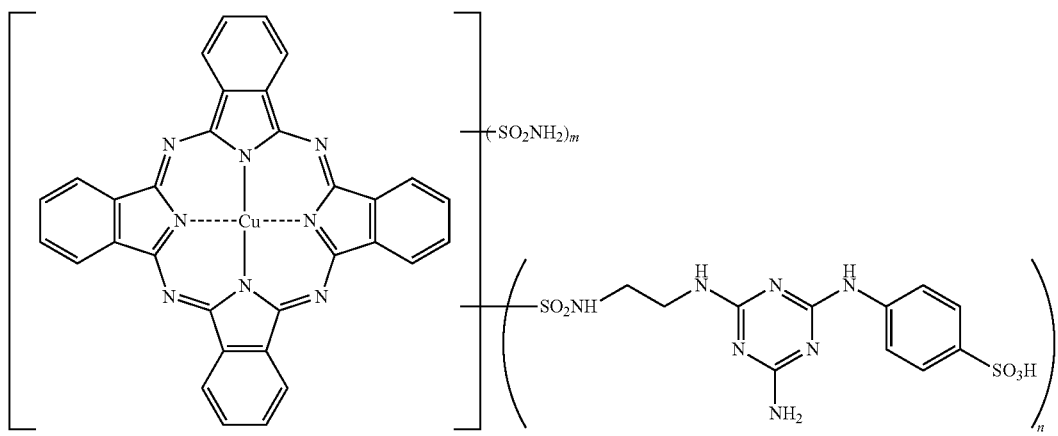
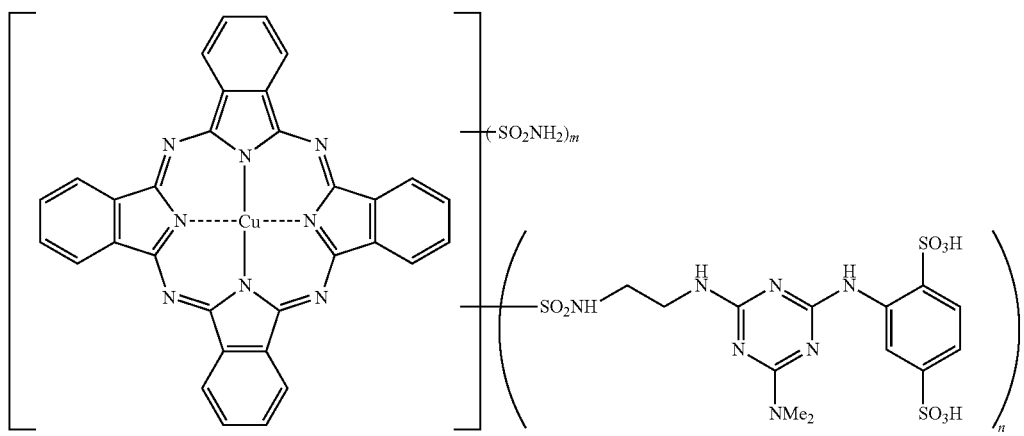

-continued
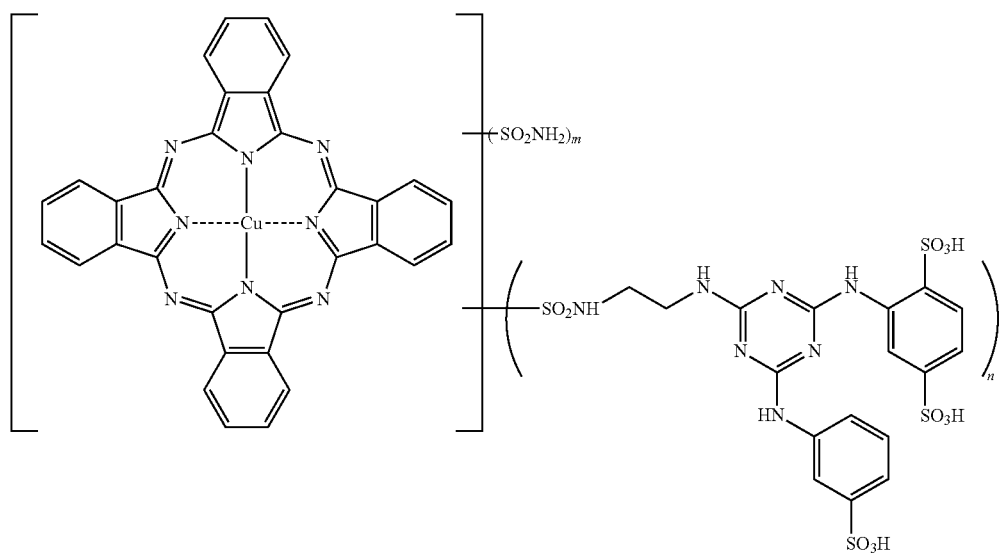
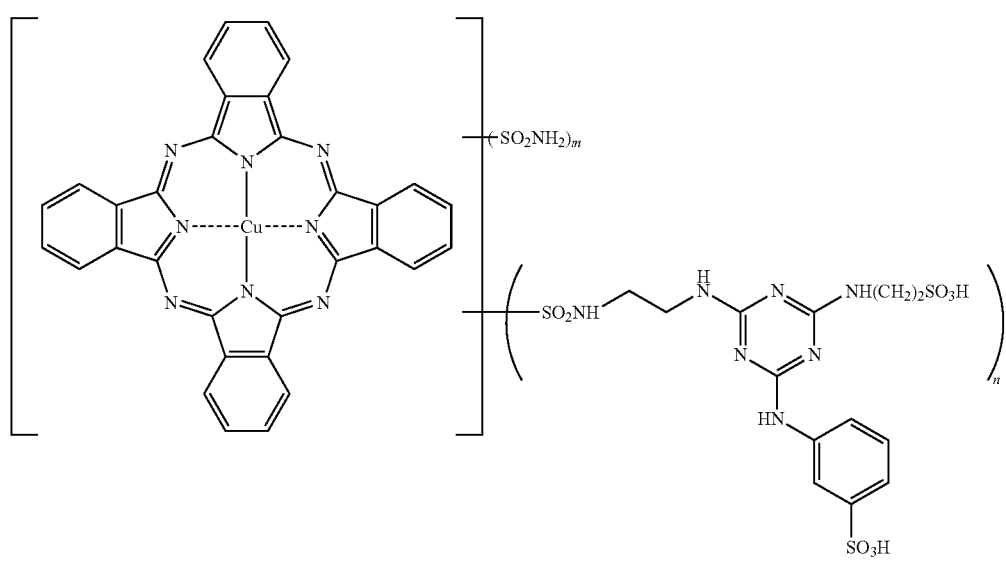
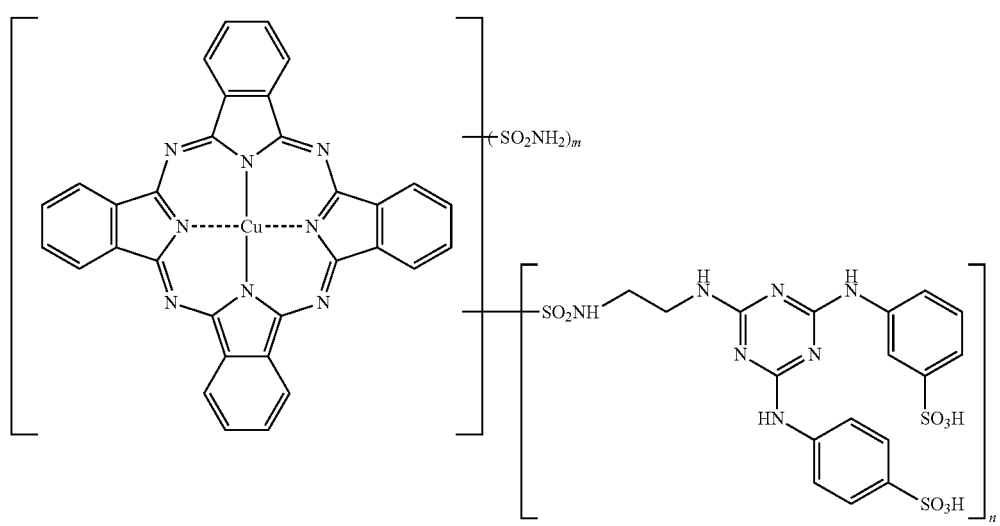

-continued
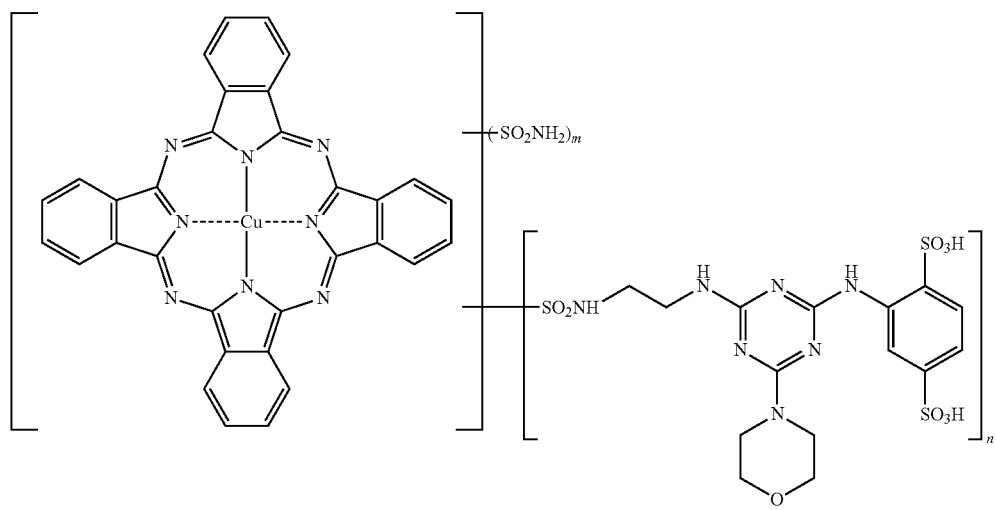
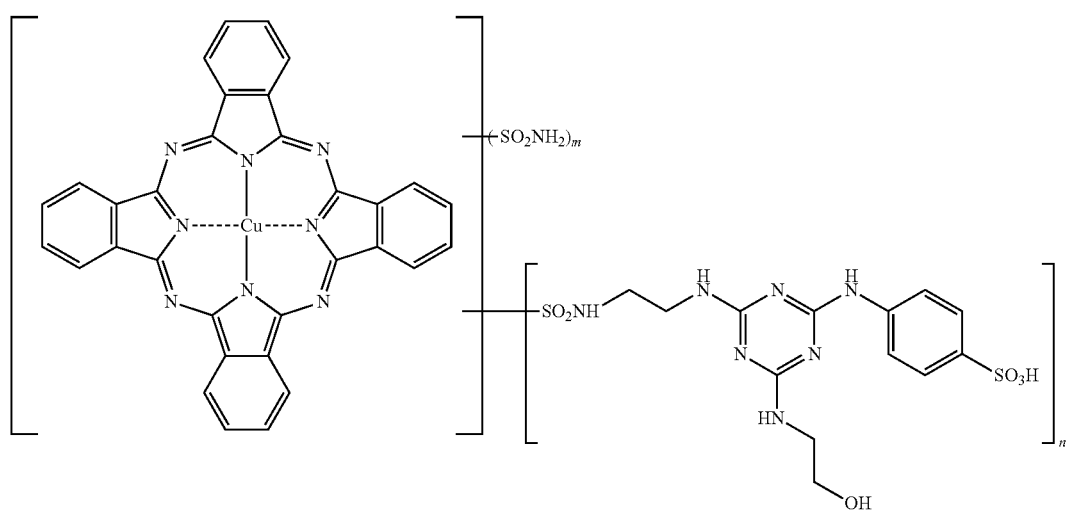
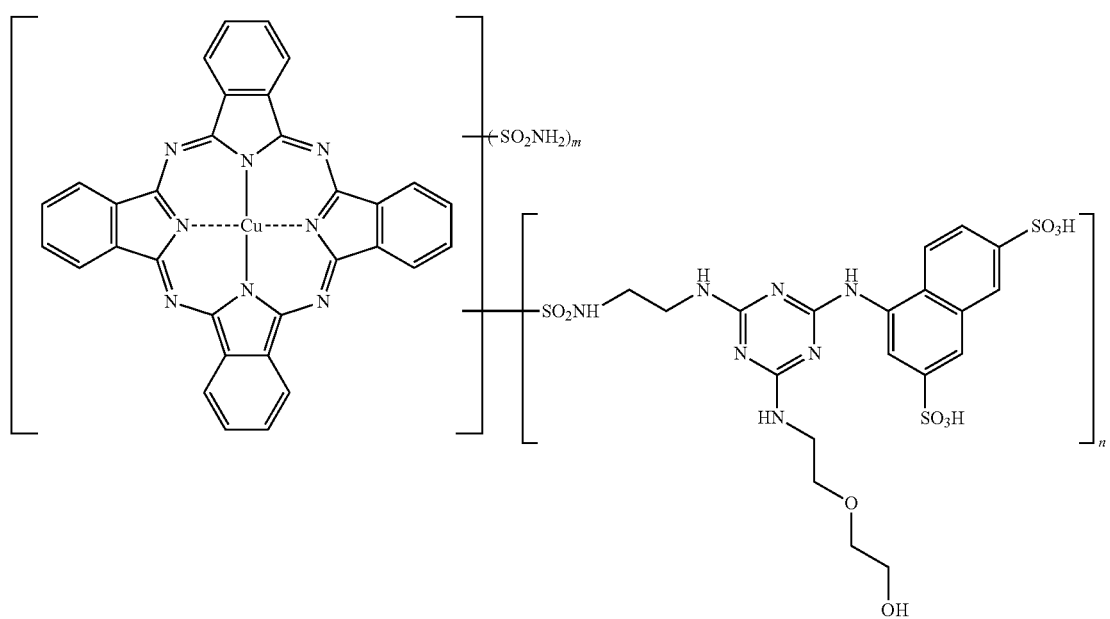

-continued
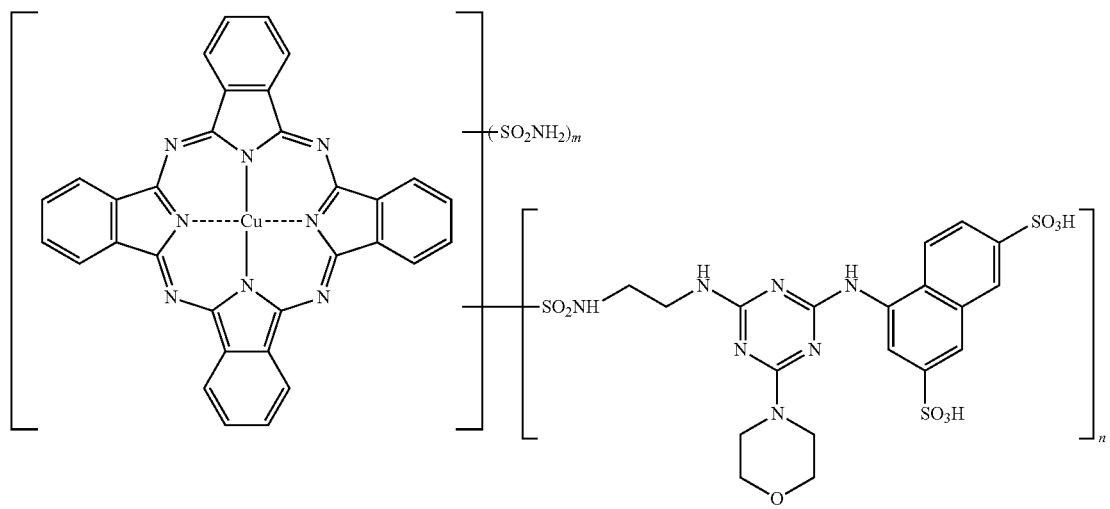
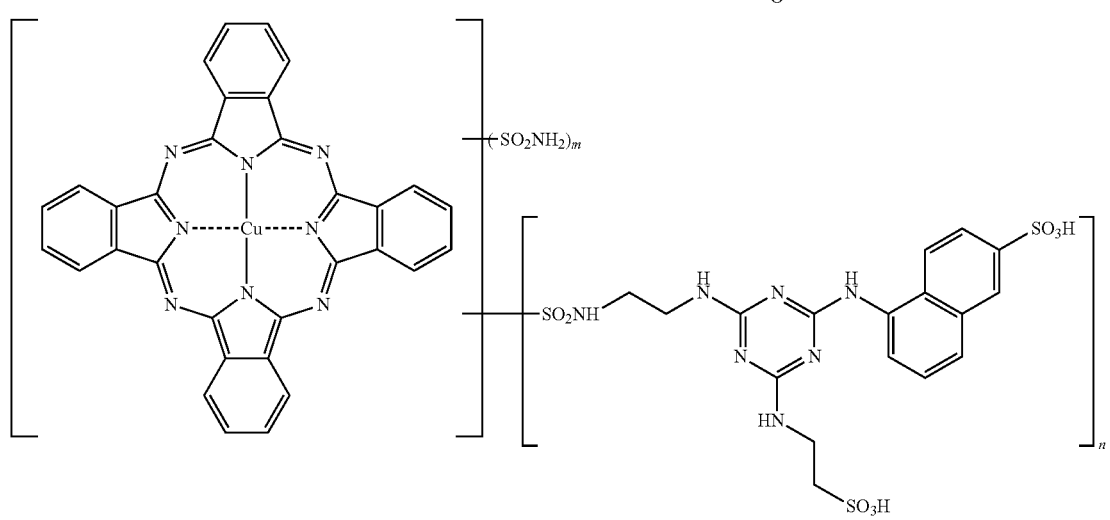
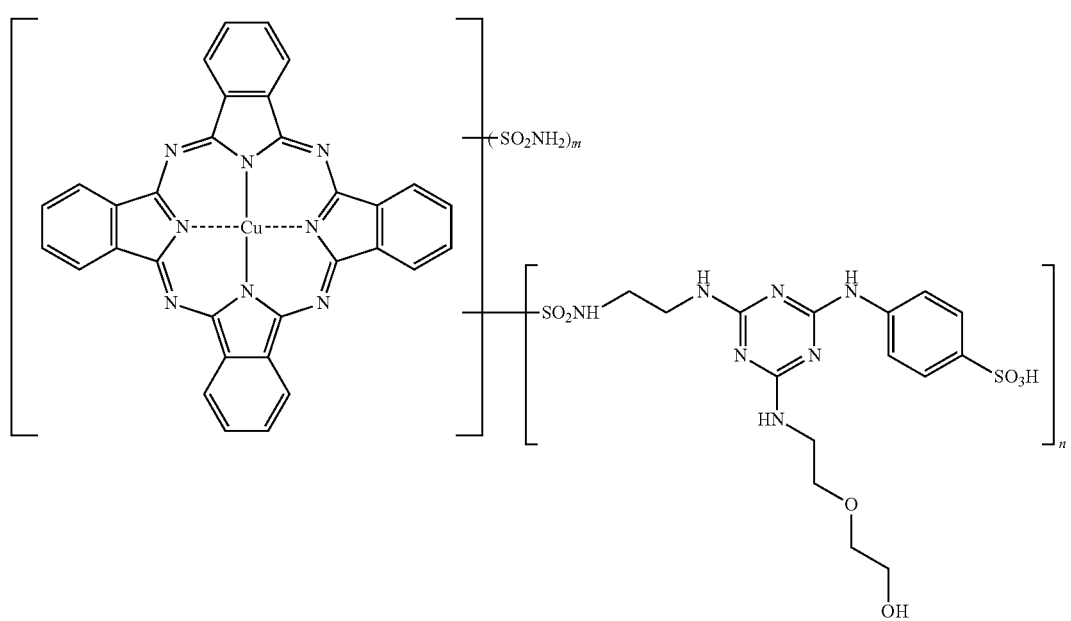

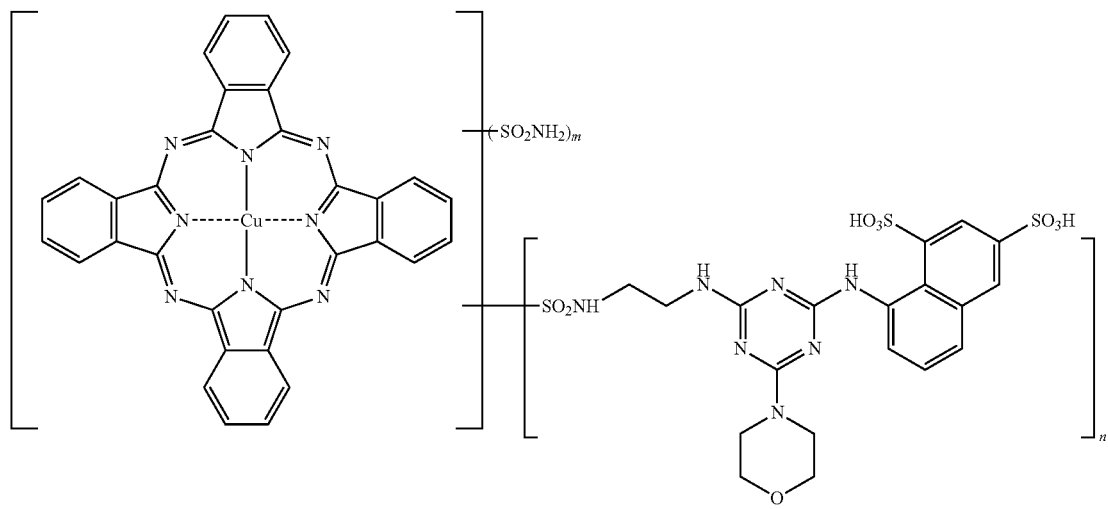
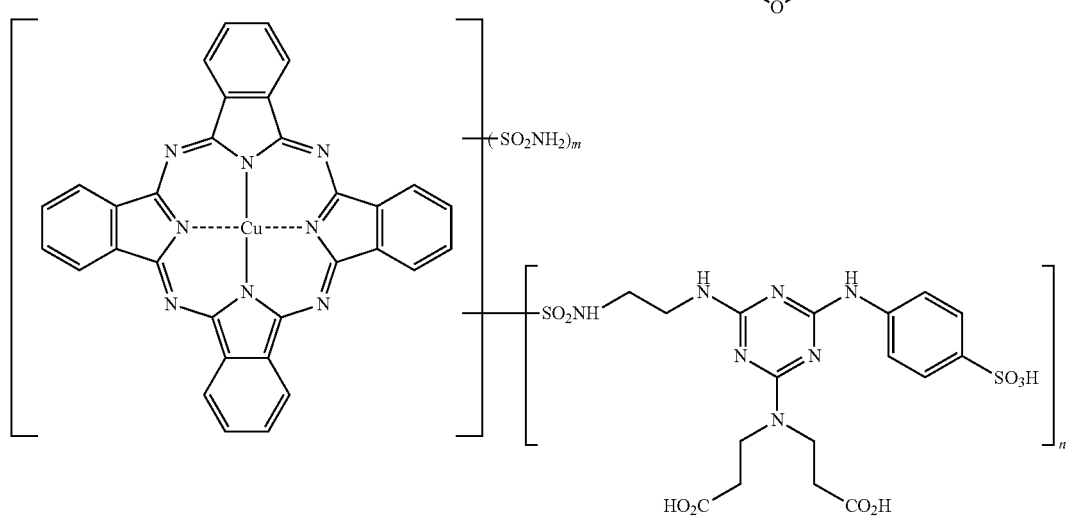
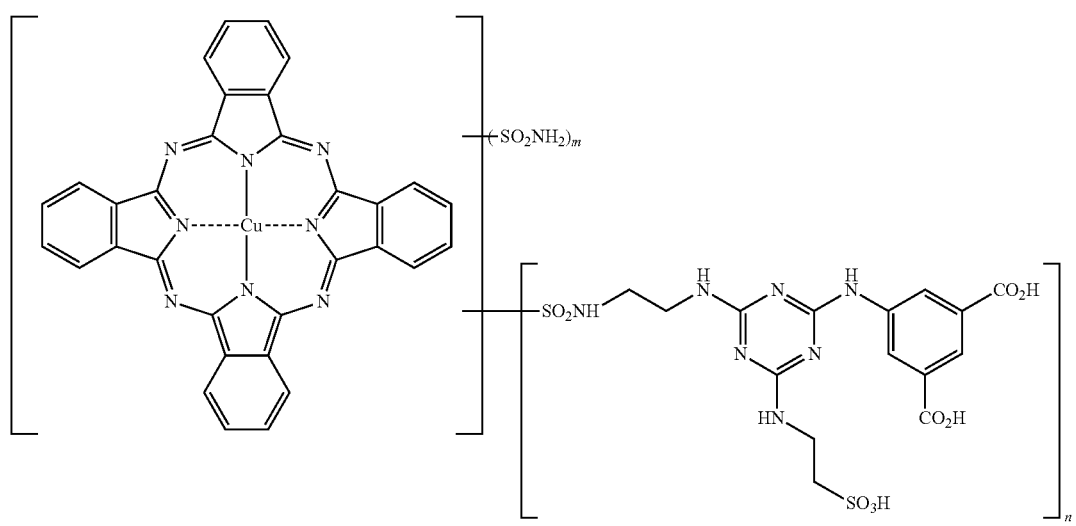

-continued
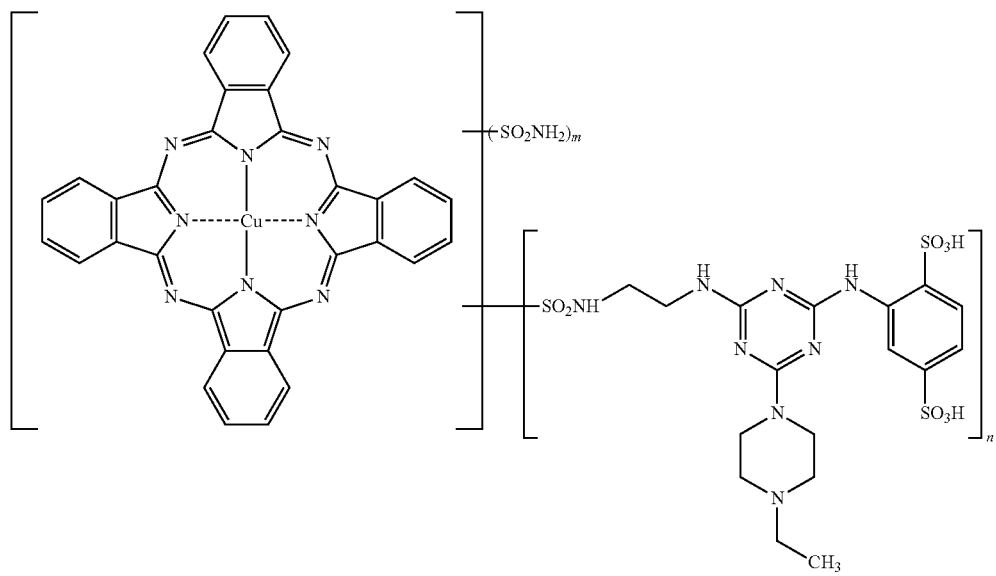
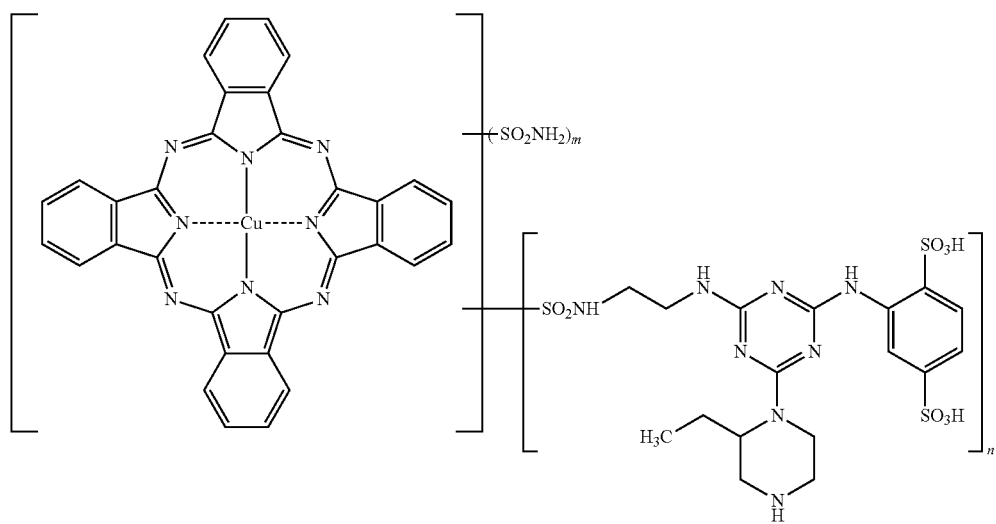
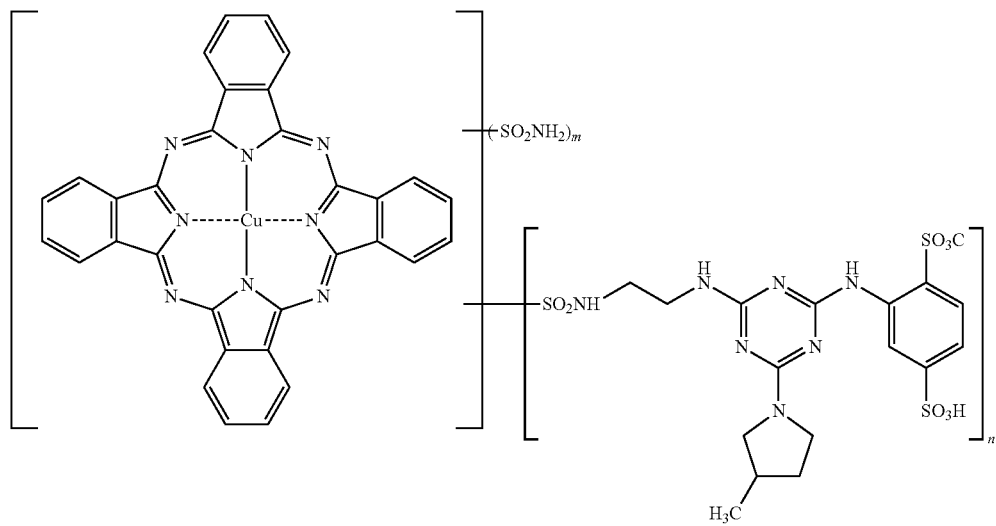

-continued
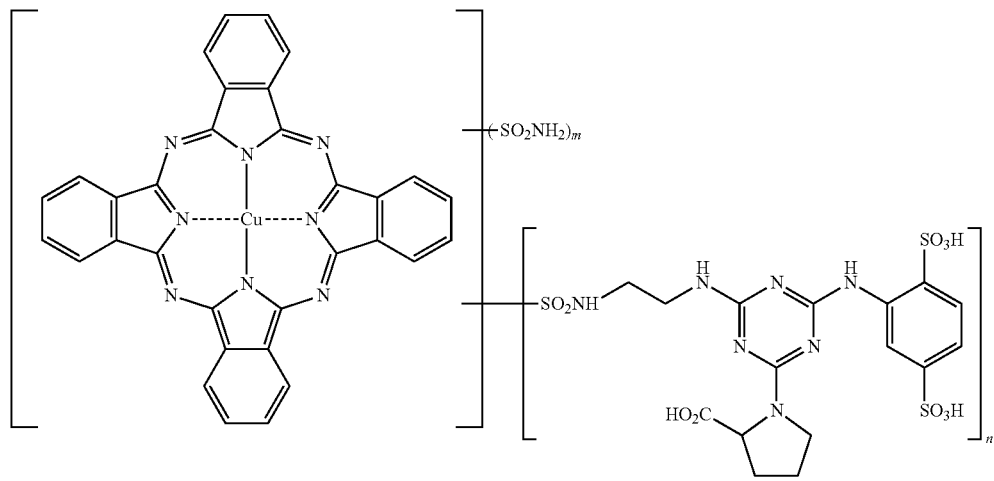
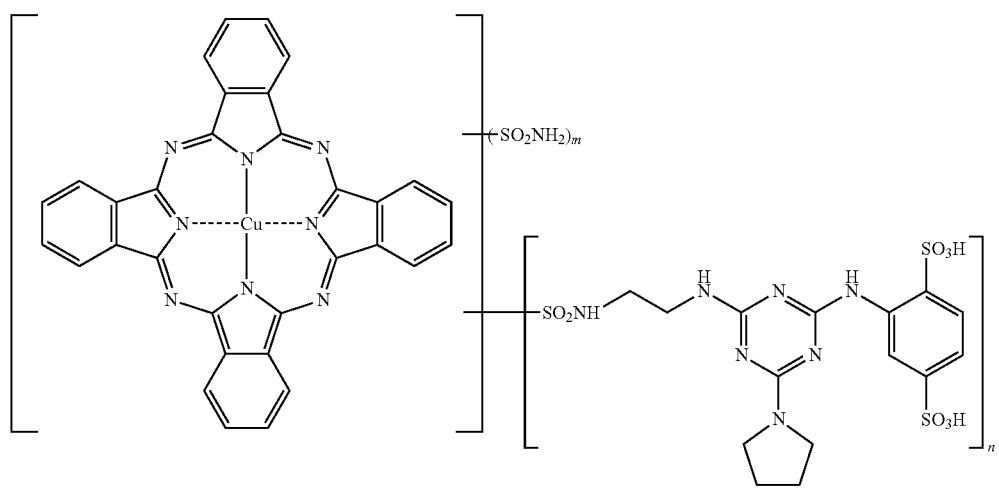
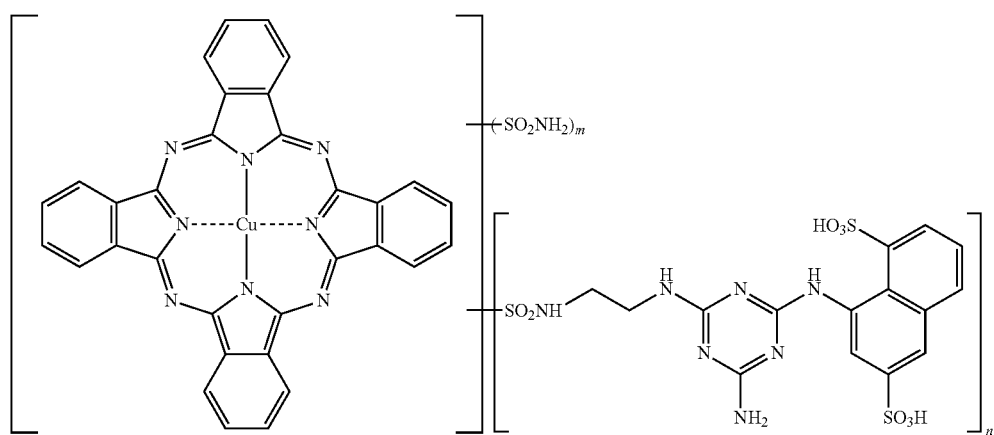

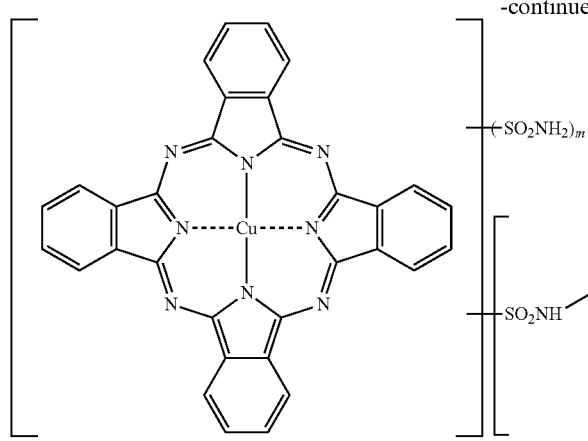
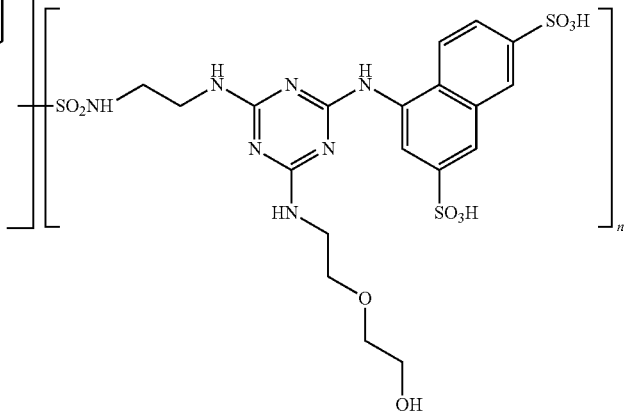

[Synthesis of Phthalocyanine Dye Represented by Formula (III-2)]

The phthalocyanine derivatives represented by the Formula (III-2) can be, for example, synthesized by the method described in Japanese Patent Application Laid Open No. 2004-329677.

[Compound Represented by Formula (AB9)]

The coloring composition of the present invention may also contain a compound (Acid Blue 9) represented by the Formula (AB9).

(AB9)

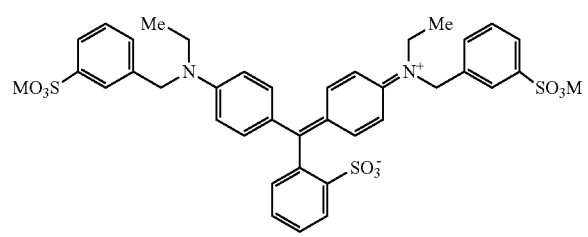

In Formula (AB9),

Me represents a methyl group, and M represents a hydrogen atom, a lithium, a sodium, a potassium, or an ammonium.

M is preferably sodium, potassium or ammonium, because of the ease of availability and solubility, or sodium or ammonium is more preferred, and sodium is most preferred.

The coloring composition of the present invention containing Acid Blue 09, in addition to the phthalocyanine dye represented by the Formula (1), and the phthalocyanine dye represented by the Formula (I-2), the Formula (II-2) or the Formula (III-2) is also one of the preferred embodiments. As a combination of Acid Blue 9 with high print density, it is possible to achieve a print density at a higher level, and to achieve both good fastness and higher printing density.

Acid Blue 9 preferably used in combination of in the present invention may be easily available as a commercial product (for example, prepared by Tokyo Kasei, Catalog No. B0790).

[Coloring Composition]

The coloring composition of an aspect I of the present invention contains the phthalocyanine dye represented by the Formula (1) and the phthalocyanine dye represented by the Formula (I-2). By using α-substituted type dye of the Formula (1) and the β-substituted type dye of Formula (I-2), the ratio adjustment of α-position and β-position between molecules, not intramolecular is enabled, and as a result, it is possible to achieve both good fastness and high print density.

The coloring composition of an aspect II of the present invention contains the phthalocyanine dye represented by the Formula (1) and the azaphthalocyanine dye represented by the Formula (II-2). By using α-substituted type dye of the Formula (1) and the azaphthalocyanine dye of Formula (II-2) having a nitrogen atom in a part of the phthalocyanine structure, the control of the association is enabled, and as a result, it is possible to achieve both good fastness and high print density.

The coloring composition of an aspect III of the present invention contains the phthalocyanine dye represented by the Formula (1) and the phthalocyanine dye represented by the Formula (III-2). By using α-substituted type dye of the Formula (1) and the phthalocyanine dye of Formula (III-2) having a specific substituent group, the ratio adjustment of α-position and β-position between molecules, not intramolecular is enabled, and as a result, it is possible to achieve both good fastness and high print density.

The coloring composition of the present invention can be preferably used as a coloring composition for image formation. The use of the coloring composition of the invention includes an image recording material for forming an image, in particular a color image, and specifically, including the recording material for inkjet system described in detail below, heat-sensitive transfer-type image recording material, pressure-sensitive recording material, recording material using an electrophotographic system, transfer-type silver halide light-sensitive material, printing inks, recording pens and the like are preferred, and recording material for inkjet system, heat-sensitive transfer-type image recording material, and recording material using an electrophotographic system are more preferred, and the recording material for inkjet system is far more preferred. Further, the coloring composition can also be applied to a dye solution for dyeing various fibers or the color filter used in solid-state image pickup device such as LCD and CCD described in U.S. Pat. No. 4,808,501 specification, Japanese Patent Laid-Open No. Hei 6-35182, or the like. The phthalocyanine dye used in the present invention may be used by adjusting physical properties such as solubility and thermal mobility suitable for its application by the substituent groups. In addition, the phthalocyanine dye used in the present invention may be used in the uniformly dissolved state or the dispersed melt state as emulsion dispersion depending on the system used Among the coloring composition, the mass ratio of the phthalocyanine dye represented by the Formula (1) and the phthalocyanine dye represented by the Formula (I-2), the Formula (II-2) or the Formula (III-2) is preferably 50/50 to 10/90, and more preferably 40/60 to 20/80. By setting the mass ratio of the dye within the above range, an stability over time (e.g., change in viscosity or precipitation, etc.) at high concentration of the coloring composition is excellent, also an ozone fastness of the print sample using the corresponding coloring composition is excellent, and also an excellent print density can be obtained.

In addition, among the coloring composition, the content of the phthalocyanine dye represented by the Formula (1) is preferably 0.1% by mass to 10% by mass. If the content is less than 0.1% by mass, the stability over time at high concentrations of the coloring composition and the print density are inferior, and if the content is greater than 10% by mass, the ozone fastness of the print sample is lowered.

In the present invention, even when the dye content of the coloring composition (i.e., the total amount of the phthalocyanine dye represented by the Formula (1), and the phthalocyanine dye represented by the Formula (I-2), the Formula (II-2), and the Formula (III-2)) corresponds to the concentrated dye solutions of 15% by mass to 20% by mass, it was found that the precipitation over time of the dye can be suppressed. From this, the coloring composition of the invention is also useful as a concentrated inkjet ink.

When containing Acid Blue 9 in addition to the phthalocyanine dye represented by the Formula (1) and the phthalocyanine dye represented by the above Formula (I-2), the Formula (II-2) or the Formula (III-2), the mass ratio of the sum of the phthalocyanine dye represented by the Formula (1) and the phthalocyanine dye represented by Formula (I-2), the Formula (II-2), or the Formula (III-2) and Acid Blue 9 is preferably from 90/10 to 99/1, and more preferably from 95/5 to 97.5/2.5. By setting the mass ratio of the dye within the above range, a stability over time (e.g., change in viscosity or precipitation, etc.) at high concentration of the coloring composition is superior, also an ozone fastness of the print sample using the corresponding coloring composition is maintained, and especially characteristics such as an excellent print density can be obtained.

[Ink for Inkjet Recording]

Next, ink for inkjet recording of the present invention will be described. The ink for inkjet recording of the present invention contains the coloring composition. The ink for inkjet recording can be prepared by dissolving and/or dispersing the phthalocyanine compound in a lipophilic medium or an aqueous medium. The ink using the aqueous medium is preferred. If necessary, other additives may be contained within the range of not spoiling the effect of the present invention. Other additives include for example known additives such as anti-drying agents (wetting agents), anti-fading agents, emulsion stabilizers, penetration enhancers, UV absorbers, preservatives, antifungal agents, pH adjusting agents, surface tension modifiers, defoamers, viscosity modifiers, dispersants, dispersion stabilizers, rust inhibitors, and chelating agents. These various additives can be added directly to the liquid ink in the case of a water-soluble ink. When used in the form of a dispersion of oil-soluble dye, it is generally added to the dispersion after preparation of the dye dispersion, but the additives may be added to the oil phase or an aqueous phase upon preparation.

The anti-drying agents are suitably used for the purpose of preventing clogging according to drying of the corresponding inkjet ink in the ink injection port of the nozzle used in the ink jet recording system.

As the anti-drying agents, the water-soluble organic solvent having a lower vapor pressure than that of water is preferred. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetyleneglycol derivatives, glycerin, trimethylolpropane, and the like; lower alkyl ethers of polyhydric alcohols such as ethylene glycol monomethyl (or ethyl)ether, diethylene glycol monomethyl (or ethyl)ether, triethylene glycol monoethyl (or butyl)ether, and the like; heterocyclic group such as 2-pyrrolidone, N-methyl-2-pyrrolidone, 1,3-dimethyl-2-imidazolidinone, N-ethylmorpholine, and the like; sulfur-containing compounds such as sulfolane, dimethylsulfoxide, 3-slforen, and the like; polyfunctional compounds such as diacetone alcohol, diethanol amine, and the like; and urea derivatives. Among them, polyhydric alcohols such as glycerin, diethylene glycol, and the like are more preferred. Further, the above anti-drying agents may be also used either alone or in combination of two or more thereof. These anti-drying agents may be preferably contained in 10% by mass to 50% by mass of the ink.

Penetration enhancers can be suitably used for the purpose of better penetration of ink-jet the ink into the paper. As penetration enhancers, alcohols such as ethanol, isopropanol, butanol, di(tri) ethyleneglycol monobutyl ether, 1,2-hexanediol, and the like; or nonionic surfactants such as sodium lauryl sulfate, sodium oleate, and the like can be used. If the enhancers are contained in 5% by mass to 30% by mass of the ink, the effect is usually sufficient, and the enhancers may be preferably used in the range that does not cause print smearing or paper omission (print-through).

UV absorbers can be used for the purpose of improving storage stability of an image. As UV absorbers, benzotriazole-based compounds described in Japanese Laid-Open Patent Application No. Sho 58-185677, Japanese Patent Laid-Open No. Sho 61-190537, Japanese Patent Laid-Open No. Hei 2-782, Japanese Patent Laid-Open No. Hei 5-197075, Japanese Patent Laid-Open No. Hei 9-34057, and the like; benzophenone-based compound described in Japanese Patent Laid-Open No. Sho 46-2784, Japanese Patent Laid-Open No. Hei 5-194483, U.S. Pat. No. 3,214,463 specification, and the like; cinnamic acid compounds described in Japanese Patent Laid-Open Publication No. Sho 48-30492, Japanese Patent Laid-Open No. Sho 56-21141, Japanese Patent Laid-Open No. Hei 10-88106, and the like; triazine-based compound described in Japanese Patent Application Laid-open No. Hei 4-298503, Japanese Patent Laid-Open No. Hei 8-53427, Japanese Patent Laid No. Hei 8-239368, Japanese Patent Laid-Open No. Hei 10-182621, Japanese Patent Laid-Open No. Hei 8-501291, and the like; the compound described in research Disclosure No. 24239, or a compound which emits fluorescence by absorbing ultraviolet radiation such as stilbene compounds and benzoxazole-based compounds; and so-called fluorescent brightener can also be used.

Anti-fading agents can be used for the purpose of improving storage stability of an image. As anti-fading agents, various organic type and metal complex type anti-fading agents can be used. Examples of the organic type anti-fading agents include hydroquinones, alkoxy phenols, dialkoxy phenols, phenols, anilines, amines, indans, chromans, alkoxy anilines, heterocyclic groups, and the like, and examples of the metal complex include nickel complex, zinc complex, and the like. More specifically, the compounds described in the patents cited in the sections I to J of Chapter VII of Research Disclosure No. 17643, Research Disclosure No. 15162, the left-hand column of the page 650 of Research Disclosure No. 18716, the page 527 of Research Disclosure No. 36544, the page 872 of Research Disclosure No. 307105, and Research Disclosure No. 15162 or the compounds included in compound examples and the formulas of representative compounds described in page 127 to page 137 of the Japanese Laid-Open Patent Publication No. Sho 62-215272 can be used.

Examples of antifungal agents include sodium dehydroacetate, sodium benzoate, sodium pyridinethione-1-oxide, p-hydroxybenzoic acid ethyl ester, 1,2-benzisothiazolin-3-one and salts thereof, and the like. The agents can be preferably used from 0.02% by mass to 1.00% by mass in the ink.

As the pH adjusting agents, the neutralizer (organic base, inorganic alkali) may be used. The pH adjusting agents may be preferably added for the purpose of improving the storage stability of the ink for inkjet recording, so that the corresponding ink for inkjet recording is preferably pH 6 to pH 10, and more preferably pH 7 to 10.

Examples of surface tension modifiers include non-ionic, cationic or anionic surfactants. The surface tension of the inkjet inks of the present invention is preferably 25 mN/m to 70 mN/m. In addition, 25 mN/m to 60 mN/m is preferred. Further, viscosity of the ink for inkjet recording of the present invention is preferably less than 30 mPa·s. Being adjusted to less than 20 mPa·s or is more preferred. As examples of surfactants, anionic surfactants such as fatty acid salts, alkyl sulfate ester salts, alkyl benzene sulfonate salts, alkyl naphthalene sulfonate salts, dialkyl sulfosuccinate salts, alkyl phosphate ester salts, naphthalene sulfonic acid formalin condensates, polyoxyethylene alkyl sulfate ester salts, and the like; or nonionic surfactants such as polyoxyethylene alkyl ethers, polyoxyethylene alkyl allyl ether, polyoxyethylene fatty acid esters, sorbitan fatty acid esters, polyoxyethylene sorbitan fatty acid esters, polyoxyethylene alkylamines, glycerin fatty acid ester, oxyethylene oxypropylene block copolymers, and the like are preferred. Further, an acetylenic polyoxyethylene oxide surfactant, SURFYNOLS (Air Products & Chemicals Inc.) is also preferably used. In addition, amine oxide type amphoteric surfactants such as N,N-dimethyl-N-alkylamine oxide are also preferred. Moreover, the surfactants described by way of examples in page 37 to page 38 of Japanese Patent Laid-Open No. Sho 59-157636 and Research Disclosure No. 308119 (1989 year) may be used.

As a defoaming agent, if necessary, fluorine-based compounds, silicone-based compounds, or chelating agents represented by EDTA, or the like can be used.

When the phthalocyanine compound of the invention is dispersed in an aqueous medium, the colored fine particles containing the colorant and oil-soluble polymer can preferably be dispersed in an aqueous medium, as described in each of Japanese Patent Laid-Open No. Hei 11-286637, Japanese Patent Application No. 2000-78491, Japanese Patent Application No. 2000-80259, Japanese Patent Application No. 2000-62370, and the like, or the compound of the invention dissolved in organic solvent having a high boiling point can be preferably dispersed in an aqueous medium, as described in each specification of JP, colorant-containing polymer and the availability for, or Japanese Patent Application No. 2000-78454, Japanese Patent Application No. 2000-78491, Japanese Patent Application Article No. 2000-203856, Japanese Patent Application No. 2000-203857, and the like. A specific method in the case of dispersing the compound of the present invention in an aqueous medium, an oil-soluble polymer used, a high-boiling organic solvent, additives and the used amount thereof can be preferably used as those described in the above-mentioned Patent publications or the like. Alternatively, the phthalocyanine compound may be dispersed in the state of fine particles as a solid. At the time of dispersion, it is possible to use a dispersant or a surfactant. As the dispersion device, a simple stirrer, an impeller stirring system, in-line stirring system, mill system (e.g., colloid mill, ball mill, sand mill, attritor mill, roll mill, agitator mill, etc.), an ultrasonic method, a high-pressure emulsification dispersion method (high-pressure homogenizer; Gaulin homogenizer as a specific commercial device, micro fluidizer, DeBEE2000, etc.) can be used. The preparation method of the above ink for inkjet recording is, in addition to the aforementioned patents, described in detail in Japanese Patent Application Laid-Open Patent No. Hei 5-148436, Japanese Patent Laid-Open No. Hei 5-295312, Japanese Patent Laid-Open No. Hei 7-97541, Japanese Patent Laid-Open No. Hei 7-82515, Japanese Patent Laid-Open No. Hei 7-118584, Japanese Patent Laid-Open No. Hei 11-286637, Japanese Patent Application No. 2000-87539, and the like, and it can also be used in the preparation of ink for ink jet recording of the present invention.

The aqueous medium may optionally use mixtures obtained by adding water-miscible organic solvent by using water as a main component. Examples of the water-miscible organic solvent include an alcohol (e.g., methanol, ethanol, propanol, isopropanol, butanol, isobutanol, sec-butanol, t-butanol, pentanol, hexanol, cyclohexanol, benzyl alcohol), Polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), and amines (e.g., ethanolamine, diethanolamine, triethanolamine, N-methyldiethanolamine, N-ethyl diethanolamine, morpholine, N-ethyl morpholine, ethylene diamine, diethylene triamine, triethylene tetramine, polyethylene imine, tetramethyl propylene diamine) and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone) and the like. Further, the water-miscible organic solvent may be used in combination of two or more thereof.

In 100 parts by mass of the ink for inkjet recording of the present invention, the phthalocyanine compound may be preferably contained in less than 0.2 parts by mass to 20 parts by mass, more preferably 1 part by mass to 10 parts by mass, far more preferably 3 parts by mass to 5 parts by mass, and most preferably 4 parts by mass to 5 parts by mass. Further, the ink for inkjet of the present invention may be used in combination of the other dyes, together with the phthalocyanine compound. When two or more kinds of colorants are used in combination, the sum of the content of the colorant is preferably within the above-described range.

The ink for inkjet recording of the present invention preferably has a viscosity of 40 cp or less. Further, the surface tension is preferably 20 mN/m to 70 mN/m. Viscosity and surface tension can be adjusted by adding various additives, for example, viscosity modifiers, surface tension adjusting agent, a specific resistance modifier, a film adjusting agent, an ultraviolet absorber, an antioxidant, an anti-fading agent, antifungal agent, rust preventives, a dispersant and a surfactant.

The ink for inkjet recording of the present invention can be used not only to form a monochromatic image, but also to form a full color image. In order to form a full color image, a magenta color tone ink, a cyan color tone ink, and a yellow color tone ink can be used, and also, in order to match color tone, the black color tone ink may be used again.

As a yellow dye can be applied, it is possible to use any dye. For example, a coupling component (hereinafter, referred to as a coupler component) includes aryl or heteryl azo dyes having heterocyclic groups such as phenols, naphthols, anilines, pyrazolone, or pyridone, open-chain active methylene compounds, and the like; for example, azomethine dyes having an open chain-type active methylene compounds as a coupler component; for example, methine dyes such as benzylidene dyes or monomethine oxonol dyes, or the like; for example, quinone dyes such as naphthoquinone dyes, anthraquinone dyes, or the like; and other dye species include quinophthalone dyes, nitro, nitroso dyes, acridine dyes, acridinone dyes, and the like As a magenta dye can be applied, it is possible to use any dye. For example, coupler components include aryl or heteryl azo dyes having phenols, naphthols, anilines, and the like; for example, azomethine dyes having pyrazolones, pyrazolo triazoles, and the like as a coupler component; for example, methine dyes such as arylidene dyes, styryl dyes, merocyanine dyes, cyanine dyes, oxonol dyes, and the like; for example, carbonium dyes such as diphenylmethane dyes, triphenylmethane dyes, xanthene dyes, and the like; for example, quinone dyes such as naphthoquinone, anthraquinone, anthrapyridone, and the like; for example, condensed polycyclic dyes such as dioxazine dyes, and the like.

As cyan dyes can be applied, it is possible to use any dye. For example, coupler components include aryl or heteryl azo dyes having phenols, naphthols, anilines, and the like; for example, azomethine dyes having heterocycles such as phenols, naphthols, pyrrolo triazole, and the like as a coupler component; polymethine dyes such as cyanine dyes, oxonol dyes, melocyanine dyes, and the like; carbonium dyes such as diphenylmethane dyes, triphenylmethane dyes, xanthene dyes, and the like; phthalocyanine dyes; anthraquinone dyes; Indigo, dioindigo dyes, and the like.

In each dye described above, a part of the chromophore may be dissociated to exhibit respective colors of yellow, magenta, and cyan for the first time, in that case, the counter cation may be an inorganic cation such as an alkali metal or an ammonium salt, or an organic cation such as pyridinium and quaternary ammonium salts, and further a polymer cation having these cations as a partial structure. Examples of the black material can be applied include the dispersion of carbon black in addition to disazo, trisazo, tetraazo dyes, and the like.

(the Inkjet Recording Method)

The inkjet recording method of the present invention donates energy to the ink for inkjet recording to form an image on a known image receiving material, that is, plain paper, resin coated paper, for example, inkjet paper described in Japanese Patent Laid-Open No. Hei 8-169172, Japanese Patent Laid-Open Publication No. Hei 8-27693 Ho, Japanese Patent Laid-Open No. Hei 2-276670, Japanese Patent Laid-Open No. Hei 7-276789, Japanese Patent Laid-Open No. Hei 9-323475, Japanese Patent Laid-Open No. Sho 62-238783, Japanese Patent Laid-Open Publication No. Hei 10-153989, Japanese Patent Laid-Open No. Hei 10-217473, Japanese Patent Laid-Open No. Hei 10-235995, Japanese Patent Laid-Open No. Hei 10-337947, Japanese Patent Laid-Open No. Hei 10-217597, Japanese Patent Laid-Open No. Hei 10-337947, and the like, film, electrophotographic common paper, cloth, glass, metal, ceramics, or the like.

When forming an image, it is also possible to use in combination of a polymer fine particle dispersion (also referred to as polymer latex) for the purpose of giving glossiness and water resistance or improving the weather resistance. The timing of imparting the polymer latex on the image receiving material may be good before or after the colorant is added, or even simultaneously. Thus, the place where to be added may be a receiving paper, an ink, or a liquid of the polymer latex alone. Specifically, the methods described in each specification of Japanese Patent Application No. 2000-363090, Japanese Patent Application No. 2000-315231, Japanese Patent Application No. 2000-354380, Japanese Patent Application No. 2000-343944, Japanese Patent Application No. 2000-268952, Japanese Patent Application No. 2000-299465, Japanese Patent Application No. 2000-297365, and the like can be preferably used.

Hereinafter, the recording paper and recording film used in the inkjet printing using the ink of the present invention will be described. The support in the recording paper or the recording film comprises chemical pulp LBKP, the NBKP, or the like, mechanical pulp such as GP, PGW, RMP, TMP, CTMP, CMP, CGP, or the like, waste paper pulp such as DIP, or the like, if necessary by mixing additives such as conventional known pigments, binders, sizing agents, fixing agents, cationic agents, paper strengthening agents or the like, and using the paper manufactured by various devices such as fourdrinier paper machine or cylinder paper machine or the like. In addition to these supports, any of a synthetic paper or a sheet of plastic film is preferred, and the thickness of the support is preferably 10 μm to 250 μm, and basis weight is preferably 10 g/m$^2$ to 250 g/m$^2$. On the support, an ink receiving layer and a back coating layer may be provided as they are, or after providing a size press or an anchor coating layer by using starch, polyvinyl alcohol, or the like, the ink receiving layer and the back coating layer may be provided. In addition, the support may be flattening treated by a calendering apparatus such as a machine calender, TG calender, soft calender or the like. In the present invention, as the support, the paper and plastic films on both sides laminated with polyolefin (e.g., polyethylene, polystyrene, polyethylene terephthalate, polybutene, and copolymers thereof) are more preferred. A white pigment (e.g., titanium oxide or zinc oxide) or a coloring dye (e.g., cobalt blue, ultramarine, neodium oxide) is preferably added into the polyolefin.

The ink-receiving layer provided on a support contains a pigment and an aqueous binder. As the pigment, a white pigment is preferred, and as the white pigment, a white inorganic pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, zinc carbonate, and the like, and organic pigments such as styrene pigments, acrylic pigments, urea resins, and melamine resins, and the like. As the white pigment contained in the ink receiving layer, porous inorganic pigments are preferred, and particularly the synthetic amorphous silica having a large pore area is preferred. As a synthetic amorphous silica, any of silicic acid anhydride obtained by a dry production process and hydrous silicate obtained by a wet production method can be used, but particularly hydrous silicate may be preferably used.

The aqueous binder contained in the ink receiving layer includes water-soluble polymers such as polyvinyl alcohol, silanol-modified polyvinyl alcohol, starch, cationized starch, casein, gelatin, carboxymethyl cellulose, hydroxyethyl cellulose, polyvinyl pyrrolidone, polyalkylalkylene oxide, polyalkylene oxide derivatives, and the like, and water-dispersible polymers such as styrene butadiene latex, acrylic emulsion, and the like. These aqueous binders may be used alone or in combination of two or more thereof. In the present invention, among them, in particular polyvinyl alcohol, silanol-modified polyvinyl alcohol is preferred in terms of the adhesion to the pigment and peeling resistance of the ink-receiving layer. The ink receiving layer may contain mordant, water-proofing agents, light resistance improving agents, surfactants, and other additives, in addition to the pigment and aqueous binder.

The mordant added to the ink receiving layer, which is preferably immobilized. To do this, a polymer-mordant is preferably used. Examples of the polymer-mordant are described in each specification of Japanese Patent Laid-Open No. Sho 48-28325, Japanese Patent Laid-Open No. Sho 54-74430, Japanese Patent Laid-Open No. Sho 54-124726, Japanese Patent Laid-Open No. Sho 55-22766, Japanese Patent Laid Publication No. Sho 55-142339, Japanese Patent Laid-Open No. Sho 60-23850, Japanese Patent Laid-Open No. Sho 60-23851, Japanese Patent Laid-Open No. Sho 60-23852, Japanese Patent Laid-Open No. Sho 60-23853, Japanese Patent Laid Publication No. Sho 60-57836, Japanese Patent Laid-Open No. Sho 60-60643, Japanese Patent Laid-Open No. Sho 60-118834, Japanese Patent Laid-Open No. Sho 60-122940, Japanese Patent Laid-Open No. Sho 60-12294, Japanese Patent Laid-Open No. Sho 60-122942, Japanese Patent Laid-Open No. Sho 60-235134, Japanese Patent Laid-Open No. Hei 1-161236, U.S. Pat. No. 84,430, U.S. Pat. No. 2,548,564, U.S. Pat. No. 3,148,061, U.S. Pat. No. 3,309,690, U.S. Pat. No. 4,115,124, U.S. Pat. No. 4,124,386, U.S. Pat. No. 4,193,800, U.S. Pat. No. 4,273,853, U.S. Pat. No. 4,282,305, and U.S. Pat. No. 4,450,224. An image-receiving material containing the polymer-mordant described in pages 212 to 215 of Japanese Patent Laid-Open Publication No. Hei 1-161236 is particularly preferred. When the polymer-mordant described in the same publication is used, the image of good image quality is obtained, and the light fastness of the image is improved.

The waterproofing agent is effective for waterproofing of an image, and as the water-proofing agent, a cationic resin is preferred. Examples of the cationic resin include polyamide polyamine epichlorohydrin, polyethyleneimine, polyamine sulfone, dimethyl diallyl ammonium chloride polymer, cationic polyacrylamide, colloidal silica and the like, and particularly polyamide polyamine epichlorohydrin is preferred among the cationic resin. The content of such cationic resin preferably ranges from 1% by mass to 15% by mass, and more preferably from 3% by mass to 10% by mass based on the total solid content of the ink receiving layer.

The light resistance improving agent includes a benzotriazole-based ultraviolet absorber such as zinc sulfate, zinc oxide, hindered amine-based antioxidants, benzophenone, and the like. Zinc sulfate is particularly preferred among them.

The surfactant functions as a coating aid, a peeling property improving agent, a sliding improving agent or an anti-static agent. The surfactant is described in Japanese Laid-Open Patent Application No. Sho 62-173463, and Japanese Patent Laid-Open No. Sho 62-183457. Instead of the surfactant, an organic fluoro compound may be used. The organic fluoro compound is preferably hydrophobic. Examples of the organic fluoro compound include fluorine-based surfactants, oily fluorine-based compound (e.g., fluorine oil) and solid fluorine compound resins (e.g., tetrafluoroethylene resin). The organic fluoro compound is described in Japanese Patent Laid-Open No. Sho 57-9053 (columns 8 to 17), Japanese Patent Laid-Open No. Sho 61-20994, and Japanese Patent Laid-Open No. Sho 62-135826. Other additives added to the ink receiving layer include pigment dispersants, thickeners, antifoaming agents, dye, fluorescent brighteners, preservatives, pH adjusting agents, matting agents, hardening agents, and the like. Also, the ink-receiving layer may be used as either one or two layer.

On the recording paper and recording film, a back coating layer may be provided, and the components which can be added to this layer include a white pigment, an aqueous binder, and other components. Examples of the white pigment contained in the back coating layer include white inorganic pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate, magnesium hydroxide, and the like, and organic pigments such as styrene-based plastic pigments, acrylic plastic pigments, polyethylene, microcapsules, urea resin, melamine resin, and the like.

The aqueous binders contained in the back coating layer include water-soluble polymers such as a styrene/maleate copolymer, styrene/acrylate copolymer, polyvinyl alcohol, silanol-modified polyvinyl alcohol, starch, cationic starch, casein, gelatin, carboxymethyl cellulose, hydroxyethylcellulose, polyvinyl pyrrolidone, and the like, and water-dispersible polymers such as styrene-butadiene latex, acrylic emulsion and the like. Other components contained in the back coating layer include a defoaming agent, a foam inhibitor, dyes, fluorescent brighteners, preservatives, waterproofing agents, and the like.

A polymer latex may be added to the structure layer (including a back coating layer) of the ink jet recording paper and the recording film. The polymer latex is used for the purpose of improving film properties such as dimensional stability, curling prevention, adhesion prevention, and film cracking prevention. The polymer latex is described in Japanese Patent Laid-Open No. Sho 62-245258, Japanese Patent Laid-Open No. Sho 62-1316648, and Japanese Patent Laid-Open No. Sho 62-110066. When a polymer latex having a low glass transition temperature (40° C. below) is added to a layer containing a mordant, it is possible to prevent cracking and curling of the layer. Further, when a polymer latex having a high glass transition temperature is added to the back coating layer, it is possible to prevent curling.

The ink of the present invention can be used in a known manner, for example, a charge control system discharging the ink by utilizing electrostatic attraction, a drop-on-demand system (pressure pulse manner) utilizing vibration pressure of a piezo element, an acoustic inkjet system changing electrical signals to acoustic beams to irradiate the beam onto the ink and discharging the ink by using the radiation pressure, a thermal inkjet system heating the ink to form bubbles and using the generated pressure, and the like, and the inkjet recording method is not limited. The inkjet recording method includes a method of injecting a number of ink droplets of low concentration so-called photo ink in a small volume, a method of improving the image quality using a plurality of inks having different densities, but substantially the same color, or a method using colorless transparent ink, and the like.

EXAMPLES

Hereinafter, the present invention will be described more in detail by way of examples, but the invention is not limited thereto.

Acid blue 9 used in the present specification was used by desalting and purifying a commercially available product (manufactured by Tokyo Chemical Industry Co., Ltd., Catalog No. B0790) by using dialysis tubing.

Synthesis Example

Hereinafter, a synthesis method of the phthalocyanine-based colorant derivatives of the present invention will be described in detail in an embodiment, but it is not limited to the starting material, colorant intermediates and synthesis routes.

The phthalocyanine compounds of the present invention can be, for example, derived from the following synthetic routes. In the following Examples, λmax is an absorption maximum wavelength, and εmax denotes the molar extinction coefficient at the absorption maximum wavelength.

Synthesis Example 1

Synthesis of Compound (A)

Under a stream of nitrogen, 26.0 g of 4-nitrophthalonitrile (Tokyo Kasei) was dissolved in 200 mL of DMSO (dimethyl sulfoxide), and it was stirred at an internal temperature of 20° C., and 30.3 g of 3-mercapto-propane-sulfonate sodium salt (Aldo-rich) was added thereto. Subsequently, 24.4 g of anhydrous sodium carbonate was gradually added while stirring at an internal temperature of 20° C. The reaction solution was warmed to 30° C., while stirring, and the solution was stirred at the same temperature for 1 hour. After cooling to 20° C., the reaction solution was filtered by Buchner funnel, and the filtrate was poured into 15000 mL of ethyl acetate to crystallize, and continuously stirred at room temperature for 30 minutes, the precipitated crude crystals were filtered off by Buchner funnel, and washed with ethyl acetate and dried. The obtained crude crystals were recrystallized from methanol/ethyl acetate to obtain 42.5 g of Compound A. 1H-NMR (DMSO-d6), δ value TMS standard: 1.9-2.0 (2H, t); 2.5~2.6 (2H, m); 3.2~3.3 (2H, t); 7.75~7.85 (1H, d); 7.93~8.03 (1H, d); 8.05~8.13 (1H, s)

Synthesis Example 2

Synthesis of Compound (B)

42.0 g of the compound (A) was dissolved in 300 mL of acetic acid, and stirred at an internal temperature of 20° C., 2.5 g of $Na_2WO_4$, $2H_2O$ was added thereto, and the internal temperature was cooled to 10° C. in an ice bath. Subsequently, 32 mL of hydrogen peroxide solution (30%) was slowly added dropwise, while taking care of the heat generation. After stirring at the internal temperature of 15° C. to 20° C. for 30 minutes, the reaction solution was warmed to the

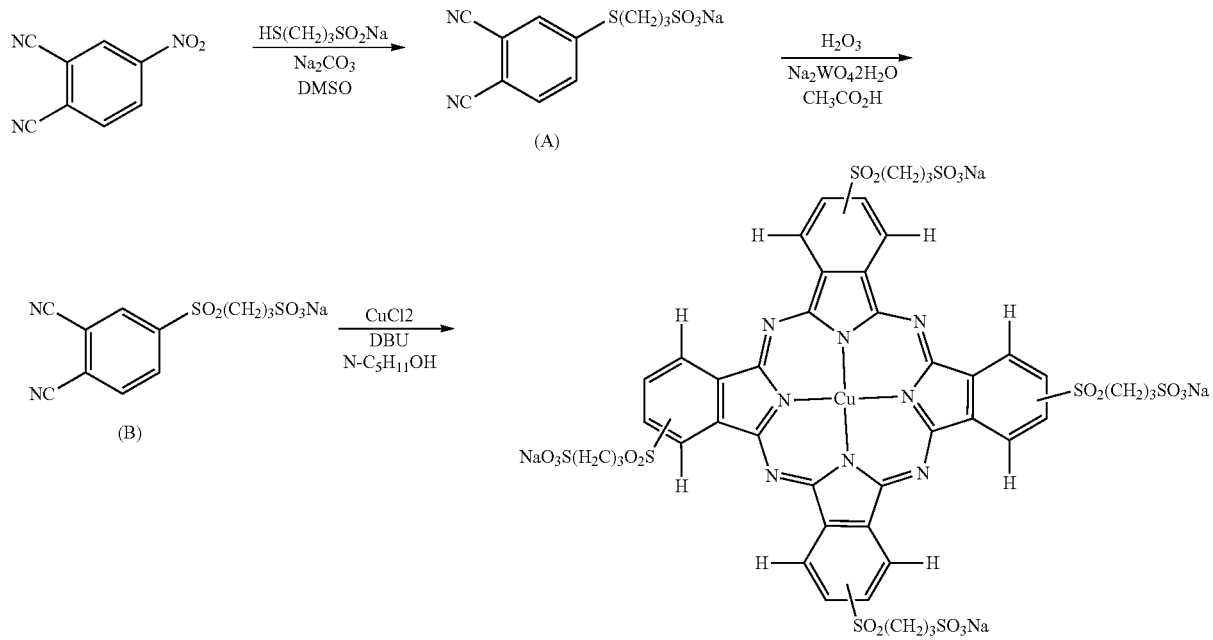

internal temperature of 60° C., and stirred at the same temperature for 1 hour. After cooling to 20° C., 1500 mL of ethyl acetate was poured into the reaction solution, and continuously stirred at room temperature for 30 minutes. The precipitated crude crystals were filtered by Buchner funnel, and washed with 200 mL of ethyl acetate and dried. The obtained crude crystals were heated, washed, and purified by using methanol/ethyl acetate to obtain 40.0 g of Compound B. $^1$H-NMR (DMSO-d6), δ value TMS standard: 1.8~1.9 (2H, t); 2.4~2.5 (2H, m); 3.6~3.7 (2H, t); 8.3~8.4 (1H, d); 8.4~8.5 (1H, d); 8.6~8.7 (1H, s)

Synthesis Example 3

Synthesis of Exemplary Compound 102β (Dye 1A of the Formula (1))

70 mL of n-amyl alcohol was added to three-necked flask equipped with a cooling tube, 6.7 g of a compound B and 1.0 g of copper chloride (II) were added thereto, and 7.0 mL of 1,8-diazabicyclo[5.4.0]-7-undecene (DBU) was added dropwise at room temperature while stirring. Subsequently, the reaction solution was warmed to an internal temperature of 100° C., and stirred at the same temperature for 10 hours. After cooling to 40° C., 250 mL of methanol warmed to 50° C. was injected and stirred for 1 hour under reflux. Next, the reaction solution was cooled to room temperature, and the resulting solid was filtered by Buchner funnel and washed with 200 mL of methanol. Subsequently the resulting solid was added to 100 mL of 1M hydrochloric acid aqueous solution saturated with sodium chloride so as to dissolve the unreacted copper salts. After filtering the insoluble matter, 300 mL of methanol was added dropwise to the filtrate to crystallize. The obtained crude crystals were filtered by Buchner funnel, and washed with 200 mL of methanol. After the crude crystals were dissolved in 50 mL of water, the aqueous solution was stirred, and 100 mL of a saturated methanol solution of sodium acetate was added slowly to form the salts. Further, the solution was warmed to reflux temperature with stirring and stirred at the same temperature for 1 hour. After cooling to room temperature, the precipitated crystals were filtered off and washed with methanol. Subsequently, 100 mL of 80% methanol was added to the obtained crystals, stirred for 1 hour under reflux and, cooled to room temperature, and the precipitated crystals were filtrated off, and again with 100 mL of 70% methanol aqueous solution was added to the obtained crystals, stirred for 1 hour under reflux and, cooled to room temperature, the precipitated crystals were filtrated off, and washed in 100 mL of methanol and dried to obtain 3.8 g of the exemplified compound 102β as the blue crystals.

λmax (absorption maximum wavelength): 629.1 nm; ε max (a molar extinction coefficient at the maximum wavelength)=6.19×10$^4$ (in aqueous solution). As a result of analyzing the obtained compound (mass spectrometry: measured by various device analysis methods such as ESI-MS, elemental analysis, neutralization titration, and the like), it was confirmed that the copper phthalocyanine (II)-substituted position as defined herein has β-position substitution type of {having one group of —{SO$_2$—(CH$_2$)$_3$—SO$_3$Na} at (position 2 or 3), (position 6 or 7), (position 10 or 11), (position 14 or 15) of each of the benzene nuclei and a total four groups of —{SO$_2$—(CH$_2$)$_3$—SO$_3$Na} in copper phthalocyanine-molecule}.

Example I

Example I-1

The deionized water was added to the following components to be 100 g, and the solution was stirred for one hour while heating at 30° C. to 40° C. The solution was adjusted to pH=9 by 10 mol/L of NaOH, and filtrated under reduced pressure through a microfilter having an average pore size of 0.25 μm to prepare a cyan ink liquid.

Phthalocyanine dye (Compound 1A) 0.3 g
Phthalocyanine dye (Compound I-2B) 2.7 g
Diethylene glycol 2 g
Glycerin 12 g
Diethylene glycol monobutyl ether 23 g
2-pyrrolidone 8 g
Triethanolamine 1.79 g
Benzotriazole 0.006 g
Surfynol TG 0.85 g
PROXEL XL2 0.18 g Examples I-2 to I-74

Comparative Examples I-1 to I-20

The ink liquids of Examples I-2 to I-74 and Comparative Examples I-1 to I-20 were prepared in the same manner as in the preparation of the ink liquid of Example I-1, except for changing the type and amount of the dye as illustrated in Tables I-17 to I-19.

<Image Recording and Evaluation>

For the inkjet ink of each Example (Examples I-1 to I-74) and Comparative Example (Comparative Examples I-1 to I-20) described above, the evaluation was carried out as follows. The results were illustrated in Tables I-17 to I-19. In addition, image recording was recording images onto photo glossy paper (PT-101, Canon Inc.) and plain paper (GF500, Canon Inc.) by the inkjet printer (manufactured by Epson Corp.; PM-700 C) for each inkjet ink.

(Ozone Resistance)

The photo gloss paper forming image was left for 7 days in a box set in a dark place where the concentration of ozone is 0.5±0.1 ppm at room temperature, and the image density before and after standing under the ozone gas was measured by using a reflection densitometer (X-Rite310TR) and evaluated as the colorant residual ratio. Further, the reflection density was measured at three points of 1, 1.5 and 2.0. The ozone gas concentration in the box was set up with ozone gas monitor (Model: OZG-EM-01) manufactured by APPLICS. The colorant residual ratio was evaluated in three stages: as A when the colorant residual ratio at any concentration is 70% or more, as B when the point 1 or 2 is less than 70%, and as C when the ratio at all concentrations is less than 70%.

(Print Density)

The image density or the reflection density in the 100% print density on plain paper was measured using the reflection densitometer (X-Rite310TR), and the print density was evaluated in three stages: as A when the print density is 1.10 or more, as B when the density is from 1.00 to 1.10, and as C when the density is less than 1.00.

(Bronze Gloss)

The highest concentration portion of the printed sample was observed visually under a white fluorescent lamp, and evaluated in three stages: as A when the bronze gloss is observed, as B when the gloss is not observed faintly, and as C when the gloss is observed clearly.

(Hue)

The printed sample was observed visually, and evaluated in three stages: as A when the hue is a pure cyan, as B when the hue is a cyan close to slightly reddish blue, and as C when the hue is certainly blue.

TABLE I-17

| | Dyes of Formula (1) | | Dyes of Formula (I-2) | | Acid Blue 9 | Ozon Resistance | Print Density | Bronze | Hue | Remarks |
|---|---|---|---|---|---|---|---|---|---|---|
| Ex. I-1 | 1A | 0.3 g | I-2B | 2.7 g | — | A | C | A | A | Inventive |
| Ex. I-2 | 1A | 0.6 g | I-2B | 2.4 g | — | A | B | A | A | Inventive |
| Ex. I-3 | 1A | 0.9 g | I-2B | 2.1 g | — | A | B | A | A | Inventive |
| Ex. I-4 | 1A | 1.2 g | I-2B | 1.8 g | — | A | B | A | A | Inventive |
| Ex. I-5 | 1A | 1.5 g | I-2B | 1.5 g | — | A | B | A | A | Inventive |
| Ex. I-6 | 1A | 0.4 g | I-2B | 3.6 g | — | A | B | A | A | Inventive |
| Ex. I-7 | 1A | 0.8 g | I-2B | 3.2 g | — | A | A | A | A | Inventive |
| Ex. I-8 | 1A | 1.2 g | I-2B | 2.8 g | — | A | A | A | A | Inventive |
| Ex. I-9 | 1A | 1.6 g | I-2B | 2.4 g | — | A | A | A | A | Inventive |
| Ex. I-10 | 1A | 2 g | I-2B | 2 g | — | A | A | A | A | Inventive |
| Ex. I-11 | 1A | 0.5 g | I-2B | 4.5 g | — | A | B | A | A | Inventive |
| Ex. I-12 | 1A | 1 g | I-2B | 4 g | — | A | A | A | A | Inventive |
| Ex. I-13 | 1A | 1.5 g | I-2B | 3.5 g | — | A | A | A | A | Inventive |
| Ex. I-14 | 1A | 2 g | I-2B | 3 g | — | A | A | A | A | Inventive |
| Ex. I-15 | 1A | 2.5 g | I-2B | 2.5 g | — | A | A | A | A | Inventive |
| Ex. I-16 | 1A | 0.3 g | I-2B | 2.625 g | 0.075 g | A | B | A | A | Inventive |
| Ex. I-17 | 1A | 0.3 g | I-2B | 2.55 g | 0.15 g | A | B | A | A | Inventive |
| Ex. I-18 | 1A | 0.6 g | I-2B | 2.325 g | 0.075 g | A | B | A | A | Inventive |
| Ex. I-19 | 1A | 0.6 g | I-2B | 2.25 g | 0.15 g | A | B | A | A | Inventive |
| Ex. I-20 | 1A | 0.9 g | I-2B | 2.025 g | 0.075 g | A | B | A | A | Inventive |
| Ex. I-21 | 1A | 0.9 g | I-2B | 1.95 g | 0.15 g | A | B | A | A | Inventive |
| Ex. I-22 | 1A | 0.4 g | I-2B | 3.5 g | 0.1 g | A | A | A | A | Inventive |
| Ex. I-23 | 1A | 0.4 g | I-2B | 3.4 g | 0.2 g | A | A | A | A | Inventive |
| Ex. I-24 | 1A | 0.8 g | I-2B | 3.1 g | 0.1 g | A | A | A | A | Inventive |
| Ex. I-25 | 1A | 0.8 g | I-2B | 3 g | 0.2 g | A | A | A | A | Inventive |
| Ex. I-26 | 1A | 1.2 g | I-2B | 3.7 g | 0.1 g | A | A | A | A | Inventive |
| Ex. I-27 | 1A | 1.2 g | I-2B | 3.6 g | 0.2 g | A | A | A | A | Inventive |
| Ex. I-28 | 1A | 0.5 g | I-2B | 4.375 g | 0.125 g | A | A | A | A | Inventive |
| Ex. I-29 | 1A | 0.5 g | I-2B | 4.25 g | 0.25 g | A | A | A | A | Inventive |
| Ex. I-30 | 1A | 1 g | I-2B | 3.875 g | 0.125 g | A | A | A | A | Inventive |
| Ex. I-31 | 1A | 1 g | I-2B | 3.75 g | 0.25 g | A | A | A | A | Inventive |

TABLE I-18

| | Materials of Formula (1) | | Materials of Formula (I-2) | | Acid Blue 9 | Ozon Resistance | Print Density | Bronze | Color | Remarks |
|---|---|---|---|---|---|---|---|---|---|---|
| Ex. I-32 | 1A | 1.5 g | I-2B | 3.375 g | 0.125 g | A | A | A | A | Inventive |
| Ex. I-33 | 1A | 1.5 g | I-2B | 3.25 g | 0.25 g | A | A | A | A | Inventive |
| Ex. I-34 | 1A | 0.3 g | I-2C | 2.7 g | — | A | C | A | A | Inventive |
| Ex. I-35 | 1A | 0.6 g | I-2C | 2.4 g | — | A | C | A | A | Inventive |
| Ex. I-36 | 1A | 0.9 g | I-2C | 2.1 g | — | A | B | A | A | Inventive |
| Ex. I-37 | 1A | 1.2 g | I-2C | 1.8 g | — | A | B | A | A | Inventive |
| Ex. I-38 | 1A | 1.5 g | I-2C | 1.5 g | — | A | B | A | A | Inventive |
| Ex. I-39 | 1A | 0.4 g | I-2C | 3.6 g | — | A | B | A | A | Inventive |
| Ex. I-40 | 1A | 0.8 g | I-2C | 3.2 g | — | A | B | A | A | Inventive |
| Ex. I-41 | 1A | 1.2 g | I-2C | 2.8 g | — | A | A | A | A | Inventive |
| Ex. I-42 | 1A | 1.6 g | I-2C | 2.4 g | — | A | A | A | A | Inventive |
| Ex. I-43 | 1A | 2 g | I-2C | 2 g | — | A | A | A | A | Inventive |
| Ex. I-44 | 1A | 0.5 g | I-2C | 4.5 g | — | A | B | A | A | Inventive |
| Ex. I-45 | 1A | 1 g | I-2C | 4 g | — | A | B | A | A | Inventive |
| Ex. I-46 | 1A | 1.5 g | I-2C | 3.5 g | — | A | A | A | A | Inventive |
| Ex. I-47 | 1A | 2 g | I-2C | 3 g | — | A | A | A | A | Inventive |
| Ex. I-48 | 1A | 2.5 g | I-2C | 2.5 g | — | A | A | A | A | Inventive |
| Ex. I-49 | 1A | 0.3 g | I-2C | 2.625 g | 0.075 g | A | B | A | A | Inventive |
| Ex. I-50 | 1A | 0.3 g | I-2C | 2.55 g | 0.15 g | A | B | A | A | Inventive |
| Ex. I-51 | 1A | 0.6 g | I-2C | 2.325 g | 0.075 g | A | B | A | A | Inventive |
| Ex. I-52 | 1A | 0.6 g | I-2C | 2.25 g | 0.15 g | A | B | A | A | Inventive |
| Ex. I-53 | 1A | 0.9 g | I-2C | 2.025 g | 0.075 g | A | B | A | A | Inventive |
| Ex. I-54 | 1A | 0.9 g | I-2C | 1.95 g | 0.15 g | A | B | A | A | Inventive |
| Ex. I-55 | 1A | 0.4 g | I-2C | 3.5 g | 0.1 g | A | B | A | A | Inventive |
| Ex. I-56 | 1A | 0.4 g | I-2C | 3.4 g | 0.2 g | A | A | A | A | Inventive |
| Ex. I-57 | 1A | 0.8 g | I-2C | 3.1 g | 0.1 g | A | A | A | A | Inventive |
| Ex. I-58 | 1A | 0.8 g | I-2C | 3 g | 0.2 g | A | A | A | A | Inventive |
| Ex. I-59 | 1A | 1.2 g | I-2C | 3.7 g | 0.1 g | A | A | A | A | Inventive |
| Ex. I-60 | 1A | 1.2 g | I-2C | 3.6 g | 0.2 g | A | A | A | A | Inventive |

TABLE I-18-continued

| | Materials of Formula (1) | | Materials of Formula (I-2) | | Acid Blue 9 | Ozon Resistance | Print Density | Bronze | Color | Remarks |
|---|---|---|---|---|---|---|---|---|---|---|
| Ex. I-61 | 1A | 0.5 g | I-2C | 4.375 g | 0.125 g | A | A | A | A | Inventive |
| Ex. I-62 | 1A | 0.5 g | I-2C | 4.25 g | 0.25 g | A | A | A | A | Inventive |

TABLE I-19

| | Dyes of Formula (1) | | Dyes of Formula (I-2) | | Acid Blue 9 | Ozon Resistance | Print Density | Bronze | Hue | Remarks |
|---|---|---|---|---|---|---|---|---|---|---|
| Ex. I-63 | 1A | 1 g | I-2C | 3.875 g | 0.125 g | A | A | A | A | Inventive |
| Ex. I-64 | 1A | 1 g | I-2C | 3.75 g | 0.25 g | A | A | A | A | Inventive |
| Ex. I-65 | 1A | 1.5 g | I-2C | 3.375 g | 0.125 g | A | A | A | A | Inventive |
| Ex. I-66 | 1A | 1.5 g | I-2C | 3.25 g | 0.25 g | A | A | A | A | Inventive |
| Ex. I-67 | 1A | 0.5 g | I-2C | 4.5 g | — | A | B | A | A | Inventive |
| Ex. I-68 | 1A | 1 g | I-2C | 4 g | — | A | B | A | A | Inventive |
| Ex. I-69 | 1A | 1.5 g | I-2C | 3.5 g | — | B | A | A | A | Inventive |
| Ex. I-70 | 1A | 2 g | I-2C | 3 g | — | B | A | A | A | Inventive |
| Ex. I-71 | 1A | 2.5 g | I-2C | 2.5 g | — | B | A | A | A | Inventive |
| Ex. I-72 | 1A | 0.5 g | I-2C | 4.375 g | 0.125 g | A | A | A | A | Inventive |
| Ex. I-73 | 1A | 0.5 g | I-2C | 4.25 g | 0.25 g | A | A | A | A | Inventive |
| Ex. I-74 | 1B | 2.5 g | I-2D | 2.5 g | — | A | A | A | A | Inventive |
| C. Ex. I-1 | 1A | 3 g | — | — | — | C | C | A | A | Comparative |
| C. Ex. I-2 | 1A | 4 g | — | — | — | C | B | A | A | Comparative |
| C. Ex. I-3 | 1A | 5 g | — | — | — | C | A | A | A | Comparative |
| C. Ex. I-4 | 1B | 5 g | — | — | — | C | A | A | A | Comparative |
| C. Ex. I-5 | — | — | I-2A | 5 g | — | B | B | A | A | Comparative |
| C. Ex. I-6 | — | — | I-2B | 3 g | — | A | C | A | A | Comparative |
| C. Ex. I-7 | — | — | I-2B | 4 g | — | A | C | A | A | Comparative |
| C. Ex. I-8 | — | — | I-2B | 5 g | — | A | C | A | A | Comparative |
| C. Ex. I-9 | — | — | I-2C | 3 g | — | A | C | A | A | Comparative |
| C. Ex. I-10 | — | — | I-2C | 4 g | — | A | C | B | A | Comparative |
| C. Ex. I-11 | — | — | I-2C | 5 g | — | A | C | B | A | Comparative |
| C. Ex. I-12 | — | — | I-2D | 5 g | — | A | B | C | A | Comparative |
| C. Ex. I-13 | — | — | — | — | 5 g | C | A | A | A | Comparative |
| C. Ex. I-14 | 1A | 4.875 g | — | — | 0.125 g | C | A | A | A | Comparative |
| C. Ex. I-15 | 1A | 4.75 g | — | — | 0.25 g | C | A | A | A | Comparative |
| C. Ex. I-16 | — | — | I-2B | 4.875 g | 0.125 g | A | B | A | A | Comparative |
| C. Ex. I-17 | — | — | I-2B | 4.75 g | 0.25 g | B | B | A | A | Comparative |
| C. Ex. I-18 | — | — | I-2C | 4.875 g | 0.125 g | A | C | A | A | Comparative |
| C. Ex. I-19 | — | — | I-2C | 4.75 g | 0.25 g | B | B | A | A | Comparative |
| C. Ex. I-20 | Comparative Compound I-3 5 g | | | | | C | B | A | A | Comparative |

Example I-101

The deionized water was added to the following components to be 33.3 g, and the solution was stirred for one hour while heating at 50° C. The solution was adjusted to pH=9 by 10 mol/L of NaOH to prepare a concentrated aqueous solution.
Phthalocyanine dye (compound 1A) 0.5 g
Phthalocyanine dye (Compound I-2 B) 4.5 g

Examples I-102 to I-132

Comparative Examples I-101 to I-108

The ink liquids of Examples I-102 to I-132, Comparative Examples I-101 to I-108 were prepared in the same manner as in the preparation of the concentrated aqueous solution of Example I-101, except for changing the type and amount of the dye as illustrated in Tables I-20 to I-21.

(Storage Stability Over Time)

The concentrated aqueous solutions of each Example (Examples I-101 to I-132) and Comparative Example (Comparative Examples I-101 to I-108) were sealed and stored at room temperature for two weeks over time under static conditions, and evaluated in two stages: as A when the dissolved state is maintained visually, and as B when the precipitation or separation of the dye occurs. The results are illustrated in Tables I-20 to I-21.

TABLE I-20

| | Materials of Formula (1) | | Materials of Formula (I-2) | | Acid Blue 9 | Storage Stability Over Time | Remarks |
|---|---|---|---|---|---|---|---|
| Ex. I-101 | 1A | 0.5 g | I-2B | 4.5 g | — | A | Inventive |
| Ex. I-102 | 1A | 1 g | I-2B | 4 g | — | A | Inventive |
| Ex. I-103 | 1A | 1.5 g | I-2B | 3.5 g | — | A | Inventive |
| Ex. I-104 | 1A | 2 g | I-2B | 3 g | — | A | Inventive |
| Ex. I-105 | 1A | 2.5 g | I-2B | 2.5 g | — | A | Inventive |
| Ex. I-106 | 1A | 0.5 g | I-2B | 4.375 g | 0.125 g | A | Inventive |
| Ex. I-107 | 1A | 0.5 g | I-2B | 4.25 g | 0.25 g | A | Inventive |
| Ex. I-108 | 1A | 1 g | I-2B | 3.875 g | 0.125 g | A | Inventive |
| Ex. I-109 | 1A | 1 g | I-2B | 3.75 g | 0.25 g | A | Inventive |
| Ex. I-110 | 1A | 1.5 g | I-2B | 3.375 g | 0.125 g | A | Inventive |
| Ex. I-111 | 1A | 1.5 g | I-2B | 3.25 g | 0.25 g | A | Inventive |
| Ex. I-112 | 1A | 0.5 g | I-2C | 4.5 g | — | A | Inventive |
| Ex. I-113 | 1A | 1 g | I-2C | 4 g | — | A | Inventive |
| Ex. I-114 | 1A | 1.5 g | I-2C | 3.5 g | — | A | Inventive |
| Ex. I-115 | 1A | 2 g | I-2C | 3 g | — | A | Inventive |
| Ex. I-116 | 1A | 2.5 g | I-2C | 2.5 g | — | A | Inventive |
| Ex. I-117 | 1A | 1.2 g | I-2C | 3.7 g | 0.1 g | A | Inventive |

TABLE I-20-continued

| | Materials of Formula (1) | | Materials of Formula (I-2) | | Acid Blue 9 | Storage Stability Over Time | Remarks |
|---|---|---|---|---|---|---|---|
| Ex. I-118 | 1A | 1.2 g | I-2C | 3.6 g | 0.2 g | A | Inventive |
| Ex. I-119 | 1A | 0.5 g | I-2C | 4.375 g | 0.125 g | A | Inventive |
| Ex. I-120 | 1A | 0.5 g | I-2C | 4.25 g | 0.25 g | A | Inventive |
| Ex. I-121 | 1A | 1 g | I-2C | 3.875 g | 0.125 g | A | Inventive |
| Ex. I-122 | 1A | 1 g | I-2C | 3.75 g | 0.25 g | A | Inventive |
| Ex. I-123 | 1A | 1.5 g | I-2C | 3.375 g | 0.125 g | A | Inventive |
| Ex. I-124 | 1A | 1.5 g | I-2C | 3.25 g | 0.25 g | A | Inventive |
| Ex. I-125 | 1A | 0.5 g | I-2C | 4.5 g | — | A | Inventive |
| Ex. I-126 | 1A | 1 g | I-2C | 4 g | — | A | Inventive |
| Ex. I-127 | 1A | 1.5 g | I-2C | 3.5 g | — | A | Inventive |
| Ex. I-128 | 1A | 2 g | I-2C | 3 g | — | A | Inventive |
| Ex. I-129 | 1A | 2.5 g | I-2C | 2.5 g | — | A | Inventive |
| Ex. I-130 | 1A | 0.5 g | I-2C | 4.375 g | 0.125 g | A | Inventive |
| Ex. I-131 | 1A | 0.5 g | I-2C | 4.25 g | 0.25 g | A | Inventive |
| Ex. I-132 | 1B | 2.5 g | I-2D | 2.5 g | — | A | Inventive |

TABLE I-21

| | Materials of Formula (1) | | Materials of Formula (I-2) | | Acid Blue 9 | Storage Stability Over Time | Remarks |
|---|---|---|---|---|---|---|---|
| C. Ex. I-101 | 1A | 5 g | — | — | — | B | Compartive |
| C. Ex. I-102 | 1B | 5 g | — | — | — | B | Compartive |
| C. Ex. I-103 | — | — | I-2A | 5 g | — | B | Compartive |
| C. Ex. I-104 | — | — | I-2B | 5 g | — | B | Compartive |
| C. Ex. I-105 | — | — | I-2C | 5 g | — | B | Compartive |
| C. Ex. I-106 | — | — | I-2D | 5 g | — | B | Compartive |
| C. Ex. I-107 | — | — | — | — | 5 g | B | Compartive |
| C. Ex. I-108 | Comparative Compound I-3 5 g | | | | | B | Compartive |

It was found that the ink for inkjet recording of the present invention was realizing a high print density while maintaining an equivalent image fastness as compared with the ink of Comparative Example. Further, it was found to be excellent also in storage stability over time of the ink liquid.

Hereinafter, the structure of the compound used in Example I will be illustrated.

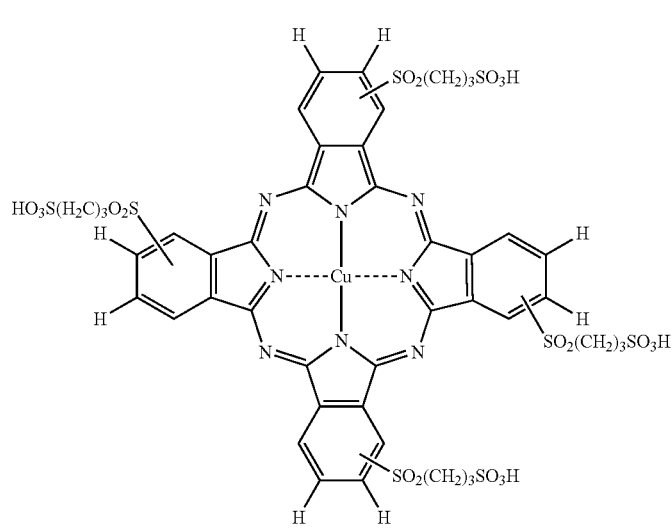

(1A)

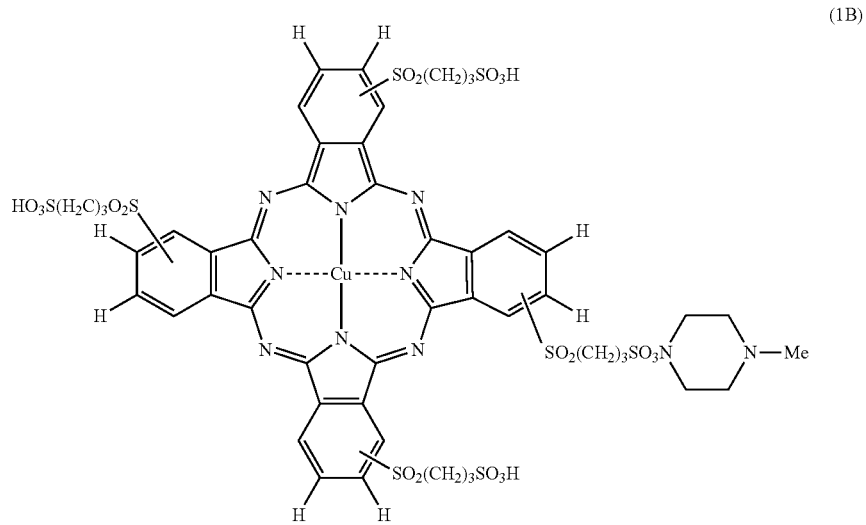

(1B)

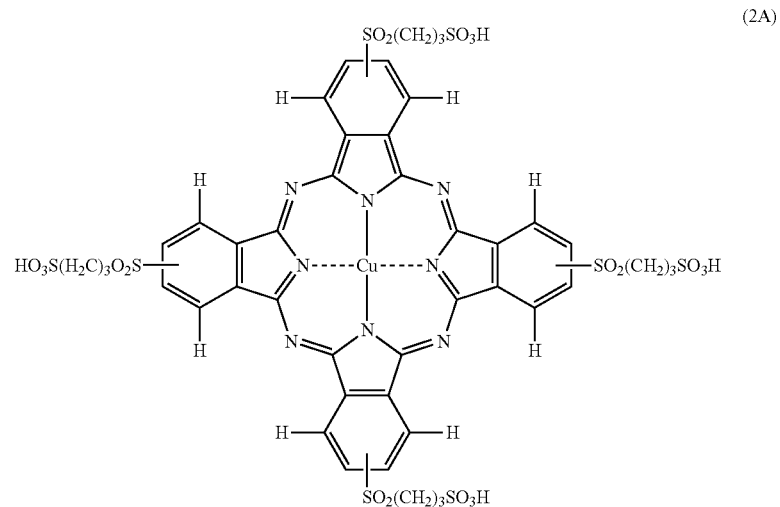
(2A)
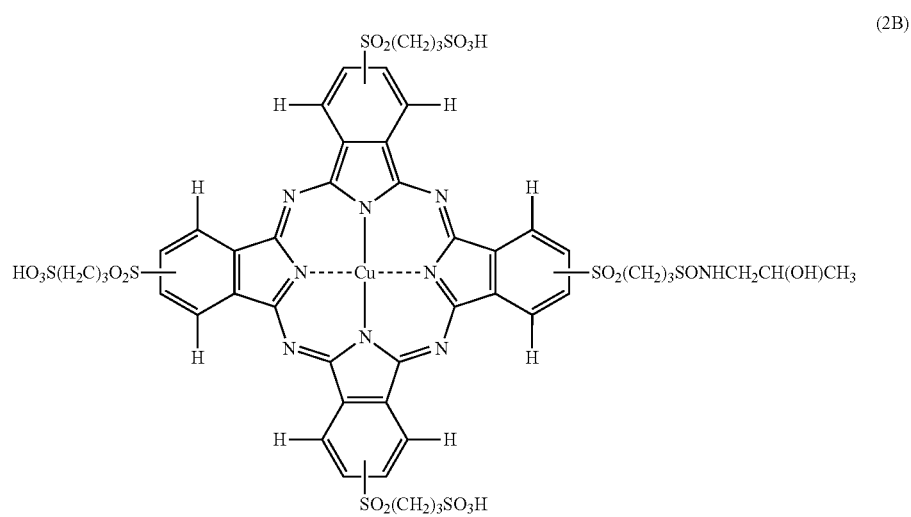
(2B)

(2C)
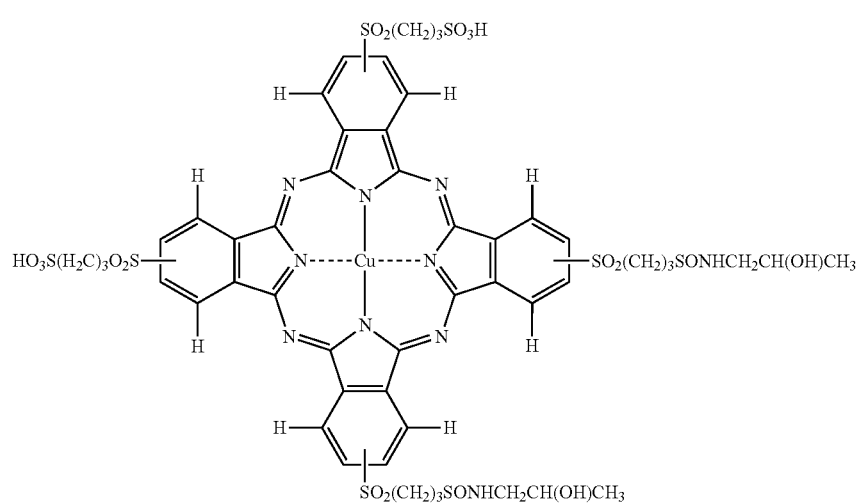
(2D)
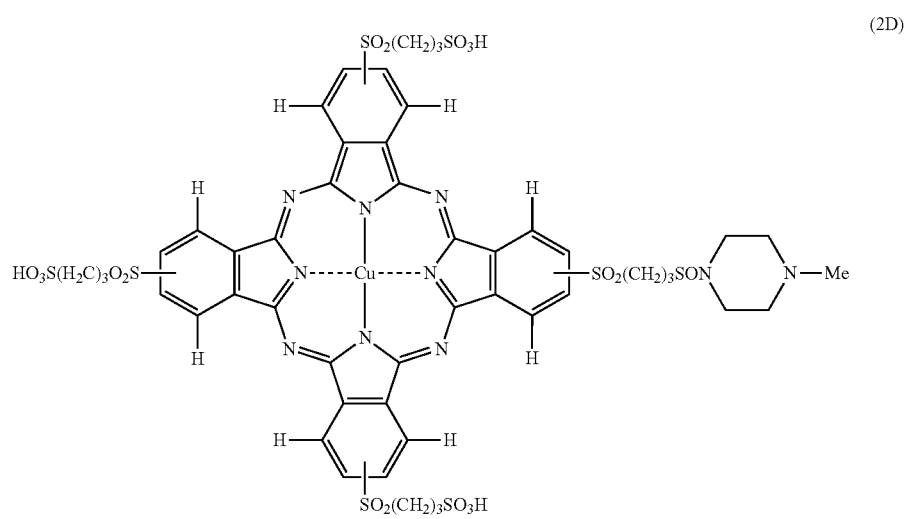
(AB9)
Comparative Compound 1-3
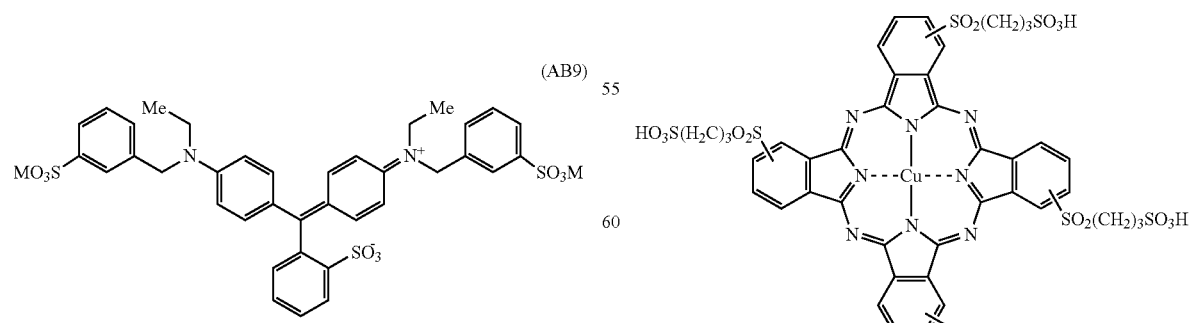
M: Na, Me: -CH₃
(Ratio of substitution postion: α/β=50/50)

Example II

Example II-1

The deionized water was added to the following components to be 100 g, and the solution was stirred for one hour while heating at 30° C. to 40° C. The solution was adjusted to pH=9 by 10 mol/L of NaOH, and filtrated under reduced pressure through a microfilter having an average pore size of 0.25 µm to prepare a cyan ink liquid.

Phthalocyanine dye (Compound 1A) 1.5 g
Phthalocyanine dye (Compound II-3A) 3.5 g
Diethylene glycol 2 g
Glycerin 12 g
Diethylene glycol monobutyl ether 23 g
2-pyrrolidone 8 g
Triethanolamine 1.79 g
Benzotriazole 0.006 g
Surfynol 465 (trade name, manufactured by Air Products) 0.85 g
PROXEL XL2 0.18 g
(trade name, manufactured by Fujifilm Imaging Colorants Co., Ltd.)

Examples II-2 to II-10

Comparative Examples II-1 to II-6

The ink liquids of Examples II-2 to II-10, Comparative Examples II-1 to II-6 were prepared in the same manner as in the preparation of the ink liquid of Example II-1, except for changing phthalocyanine dye and the added amount of the dye as illustrated in the following Table II-23.

<Image Recording and Evaluation>

For the inkjet ink of each Example (Examples II-2 to II-10) and Comparative Example (Comparative Examples II-1 to II-6) described above, the evaluation was carried out as follows. The results were illustrated in Table II-23. In addition, image recording was recording images onto photo glossy paper (PT-101, Canon Inc.) and plain paper (GF500, Canon Inc.) by the inkjet printer (manufactured by Canon Inc.; PIXUS Pro9000MkII) for each inkjet ink.

(Ozone Resistance)

The photo gloss paper forming image was left for 7 days in a box set in a dark place where the concentration of ozone is 0.5±0.1 ppm at room temperature, and the image density before and after standing under the ozone gas was measured by using a reflection densitometer (X-Rite310TR) and evaluated as the colorant residual ratio. Further, the reflection density was measured at three points of 1, 1.5 and 2.0. The ozone gas concentration in the box was set up with ozone gas monitor (Model: OZG-EM-01) manufactured by APPLICS. The colorant residual ratio was evaluated in three stages: as A when the colorant residual ratio at any concentration is 70% or more, as B when the point 1 or 2 is less than 70%, and as C when the ratio at all concentrations is less than 70%.

(Print Density)

The image density or the reflection density (print density) in the 100% print density on plain paper was measured using the reflection densitometer (X-Rite310TR), and the print density was evaluated in three stages: as A when the print density is 1.10 or more, as B when the density is from 1.05 to 1.10, to B, and as C when the density is less than 1.05.

(Bronze Gloss)

The highest concentration portion of the printed sample was observed visually under a white fluorescent lamp, and evaluated in three stages: as A when the bronze gloss is observed, as B when the gloss is not observed faintly, and as C when the gloss is observed clearly.

(Hue)

The printed sample was observed visually, and evaluated in three stages: as A when the hue is a pure cyan, as B when the hue is a cyan close to slightly reddish blue, and as C when the hue is certainly blue.

(Light Source Dependency)

As for the printed sample, the color difference ΔE between the color when observed under standard light D50 and the color when observed under standard light A was calculated and evaluated as A when ΔE is less than 3, and as B when ΔE is 3 or higher.

TABLE II-23

| | Materials of Formula (1) | | Materials of Formula (II-2) | | Ozon Resistance | Print Density | Bronze Gloss | Color | Light Source Dependency | Remarks |
|---|---|---|---|---|---|---|---|---|---|---|
| Ex. II-1 | 1A | 1.5 g | II-3A | 3.5 g | A | A | A | A | A | Inventive |
| Ex. II-2 | 1A | 1.5 g | II-5A | 3.5 g | A | A | A | A | A | Inventive |
| Ex. II-3 | 1A | 1.5 g | II-5B | 3.5 g | A | A | A | A | A | Inventive |
| Ex. II-4 | 1A | 1.5 g | II-5C | 3.5 g | A | A | A | A | A | Inventive |
| Ex. II-5 | 1A | 0.2 g | II-3A | 4.8 g | A | B | A | A | B | Inventive |
| Ex. II-6 | 1A | 0.5 g | II-3A | 4.5 g | A | A | A | A | A | Inventive |
| Ex. II-7 | 1A | 2.5 g | II-3A | 2.5 g | A | A | A | A | A | Inventive |
| Ex. II-8 | 1A | 4.5 g | II-3A | 0.5 g | B | A | A | A | A | Inventive |
| Ex. II-9 | 1B | 1.5 g | II-3A | 3.5 g | A | A | A | A | A | Inventive |
| Ex. II-10 | 1B | 2.5 g | II-5C | 2.5 g | A | A | A | A | A | Inventive |
| C. Ex. II-1 | 1A | 5.0 g | — | — | C | A | A | A | B | Comparative |
| C. Ex. II-2 | 1B | 5.0 g | — | — | B | A | A | A | B | Comparative |
| C. Ex. II-3 | — | — | II-3A | 5.0 g | A | B | A | B | B | Comparative |
| C. Ex. II-4 | — | — | II-5A | 5.0 g | A | B | B | B | B | Comparative |
| C. Ex. II-5 | — | — | II-5B | 5.0 g | A | B | B | B | B | Comparative |
| C. Ex. II-6 | — | — | II-5C | 5.0 g | A | B | B | B | B | Comparative |

It was found that the ink for inkjet recording of the present invention was exhibiting a high print density, suppressing bronze gloss, and realizing excellent hue while maintaining equivalent ozone resistance as compared with the ink of Comparative Example. Further, it was found to suppress the light source dependency in which the hue difference due to the difference of the light source is less.

Hereinafter, the structure (except 1A, 1B) of the compounds used in Example II will be illustrated.

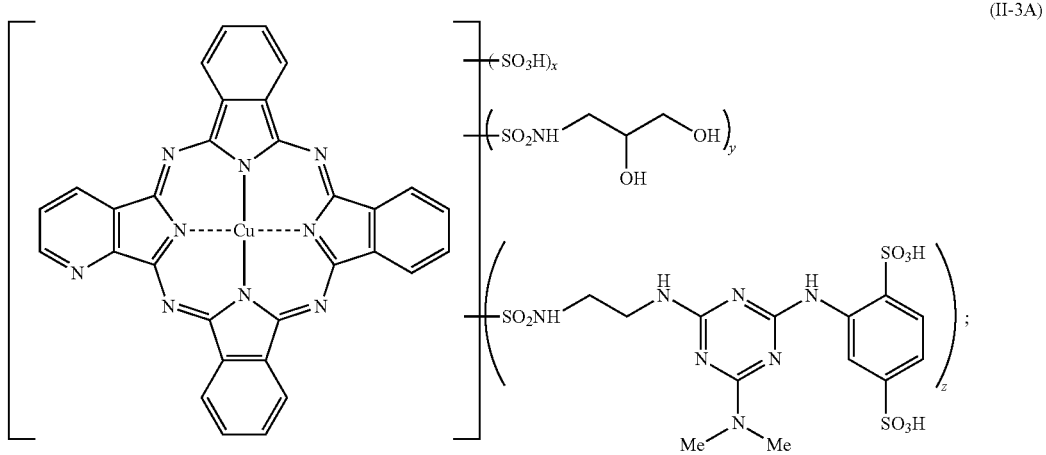

(II-3A)

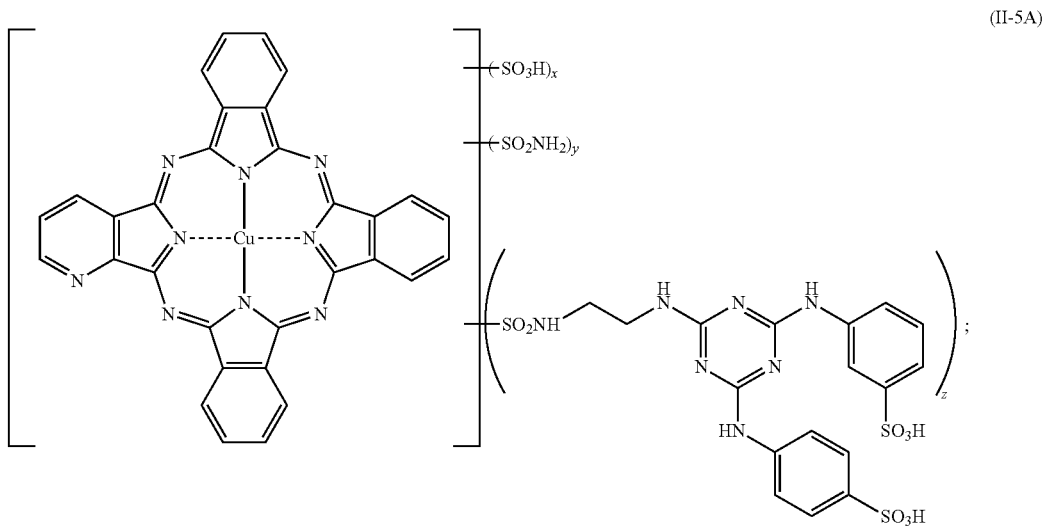

(II-5A)

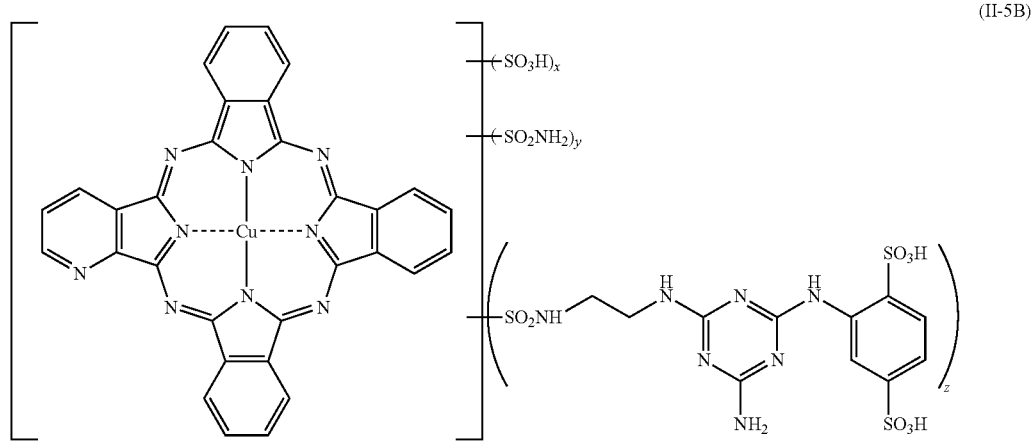

(II-5B)

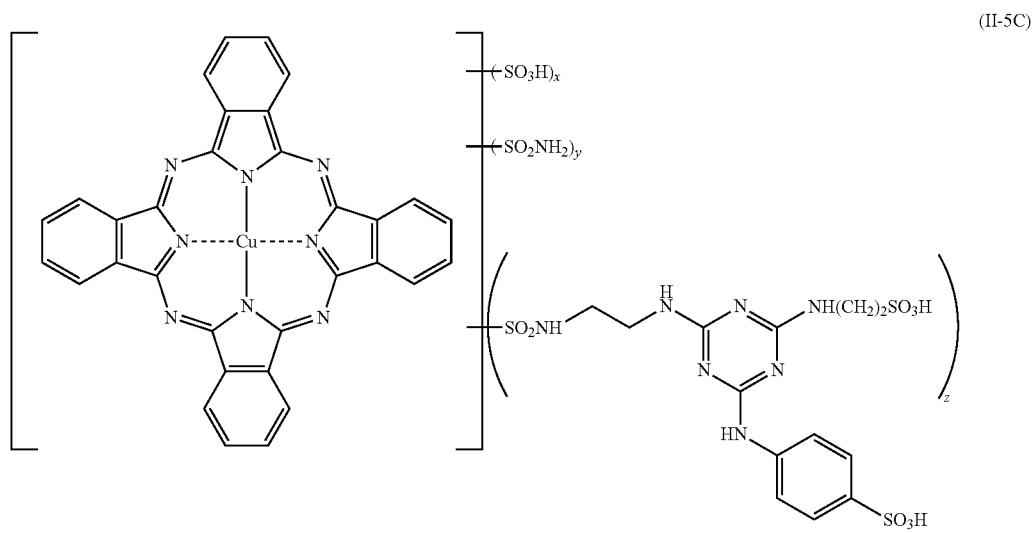

(II-5C)

Example III

Example III-1

The deionized water was added to the following components to be 100 g, and the solution was stirred for one hour while heating at 30° C. to 40° C. The solution was adjusted to pH=9 by 10 mol/L of NaOH, and filtrated under reduced pressure through a microfilter having an average pore size of 0.25 μm to prepare a cyan ink liquid.

Phthalocyanine dye (Compound 1A) 1.5 g

Phthalocyanine dye (Compound III-4A) 3.5 g

Diethylene glycol 2 g

Glycerin 12 g

Diethylene glycol monobutyl ether 23 g 2-pyrrolidone 8 g

Triethanolamine 1.79 g

Benzotriazole 0.006 g

Surfynol 465 (trade name, manufactured by Air Products) 0.85 g

PROXEL XL2 0.18 g (trade name, manufactured by Fujifilm Imaging Colorants Co., Ltd.)

Examples III-2 to III-6

Comparative Examples III-1 to III-5

The ink liquids of Examples III-2 to III-6, Comparative Examples III-1 to III-5 were prepared in the same manner as in the preparation of the ink liquid of Example III-1, except for changing phthalocyanine dye and the added amount of the dye as illustrated in the following Table III-9.

<Image Recording and Evaluation>

For the inkjet ink of each Example (Examples III-1 to III-6) and Comparative Example (Comparative Examples III-1 to III-5) described above, the evaluation was carried out as follows. The results were illustrated in Table III-9. In addition, image recording was recording images onto photo glossy paper (PT-101, Canon Inc.) and plain paper (GF500, Canon Inc.) by the inkjet printer (manufactured by Epson Corp.; PM-700 C) for each inkjet ink.

(Ozone Resistance)

The photo gloss paper forming the above image was left for 1 day in a box set in a dark place where the concentration of ozone is 5±0.1 ppm at room temperature, and the image density before and after standing under the ozone gas was measured by using a reflection densitometer (X-Rite310TR) and evaluated as the colorant residual ratio. Further, the reflection density was measured at three points of 1, 1.5 and 2.0. The ozone gas concentration in the box was set up with ozone gas monitor (Model: OZG-EM-01) manufactured by APPLICS. The colorant residual ratio was evaluated in three stages: as A when the colorant residual ratio at any concentration is 70% or more, as B when the point 1 or 2 is less than 70%, and as C when the ratio at all concentrations is less than 70%.

(Print Density)

The image density or the reflection density (print density) in the 100% print density on plain paper was measured using the reflection densitometer (X-Rite310TR), and the print density was evaluated in three stages: as A when the print density is 1.10 or more, as B when the density is from 1.05 or more and less than 1.10, and as C when the density is less than 1.05.

(Bronze Gloss)

The highest concentration portion of the printed sample was observed visually under a white fluorescent lamp, and evaluated in three stages: as A when the bronze gloss is observed, as B when the gloss is not observed faintly, and as C when the gloss is observed clearly.

(Hue)

The printed sample was observed visually, and evaluated in three stages: as A when the hue is a pure cyan, as B when the hue is a cyan close to slightly reddish blue, and as C when the hue is certainly blue.

TABLE III-9

| | Materials of Formula (I) | | Materials of Formula (III-2) | | Ozon Resistance | Print Density | Bronze | Color | Remarks |
|---|---|---|---|---|---|---|---|---|---|
| Ex. III-1 | 1A | 1.5 g | III-4A | 3.5 g | A | A | A | A | Inventive |
| Ex. III-2 | 1A | 2.5 g | III-4A | 2.5 g | A | A | A | A | Inventive |
| Ex. III-3 | 1A | 0.5 g | III-4A | 4.5 g | A | A | A | A | Inventive |
| Ex. III-4 | 1A | 1.5 g | III-4B | 3.5 g | A | A | A | A | Inventive |
| Ex. III-5 | 1A | 1.5 g | III-4C | 3.5 g | A | A | A | A | Inventive |
| Ex. III-6 | 1B | 1.5 g | III-4A | 3.5 g | A | A | A | A | Inventive |
| C. Ex. III-1 | 1A | 5.0 g | — | — | C | A | A | A | Comparative |
| C. Ex. III-2 | 1B | 5.0 g | — | — | B | A | A | A | Comparative |
| C. Ex. III-3 | — | — | III-4A | 5.0 g | A | B | B | B | Comparative |
| C. Ex. III-4 | — | — | III-4B | 5.0 g | A | B | B | B | Comparative |
| C. Ex. III-5 | — | — | III-4C | 5.0 g | A | B | B | B | Comparative |

Example III-101

The deionized water was added to the following components to be 33.3 g. and the solution was stirred for one hour while heating at 50° C. The solution was adjusted to pH=9 by 10 mol/L of NaOH to prepare a concentrated aqueous solution.

Phthalocyanine dye (Compound 1A) 1.5 g
Phthalocyanine dye (Compound III-4A) 3.5 g
Diethylene glycol 2 g
Glycerin 12 g
Diethylene glycol monobutyl ether 23 g
2-pyrrolidone 8 g
Triethanolamine 1.79 g
Benzotriazole 0.006 g
Surfynol 465 (trade name, manufactured by Air Products) 0.85 g
PROXEL XL2 0.18 g
(trade name, manufactured by Fujifilm Imaging Colorants Co., Ltd.)

Examples III-102 to III-106

Comparative Examples III-101 to III-105

The ink liquids of Examples III-102 to III-106, Comparative Examples III-101 to III-105 were prepared in the same manner as in the preparation of the ink liquid of Example III-101, except for changing phthalocyanine dye and the added amount of the dye as illustrated in the following Table III-10.

(Storage Stability Over Time)

The concentrated aqueous solutions of each Example (Examples III-101 to III-106) and Comparative Example (Comparative Examples III-101 to III-105) were sealed and stored at room temperature for two weeks over time under static conditions, and evaluated in two stages: as A when the dissolved state is maintained visually, and as B when the precipitation or separation of the dye occurs.

TABLE III-10

| | Materials of Formula (1) | | Materials of Formula (III-2) | | Storage Stability Over Time | Remarks |
|---|---|---|---|---|---|---|
| Ex. III-101 | 1A | 1.5 g | III-4A | 3.5 g | A | Inventive |
| Ex. III-102 | 1A | 2.5 g | III-4A | 2.5 g | A | Inventive |
| Ex. III-103 | 1A | 0.5 g | III-4A | 4.5 g | A | Inventive |
| Ex. III-104 | 1A | 1.5 g | III-4B | 3.5 g | A | Inventive |

TABLE III-10-continued

| | Materials of Formula (1) | | Materials of Formula (III-2) | | Storage Stability Over Time | Remarks |
|---|---|---|---|---|---|---|
| Ex. III-105 | 1A | 1.5 g | III-4C | 3.5 g | A | Inventive |
| Ex. III-106 | 1B | 1.5 g | III-4A | 3.5 g | A | Inventive |
| C. Ex. III-101 | 1A | 5.0 g | — | — | B | Comparative |
| C. Ex. III-102 | 1B | 5.0 g | — | — | B | Comparative |
| C. Ex. III-103 | — | — | III-4A | 5.0 g | B | Comparative |
| C. Ex. III-104 | — | — | III-4B | 5.0 g | B | Comparative |
| C. Ex. III-105 | — | — | III-4C | 5.0 g | B | Comparative |

It was found that the ink for inkjet recording of the present invention was exhibiting a high print density, suppressing bronze gloss, and realizing excellent hue while maintaining equivalent ozone resistance as compared with the ink of Comparative Example. Further, it was found to be excellent also in storage stability over time of the ink liquid.
The structure (except 1A, 1B) of the compounds used in Example III will be illustrated below.
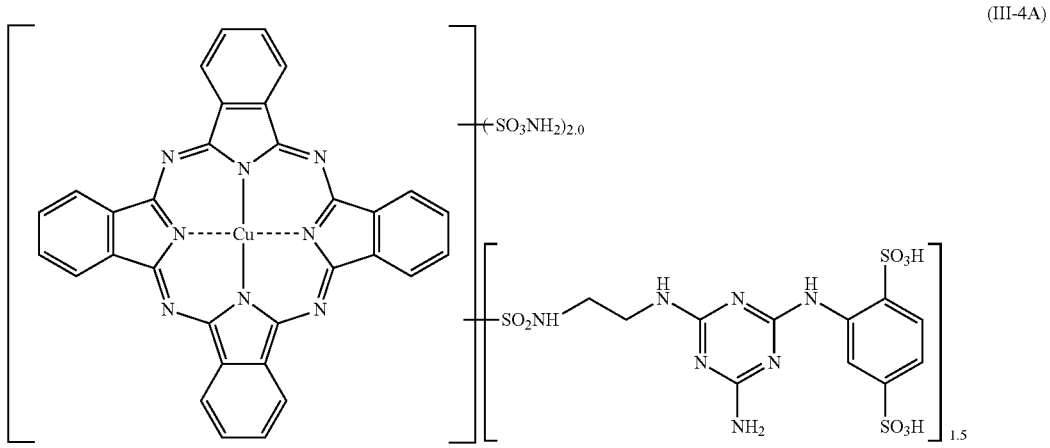
(III-4A)
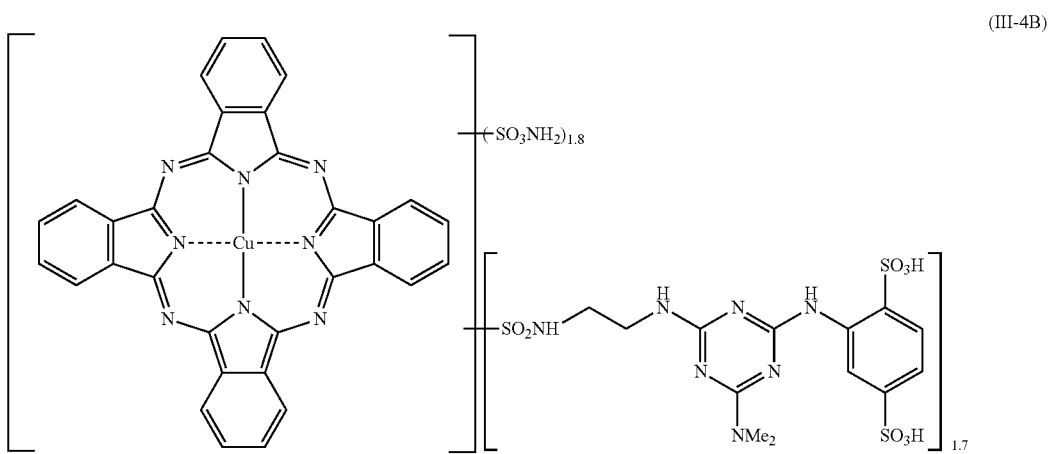
(III-4B)
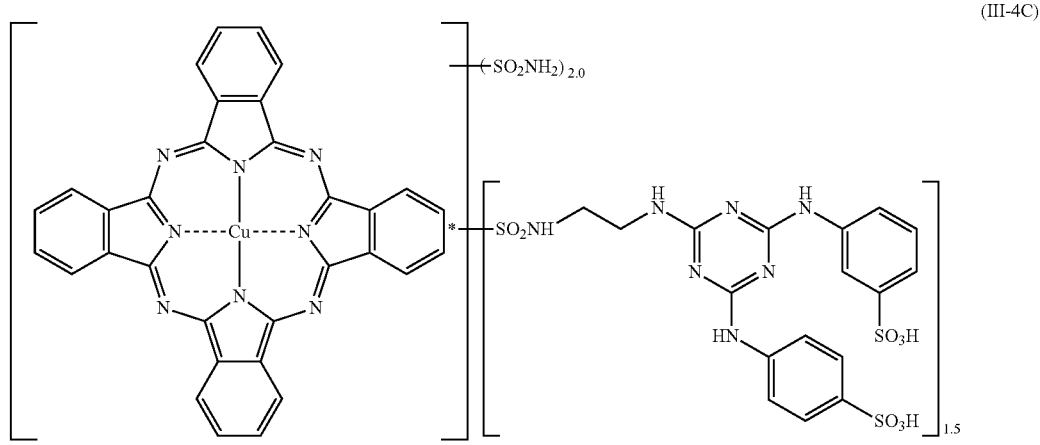
(III-4C)

INDUSTRIAL APPLICABILITY

In accordance with an aspect I of the present invention, ink-jet recording inks and the coloring composition having a good ozone fastness and a high print density and further being excellent in storage stability over time can be provided.

In accordance with an aspect II of the present invention, ink-jet recording inks and the coloring composition having a good ozone fastness and a high printing density, suppressing bronze gloss, realizing excellent hue, and further having excellent light source dependency can be provided.

In accordance with an aspect III of the present invention, ink-jet recording inks and the coloring composition having a good ozone fastness and a high printing density, suppressing bronze gloss, realizing excellent hue, and further being excellent in storage stability over time can be provided.

The present invention has been described with reference to specific embodiments in detail, but it is obvious to those of ordinary skill in the art that various changes and modifications will be possible without departing from the spirit and scope of the present invention.

The present application is based on Japanese Patent Application (Patent Application No. 2012-182688) filed on Aug. 21, 2012, Japanese Patent Application (Patent Application No. 2011-262830) filed on Nov. 30, 2011, Japanese Patent Application (Patent application No. 2011-262829) filed on Nov. 30, 2011, and Japanese Patent Application (Patent application No. 2011-244971) filed on Nov. 8, 2011, and the contents of which are incorporated herein by reference.

What is claimed is:

1. A coloring composition comprising:
   a phthalocyanine dye represented by the following Formula (1); and
   a phthalocyanine dye represented by the following Formula (I-2), the following Formula (II-2), or the following Formula (III-2):

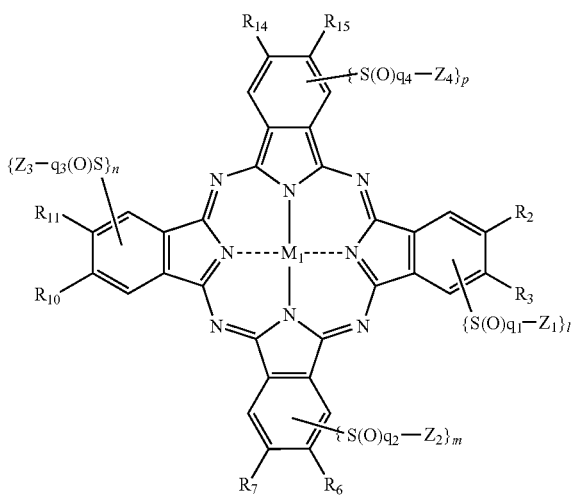

(1)

wherein, in formula (1),
$R_2$, $R_3$, $R_6$, $R_7$, $R_{10}$, $R_{11}$, $R_{14}$ and $R_{15}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group, and these groups may further have a substituent, $Z_1$, $Z_2$, $Z_3$ and $Z_4$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that at least one of $Z_1$, $Z_2$, $Z_3$ and $Z_4$ has an ionic hydrophilic group as a substituent, l, m, n, p, $q_1$, $q_2$, $q_3$ and $q_4$ each independently represent 1 or 2, and $M_1$ represents a hydrogen atom, a metal element, a metal oxide, a metal hydroxide or a metal halide:

Formula (I-2):

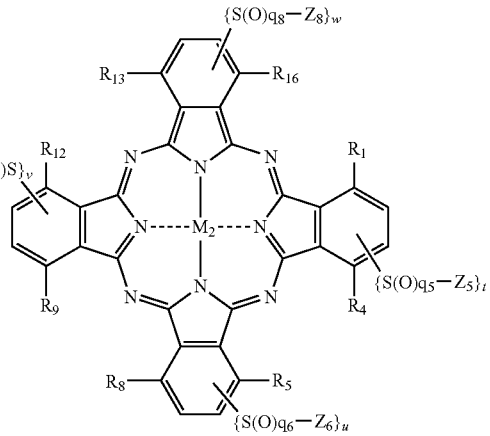

(I-2)

wherein, in Formula (I-2),
$R_1$, $R_4$, $R_5$, $R_8$, $R_9$, $R_{12}$, $R_{13}$, and $R_{16}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group, and these groups may further have a substituent, $Z_5$, $Z_6$, $Z_7$, and $Z_8$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that at least one of $Z_5$, $Z_6$, $Z_7$ and $Z_8$ has an ionic hydrophilic group as a substituent, t, u, v, w, $q_5$, $q_6$, $q_7$ and $q_8$ each independently represent 1 or 2, and $M_2$ represents a hydrogen atom, a metal element, a metal oxide, a metal hydroxide or a metal halide:

Formula (II-2):

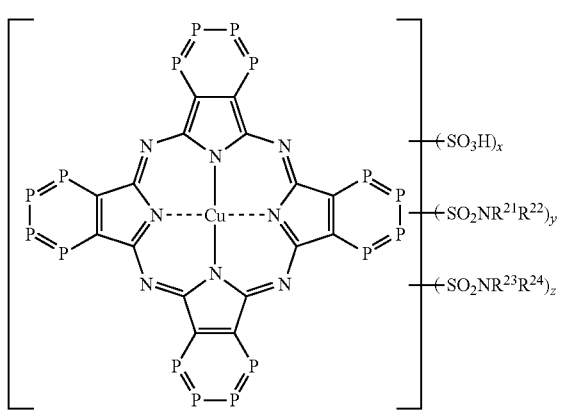

(II-2)

wherein, in Formula (II-2),

P's each independently represents a nitrogen atom or CH, and at least one of P's represents a nitrogen atom, provided that in four rings containing P's, each of the number of P's representing nitrogen atoms is 2 or less, $R^{21}$ and $R^{22}$ each independently represent a hydrogen atom or a substituted or unsubstituted alkyl group, $R^{23}$ represents a hydrogen atom or a substituted or unsubstituted hydrocarbon group, $R^{24}$ represents a substituted or unsubstituted hydrocarbon group, $R^{23}$ and $R^{24}$ may be bound to each other with a nitrogen atom to form a substituted or unsubstituted heterocyclic ring, and x, y, and z each independently represent 0 to 4, provided that x+y+z is 1 to 4:

Formula (III-2):

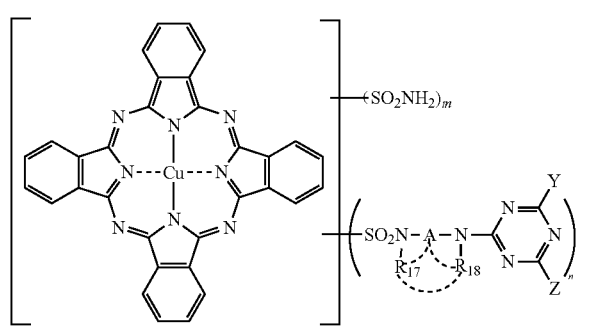

(III-2)

wherein, in Formula (III-2), $R_{17}$ and $R_{18}$ each independently represents a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heterocyclic group, or a substituted or unsubstituted alkenyl group, A represents a divalent linking group, $R_{17}$ and $R_{18}$ adjacent to A, and A may be bound to each other to form a ring, Y and Z each independently represents a halogen atom, a hydroxyl group, a sulfonate group, a carboxyl group, an amino group, a substituted or unsubstituted alkoxy group, a substituted or unsubstituted cycloalkyloxy group, a substituted or unsubstituted aryloxy group, a substituted or unsubstituted heterocyclic oxy group, a substituted or unsubstituted aralkyloxy group, a substituted or unsubstituted alkenyloxy group, a substituted or unsubstituted alkylamino group, a substituted or unsubstituted cycloalkyl amino group, a substituted or unsubstituted arylamino group, a substituted or unsubstituted heterocyclic amino group, a substituted or unsubstituted aralkylamino group, a substituted or unsubstituted alkenyl amino group, a substituted or unsubstituted dialkylamino group, a substituted or unsubstituted alkylthio group, a substituted or unsubstituted arylthio group, a substituted or unsubstituted heterocyclic thio group, a substituted or unsubstituted aralkyl thio group, or a substituted or unsubstituted alkenylthio group, provided that at least one of Y and Z has a sulfonate group, a carboxyl group, or an ionic hydrophilic group as a substituent, and m and n is 1 to 3, and the sum of m and n is 2 to 4.

2. The coloring composition according to claim 1, wherein in the phthalocyanine dye represented by Formula (I-2), $Z_5$, $Z_6$, $Z_7$, and $Z_8$ each independently represent a substituted or unsubstituted alkyl group, a substituted or unsubstituted aryl group, or a substituted or unsubstituted heterocyclic group.

3. The coloring composition according to claim 1, wherein in the phthalocyanine dye represented by Formula (I-2), $R_1$, $R_4$, $R_5$, $R_8$, $R_9$, $R_{12}$, $R_{13}$ and $R_{16}$ are a hydrogen atom.

4. The coloring composition according to claim 1, wherein in the phthalocyanine dye represented by Formula (I-2), $Z_5$, $Z_6$, $Z_7$, and $Z_8$ represent a substituted alkyl group, and at least one substituent which the substituted alkyl group has is —SONHR group where R represents a substituted or unsubstituted alkyl group or a substituted or unsubstituted phenyl group.

5. The coloring composition according to claim 1, wherein in the phthalocyanine dye represented by Formula (I-2), t, u, v and w are 1.

6. The coloring composition according to claim 1, wherein in the phthalocyanine dye represented by Formula (I-2), $q_5$, $q_6$, $q_7$ and $q_8$ are 2.

7. The coloring composition according to claim 1,
wherein an azaphthalocyanine dye represented by Formula (II-2) is an azaphthalocyanine dye represented by Formula (II-3-1) or Formula (II-3-2):

(I-3-1)

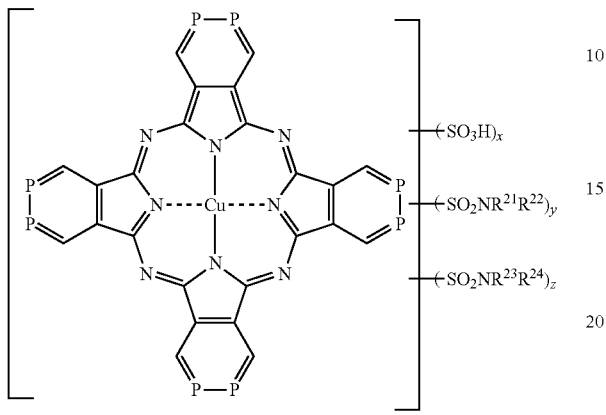

(I-3-2)

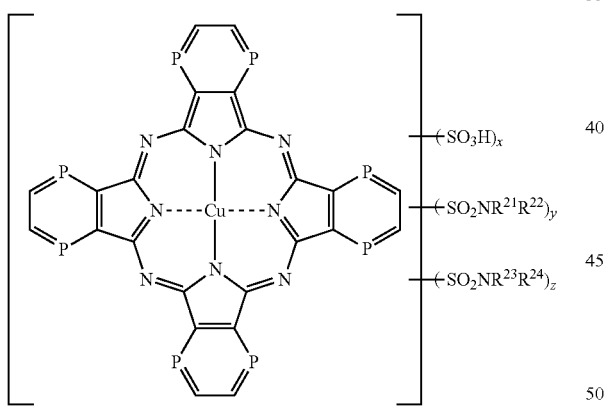

wherein, in Formula (II-3-1) and Formula (II-3-2),
P's each independently represents a nitrogen atom or CH, and at least one of P's represents a nitrogen atom,
$R^{21}$ and $R^{22}$ each independently represent a hydrogen atom or a substituted or unsubstituted alkyl group,
$R^{23}$ and $R^{24}$ each independently represent a hydrogen atom, a substituted or unsubstituted alkyl group, or a substituted or unsubstituted aryl group, and x, y, and z each independently represent 0 to 4, provided that x+y+z is 1 to 4.

8. The coloring composition according to claim 1,
wherein in Formula (II-2), Formula (II-3-1), or Formula (II-3-2), $R^{23}$ represents a hydrogen atom and $R^{24}$ is a substituted alkyl group substituted with a substituent represented by Formula (T1):

(T1)

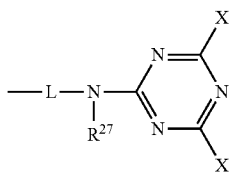

wherein, in Formula (T1),
L represents a single bond or a substituted or unsubstituted alkylene group,
X's each independently represents a substituent selected from $-OR^{25}$, $-SR^{25}$, and $-NR^{25}R^{26}$, and $R^{25}$ and $R^{26}$ each independently represent a hydrogen atom, a substituted or unsubstituted alkyl group, a substituted or unsubstituted aryl group, or a substituted or unsubstituted heterocyclic group, and at least one of $R^{25}$ and $R^{26}$ has an ionic hydrophilic group as a substituent, and
$R^{27}$ represents a hydrogen atom or a substituted or unsubstituted alkyl group.

9. The coloring composition according to claim 8,
wherein the substituent represented by Formula (T1) is a substituent represented by Formula (T2):

(T2)

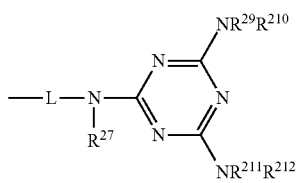

wherein, in Formula (T2),
L represents a single bond or a substituted or unsubstituted alkylene group,
$R^{29}$, $R^{210}$, and $R^{211}$ each independently represent a hydrogen atom, or a substituted or unsubstituted alkyl group,
$R^{212}$ represents a substituted alkyl group, a substituted aryl group, or a substituted heterocyclic group, and has at least one ionic hydrophilic group as a substituent, and
$R^{27}$ represents a hydrogen atom or a substituted or unsubstituted alkyl group.

10. The coloring composition according to claim 1,
wherein the phthalocyanine dye represented by the Formula (III-2) is a phthalocyanine dye represented by the Formula (III-2-1):

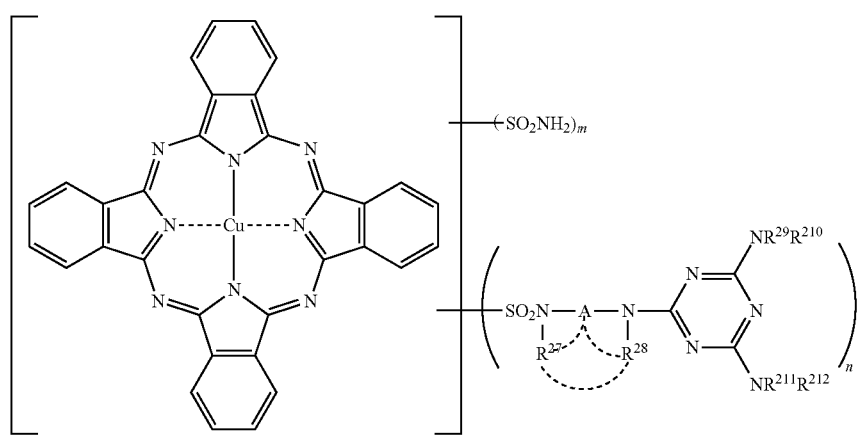

(III-2-1)

wherein, in Formula (III-2-1),

R$^{27}$ and R$^{28}$ each independently represent a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heterocyclic group, or a substituted or unsubstituted alkenyl group, A represents a divalent linking group, R$^{27}$ and R$^{28}$ adjacent to A, and A may be bound to each other to form a ring, R$^{29}$, R$^{210}$, and R$^{211}$ each independently represent a hydrogen atom, or a substituted or unsubstituted alkyl group, R$^{212}$ represents a sulfonate group, a carboxyl group, a substituted alkyl group, a substituted aryl group, or a substituted heterocyclic group, and has at least one ionic hydrophilic group as a substituent, and m and n are 1 to 3, and the sum of m and n is 2 to 4.

11. The coloring composition according to claim 1, wherein in the phthalocyanine dye represented by Formula (1), R$_2$, R$_3$, R$_6$, R$_7$, R$_{10}$, R$_{11}$, R$_{14}$ and R$_{15}$ are a hydrogen atom.

12. The coloring composition according to claim 1, wherein in the phthalocyanine dye represented by Formula (1), Z$_1$, Z$_2$, Z$_3$, and Z$_4$ each independently represent a substituted or unsubstituted alkyl group, a substituted or unsubstituted aryl group, or a substituted or unsubstituted heterocyclic group.

13. The coloring composition according to claim 1, wherein in the phthalocyanine dye represented by Formula (1), l, m, n and p are 1.

14. The coloring composition according to claim 1, wherein in the phthalocyanine dye represented by Formula (1), q$_1$, q$_2$, q$_3$ and q$_4$ are 2.

15. The coloring composition according to claim 1, further comprising a compound represented by Formula (AB9):

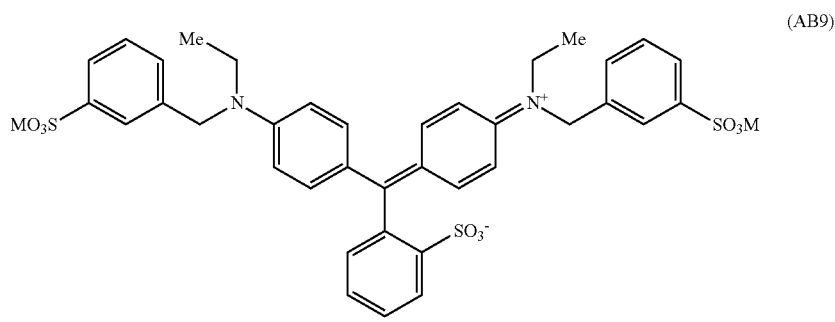

(AB9)

wherein, in Formula (AB9),

Me represents a methyl group, and

M represents a hydrogen atom, a lithium, a sodium, a potassium, or an ammonium.

16. The coloring composition according to claim 1, wherein a mass ratio of the phthalocyanine dye represented by Formula (1) to the phthalocyanine dye represented by Formula (I-2), Formula (II-2), or Formula (III-2) is 50/50 to 10/90.

17. The coloring composition according to claim 1, wherein a content of the phthalocyanine dye represented by Formula (1) is 1% by mass to 20% by mass.

18. The coloring composition according to claim 15, wherein a mass ratio of the total amount of the phthalocyanine dye represented by Formula (1) and the phthalocyanine dye represented by Formula (I-2), Formula (II-2), or Formula (III-2) to the compound represented by Formula (AB9) is 90/10 to 99/1.

19. An ink for inkjet recording comprising the coloring composition according to claim 1.

* * * * *